(12) United States Patent
Kando et al.

(10) Patent No.: US 11,559,742 B2
(45) Date of Patent: Jan. 24, 2023

(54) COMPUTER-READABLE NON-TRANSITORY STORAGE MEDIUM HAVING GAME PROGRAM STORED THEREIN, GAME SYSTEM, GAME APPARATUS CONTROL METHOD, AND GAME APPARATUS

(71) Applicant: NINTENDO CO., LTD., Kyoto (JP)

(72) Inventors: Yuji Kando, Kyoto (JP); Yoshiaki Onishi, Kyoto (JP); Ayako Moriwaki, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 296 days.

(21) Appl. No.: 16/814,348

(22) Filed: Mar. 10, 2020

(65) Prior Publication Data

US 2020/0368608 A1 Nov. 26, 2020

(30) Foreign Application Priority Data

May 23, 2019 (JP) .............................. JP2019-096746
May 23, 2019 (JP) .............................. JP2019-096747
May 23, 2019 (JP) .............................. JP2019-096748

(51) Int. Cl.
*A63F 13/56* (2014.01)
*A63F 13/24* (2014.01)
(Continued)

(52) U.S. Cl.
CPC ............ *A63F 13/56* (2014.09); *A63F 13/211* (2014.09); *A63F 13/24* (2014.09); *A63F 13/35* (2014.09);
(Continued)

(58) Field of Classification Search
CPC ........ A63F 13/211; A63F 13/24; A63F 13/35; A63F 13/525; A63F 13/56; A63F 13/843;
(Continued)

(56) References Cited

U.S. PATENT DOCUMENTS 5,990,862 A * 11/1999 Lewis ..................... G06F 3/038
715/858
6,966,837 B1 11/2005 Best
(Continued)

FOREIGN PATENT DOCUMENTS

| JP | 2011-36588 | 2/2011 |
| JP | 2015-47198 | 3/2015 |
| JP | 2018-19894 | 2/2018 |

OTHER PUBLICATIONS

CN108854053 Gyroscope Assisted Aiming Method Used for Gamepad, Machine translation (Year: 2018).*
(Continued)

*Primary Examiner* — James S. McClellan
*Assistant Examiner* — Ross A Williams
(74) *Attorney, Agent, or Firm* — Nixon & Vanderhye, PC

(57) ABSTRACT

Direction input data and inertial sensor data are acquired from a controller including a direction input section and an inertial sensor. Movement of a player character is controlled on the basis of the direction input data. In addition, a control mode for a position of a cursor is switchable between a first control mode and a second control mode. When the control mode is the first control mode, a position further shifted, based on the inertial sensor data, from a position calculated based on a position and a direction of the player character is set as the position of the cursor. When the control mode is the second control mode, a position shifted, based on the inertial sensor data, within a predetermined range, in a virtual space, including a predetermined position in the virtual space, from the predetermined position is set as the position of the cursor.

21 Claims, 41 Drawing Sheets

(51) Int. Cl.
*A63F 13/847* (2014.01)
*A63F 13/843* (2014.01)
*A63F 13/35* (2014.01)
*A63F 13/525* (2014.01)
*A63F 13/211* (2014.01)
*G06F 3/04812* (2022.01)
*A63F 13/2145* (2014.01)

(52) U.S. Cl.
CPC .......... *A63F 13/525* (2014.09); *A63F 13/843* (2014.09); *A63F 13/847* (2014.09); *G06F 3/04812* (2013.01); *A63F 13/2145* (2014.09); *A63F 2300/105* (2013.01); *A63F 2300/1043* (2013.01); *G06F 2203/04801* (2013.01)

(58) Field of Classification Search
CPC ............ A63F 13/847; A63F 2300/1043; A63F 2300/105; A63F 13/2145; G06F 2203/04801; G06F 3/04812
See application file for complete search history.

(56) References Cited

U.S. PATENT DOCUMENTS

| | | | |
|---|---|---|---|
| 8,062,110 B2 | 11/2011 | Shimizu | |
| 8,972,617 B2 * | 3/2015 | Hirschman | G06F 3/0219 463/37 |
| 9,539,507 B2 | 1/2017 | Schoenith | |
| 9,804,696 B2 | 10/2017 | Hall | |
| 9,833,700 B2 | 12/2017 | Higgins | |
| 9,891,799 B2 | 2/2018 | Nishida | |
| 9,910,512 B1 * | 3/2018 | Tiwary | G06F 3/038 |
| 10,007,339 B2 | 6/2018 | Long | |
| 10,010,789 B2 | 7/2018 | Koizumi | |
| 10,092,829 B2 | 10/2018 | Ikuta | |
| 10,130,875 B2 | 11/2018 | Long | |
| 10,220,308 B2 | 3/2019 | Ironmonger | |
| 10,279,250 B2 | 5/2019 | Burgess | |
| 10,350,490 B2 | 7/2019 | Ironmonger | |
| 10,688,387 B2 | 6/2020 | Croft | |
| 10,744,406 B2 | 8/2020 | Ham | |
| 10,806,997 B2 | 10/2020 | Winick | |
| 10,843,069 B2 | 11/2020 | Ironmonger | |
| 10,888,770 B2 | 1/2021 | Onozawa | |
| 11,045,734 B2 | 6/2021 | Kando | |
| 2004/0214638 A1 | 10/2004 | Totaka | |
| 2006/0084509 A1 * | 4/2006 | Novak | A63F 13/837 463/30 |
| 2006/0252531 A1 | 11/2006 | Kando | |
| 2006/0252540 A1 | 11/2006 | Kando | |
| 2009/0048021 A1 * | 2/2009 | Lian | G06F 3/0346 455/352 |
| 2010/0262718 A1 | 10/2010 | Ikeno | |
| 2010/0317439 A1 | 12/2010 | Izumi | |
| 2012/0052943 A1 | 3/2012 | Tsunashima | |
| 2012/0088582 A1 | 4/2012 | Wu | |
| 2014/0121020 A1 | 5/2014 | Yamada | |
| 2016/0195940 A1 | 7/2016 | Hall | |
| 2017/0052750 A1 | 2/2017 | Koizumi | |
| 2018/0036642 A1 | 2/2018 | Tanaka | |

OTHER PUBLICATIONS

Nintendo Co., Ltd., "PIKMIN 3", [online] [Retrieved on May 9, 2018], Internet (URL: https://www.nintendo.co.jp/wiiu/ac3j/index. html), 6 pages with partial English Translation.
Nintendo Game Manual of PIKMIN 2, (Year: 2012), pp. 1-21.

* cited by examiner

| TYPE ID | APPEARANCE DATA | ACTION DEFINITION DATA |
|---|---|---|
| 01 | ... | ... |
| 02 | ... | ... |
| 03 | ... | ... |
| ⋮ | ⋮ | ⋮ |

331 = TYPE ID, 332 = APPEARANCE DATA, 333 = ACTION DEFINITION DATA

| COMPANION CHARACTER ID | TYPE ID | PARTICIPATION PARTY INFORMATION | CURRENT POSITION DATA | CURRENT STATE DATA |
|---|---|---|---|---|
| 00001 | 01 | FIRST PARTY | (xx,yy,zz) | ... |
| 00002 | 01 | FREE | (xx,yy,zz) | ... |
| 00003 | 02 | SECOND PARTY | (xx,yy,zz) | ... |
| ⋮ | ⋮ | ⋮ | ⋮ | ⋮ |

341 = COMPANION CHARACTER ID, 342 = TYPE ID, 343 = PARTICIPATION PARTY INFORMATION, 344 = CURRENT POSITION DATA, 345 = CURRENT STATE DATA

- 351 LEADER CHARACTER INFORMATION
- 352 FIRST REAR CHARACTER INFORMATION
- 353 SECOND REAR CHARACTER INFORMATION
- 354 COMPANION CHARACTER INFORMATION

COMPUTER-READABLE NON-TRANSITORY STORAGE MEDIUM HAVING GAME PROGRAM STORED THEREIN, GAME SYSTEM, GAME APPARATUS CONTROL METHOD, AND GAME APPARATUS

CROSS REFERENCE TO RELATED APPLICATION

The disclosures of Japanese Patent Application Nos. 2019-096746, 2019-096747, and 2019-096748, filed on May 23, 2019, are incorporated herein by reference.

FIELD

The exemplary embodiments relate to a computer-readable non-transitory storage medium having a game program stored therein, a game system, a game apparatus control method, and a game apparatus that control movement of a cursor.

BACKGROUND AND SUMMARY

Hitherto, a game in which a cursor can be moved in conjunction with movement of a player character has been known. In this game, a player character can be moved within a virtual three-dimensional space by operating a left analog stick. Then, a cursor located away from the position of the player character by a predetermined distance can be moved with the movement of the player character. That is, the player character and the cursor can be moved in conjunction with each other by operating the left analog stick. In addition, a player is allowed to cause the player character to throw a predetermined object toward a position indicated by the cursor.

As described above, the player is allowed to cause the player character to throw the predetermined object toward the position of the cursor. Meanwhile, movement of the cursor is linked to movement of the player character (an operation on the left analog stick in the above example). In this regard, occurrence of needs for more finely aiming at a position to which a predetermined object is to be thrown, is also assumed. For example, this is a case where a predetermined object is desired to be thrown at a "weak spot" of an enemy character. From such a viewpoint, there is room for further improvement of operability regarding movement of the cursor.

Therefore, it is an object of the exemplary embodiments to provide a game program, etc., that are capable of further enhancing operability regarding control of movement of a player character and movement of a cursor that moves in conjunction with the movement of the player character.

In order to attain the object described above, for example, the following configuration examples are exemplified.

A configuration example is directed to a computer-readable non-transitory storage medium having stored therein a game program to be executed by a computer of an information processing apparatus, the game program causing the computer to: acquire operation data including at least direction input data and inertial sensor data, from a controller including at least a direction input section and an inertial sensor; control movement of a player character within a virtual space on the basis of the direction input data; switch a control mode for a position of a cursor used in a predetermined game process between a first control mode and a second control mode; when the control mode is the first control mode, set a position within the virtual space calculated on the basis of a position and a direction of the player character, as a first position, set a position further shifted from the first position on the basis of the inertial sensor data, as a second position, and determine the second position as the position of the cursor;

when the control mode is the second control mode, set a predetermined position within the virtual space as the first position, limit a movement range of the cursor to a predetermined range, within the virtual space, including the first position, set a position further shifted within the range from the first position on the basis of the inertial sensor data, as the second position, and determine the second position as the position of the cursor; and perform the predetermined game process on the position of the cursor within the virtual space in accordance with an instruction based on the operation data.

According to the above configuration example, for the position of the cursor, position designation can be performed such that the position of the cursor is linked to movement of the player character. Moreover, the position of the cursor can be further changed, for example, by changing the orientation of the controller, thereby enabling fine adjustment of the position of the cursor. Accordingly, the operability regarding operation for the position of the cursor can be further enhanced. Furthermore, when the control mode is the second control mode, it is possible to move the cursor only within a range based on a predetermined position. Accordingly, for example, in the case where more finely aiming at an object is desired, it is easier to aim at the object, so that the operability can be improved.

In another configuration example, when the control mode is the first control mode, a position shifted within the virtual space from the position of the player character by a predetermined amount in a direction along the direction of the player character may be set as the first position.

According to the above configuration example, for the position of the cursor, rough position designation can be performed only by an input operation for a movement direction of the player character, so that the operability can be improved.

In another configuration example, a change amount of an orientation of the controller from a predetermined reference orientation is calculated on the basis of the inertial sensor data, and a position corresponding to the change amount may be set as the second position.

According to the above configuration example, the position of the cursor can be finely adjusted by changing the orientation of the controller, so that intuitive and fine operability can be provided.

In another configuration example, a movement amount of the cursor with respect to the change amount of the orientation of the controller when the control mode is the second control mode may be made smaller than a movement amount when the control mode is the first control mode.

According to the above configuration example, in the case of the second control mode, finer and more precise cursor position designation can be easily performed. That is, fine cursor position adjustment can be easily performed.

In another configuration example, when switching between the first control mode and the second control mode is performed, a movement amount based on the inertial sensor data from the first position may be initialized, and the orientation of the controller when the switching is performed may be set as the predetermined reference orientation.

According to the above configuration example, when switching the control mode, for example, the position of the cursor can be finely adjusted on the basis of the inertial sensor data with the orientation of the controller at the time of the switching as a reference, and thus the operability can be further enhanced.

In another configuration example, when the control mode is switched from the first control mode to the second control mode, a predetermined position on a predetermined target object that is preset as a setting target may be set as the first position. Furthermore, when the control mode is the second control mode, if a plurality of the target objects are present within a predetermined range including the position of the cursor, a target object that is a setting target for the first position may be switched on the basis of the operation data, and a predetermined position on a target object after the switching may be set as the first position.

According to the above configuration example, for example, when a plurality of targets on which a predetermined game process (attack, etc.) is desired to be performed are present, the target can be switched while the second control mode is kept, so that the operability can be improved.

In another configuration example, a process of causing the player character to move a predetermined object toward the position of the cursor may be performed.

According to the above configuration example, for example, the operability in a game that is played in such a manner as to "aim" at a certain position within a virtual space and move a predetermined object or the like to the position, can be enhanced.

In another configuration example, the above configuration may be applied to a game system having a controller including at least a direction input section and a inertial sensor. In addition, in this case, the game system may have two controllers that are useable in combination as one controller. Each of the controllers may have a shape that allows the controller to face toward a player when the player holds the controller in order to play a game, and in which a predetermined side of a predetermined surface of the controller on which a predetermined operation section is provided is longer than another side of the predetermined surface. In a state where the two controllers are held by the player in a first orientation, a combination of the two controllers may be usable as one controller for operation for the game process. In a state where one controller of the two controllers is held by the player in a second orientation that is an orientation obtained by rotating the first orientation about a predetermined axis by 90 degrees such that a state where the predetermined surface faces toward the player is maintained, the one controller may be usable for operation for the game process.

According to the above configuration example, for example, in the case where two controllers having a generally parallelepiped shape are used, when the two controllers are used in combination as one controller in the orientation in which the controllers are vertically long, or when one of the controllers is used in the orientation in which the controller is horizontally long, an intuitive operation is provided for fine adjustment of the position of the cursor in the far side direction as seen from the player's perspective, so that ease of operation can be improved.

According to the exemplary embodiments, both rough control of movement of the cursor position in accordance with movement of the player character (a direction input operation, etc.) and control of fine adjustment of the cursor position based on the inertial sensor data can be used, so that the operability can be improved.

BRIEF DESCRIPTION OF THE DRAWINGS

FIG. 39 is a diagram showing a non-limiting example of the data structure of companion character master data 312;

FIG. 40 is a diagram showing a non-limiting example of the data structure of companion character data 313;

FIG. 41 is a diagram showing a non-limiting example of the data structure of first party data 315;

DETAILED DESCRIPTION OF NON-LIMITING EXAMPLE EMBODIMENTS

Hereinafter, an exemplary embodiment will be described.

A game system according to an example of the exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Furthermore, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
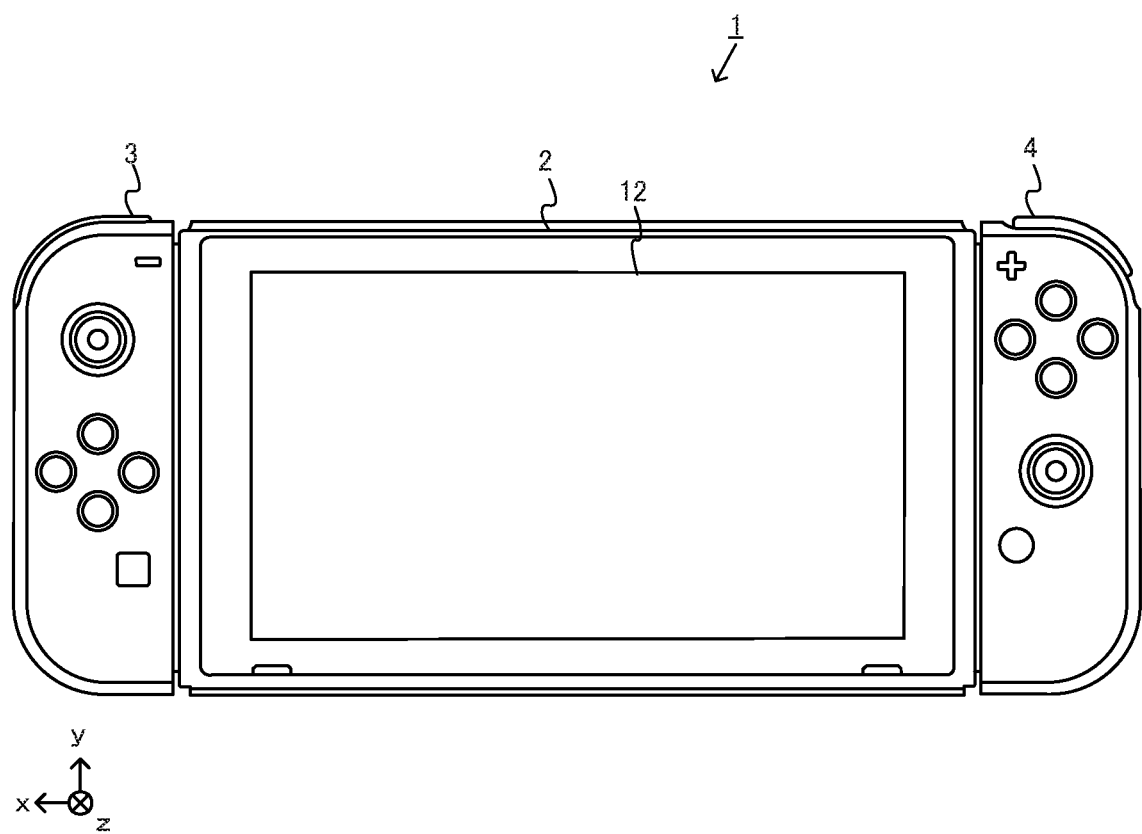
FIG. 1 is a diagram showing an example of the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., a game process) in the game system 1. The main body apparatus 2 includes a display 12. Each of the left controller 3 and the right controller 4 is an apparatus including operation sections with which a user provides inputs.

Figure 2:
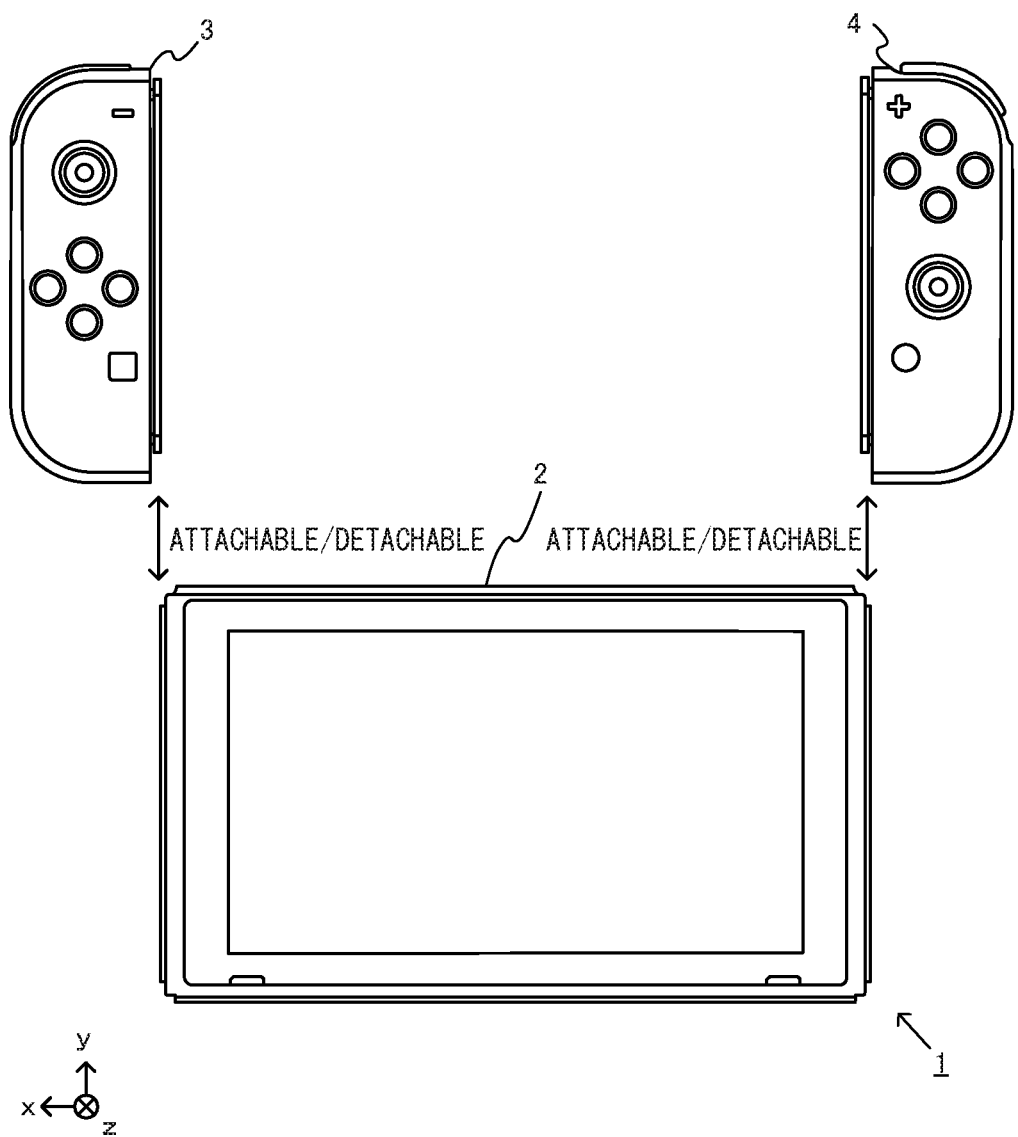
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
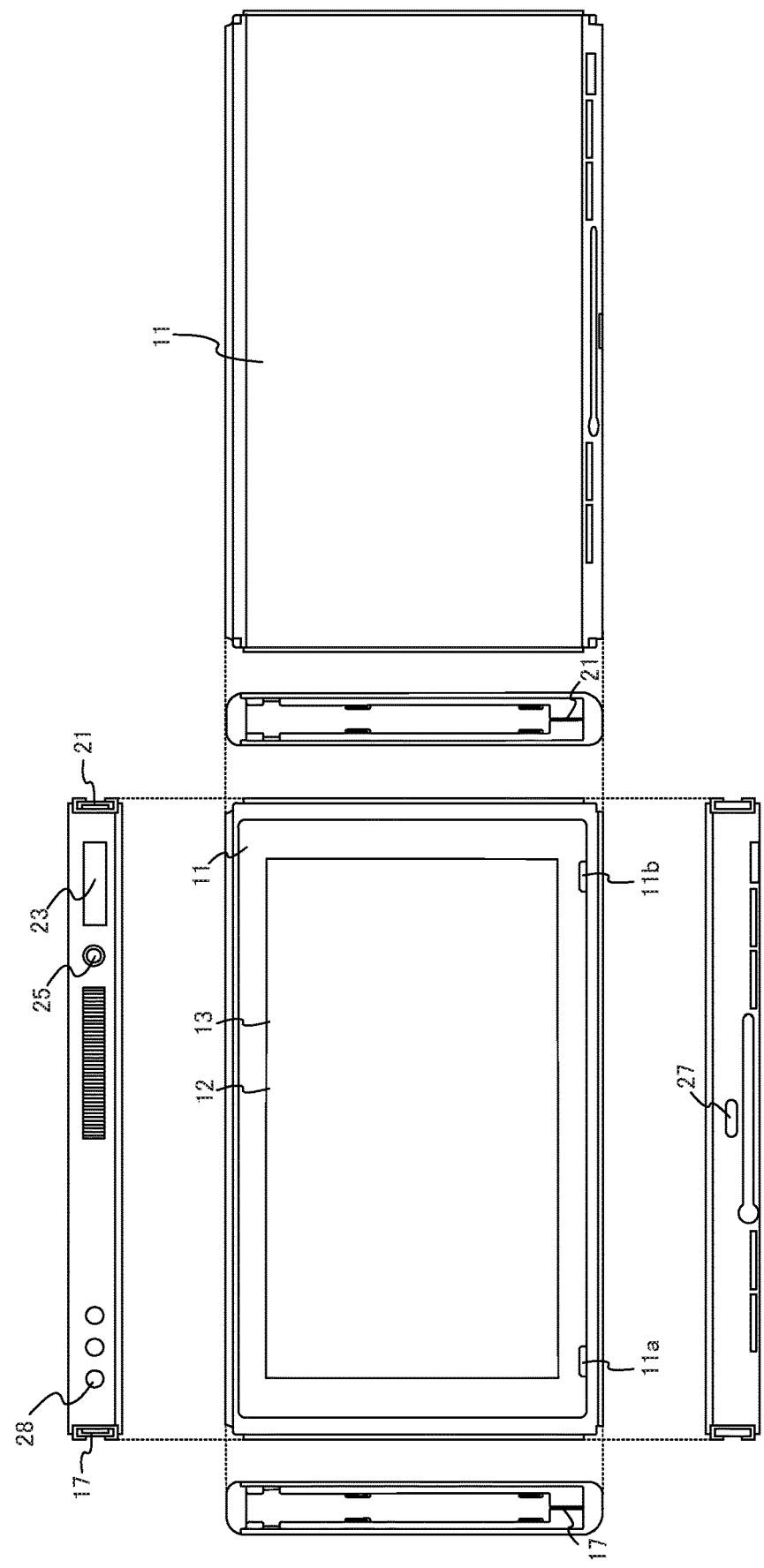
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes a substantially plate-shaped housing 11. In the exemplary embodiment, a main surface (in other words, a surface at a front side, i.e., a surface on which the display 12 is provided) of the housing 11 has a generally rectangular shape.

It should be noted that the shape and the size of the housing 11 are optional. As an example, the housing 11 may have a size that makes the main body apparatus 2 portable. In addition, the main body apparatus 2 alone or the unified apparatus obtained by attaching the left controller 3 and the right controller 4 to the main body apparatus 2 may function as a mobile apparatus. Furthermore, the main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a Liquid Crystal Display device (LCD). The display 12, however, may be any type of display device.

Furthermore, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Furthermore, the main body apparatus 2 includes: a left terminal 17 that is a terminal for the main body apparatus 2 to perform wired communication with the left controller 3;

and a right terminal 21 that is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 has a shape that allows a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application, or the like) to be used by the main body apparatus 2 and/or a program (e.g., a program for an application, or the like) to be executed by the main body apparatus 2. Furthermore, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). In addition, when the unified apparatus or the main body apparatus 2 alone is mounted on the cradle, the game system 1 can display on a stationary monitor an image generated by and output from the main body apparatus 2. Moreover, in the exemplary embodiment, the cradle has the function of charging the unified apparatus or the main body apparatus 2 alone mounted on the cradle. Furthermore, the cradle has the function of a hub device (specifically, a USB hub).

Figure 4:
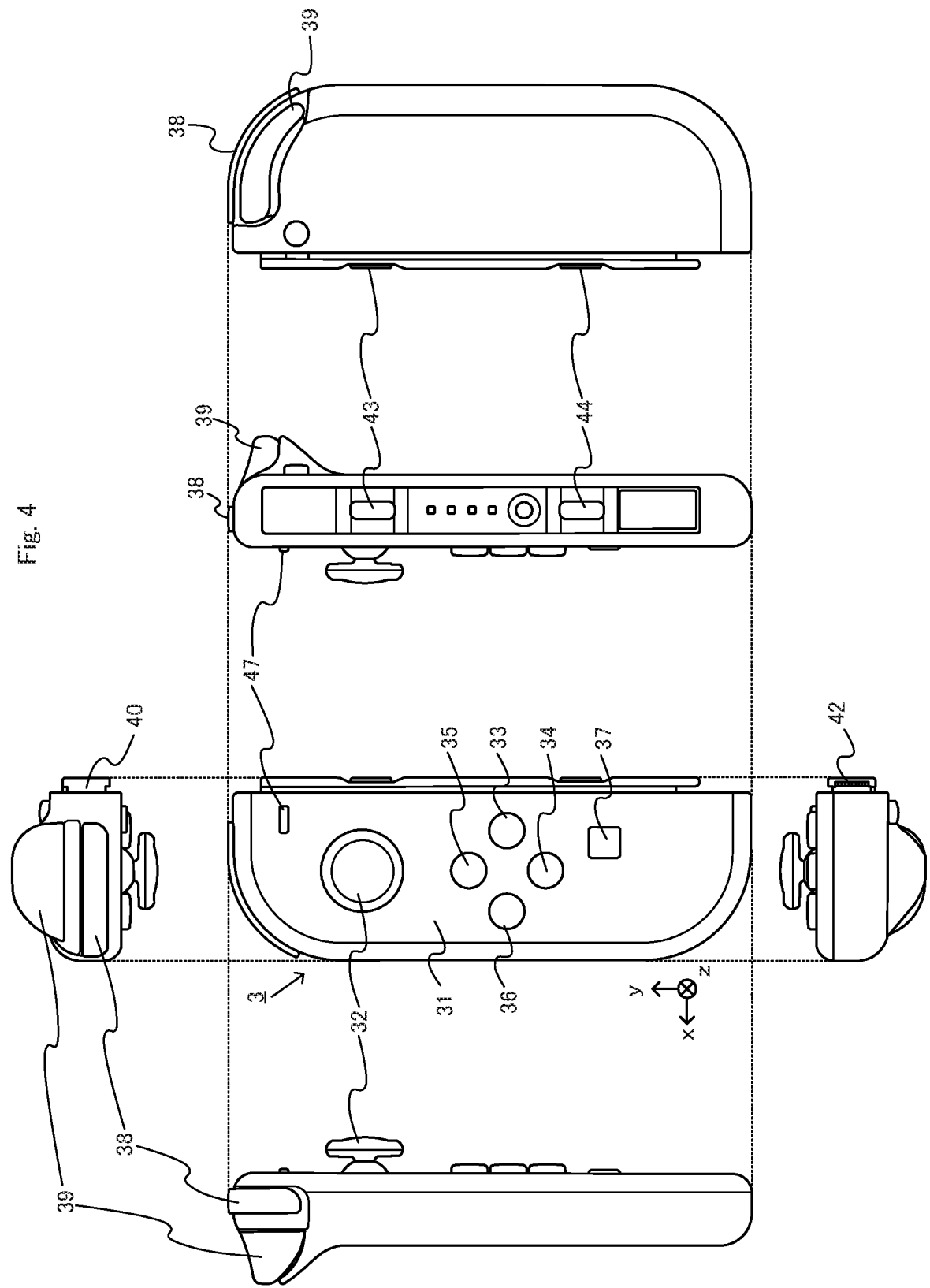
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Furthermore, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Furthermore, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Furthermore, the left controller 3 includes a record button 37 and a "−" (minus) button 47. The left controller 3 includes a first L-button 38 and a ZL-button 39 on an upper left portion of a side surface of the housing 31. Moreover, the left controller 3 includes a second L-button 43 and a second R-button 44 on the side surface of the housing 31 on which the left controller 3 is attached to the main body apparatus 2. These operation buttons are used to give instructions depending on various programs (e.g., an OS program and an application program) executed by the main body apparatus 2.

Furthermore, the left controller 3 includes a terminal 42 for the left controller 3 to perform wired communication with the main body apparatus 2.

Figure 5:
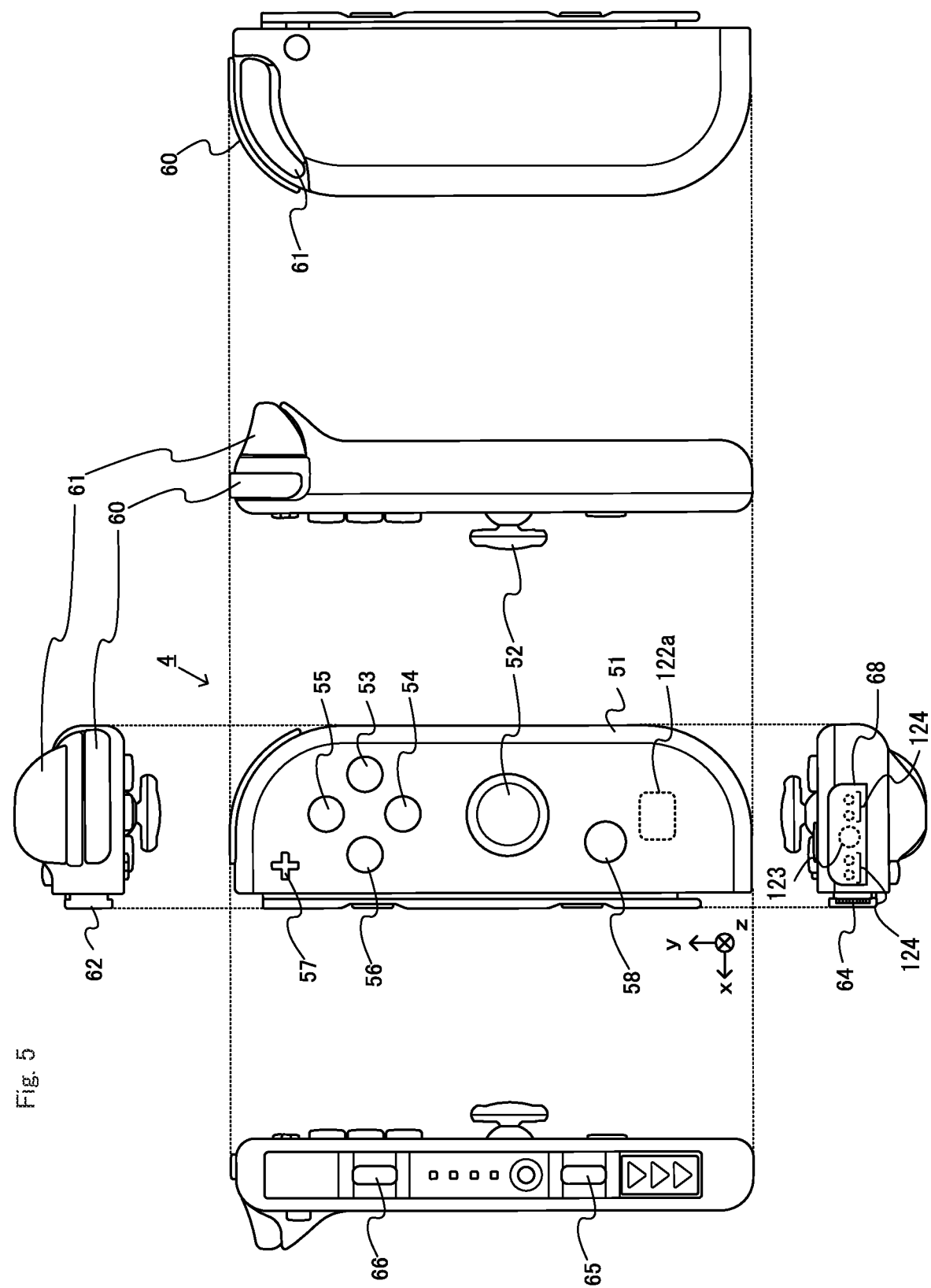
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Furthermore, the right controller 4 can also be held in the orientation in which the right controller 4 is horizontally long. When held in the orientation in which the right controller 4 is horizontally long, the right controller 4 may be held with both hands.

Similar to the left controller 3, the right controller 4 includes an analog stick 52 as a direction input section. In the exemplary embodiment, the analog stick 52 has the same configuration as that of the analog stick 32 of the left controller 3. In addition, the right controller 4 may include a directional pad, a slide stick that allows a slide input, or the like, instead of the analog stick. Moreover, similar to the left controller 3, the right controller 4 includes four operation buttons 53 to 56 (specifically, an A-button 53, a B-button 54, an X-button 55, and a Y-button 56) on a main surface of the housing 51. Moreover, the right controller 4 includes a "+" (plus) button 57 and a home button 58. Furthermore, the right controller 4 includes a first R-button 60 and a ZR-button 61 on an upper right portion of a side surface of the housing 51. Furthermore, similar to the left controller 3, the right controller 4 includes a second L-button 65 and a second R-button 66.

Moreover, the right controller 4 includes a terminal 64 for the right controller 4 to perform wired communication with the main body apparatus 2.

Figure 6:
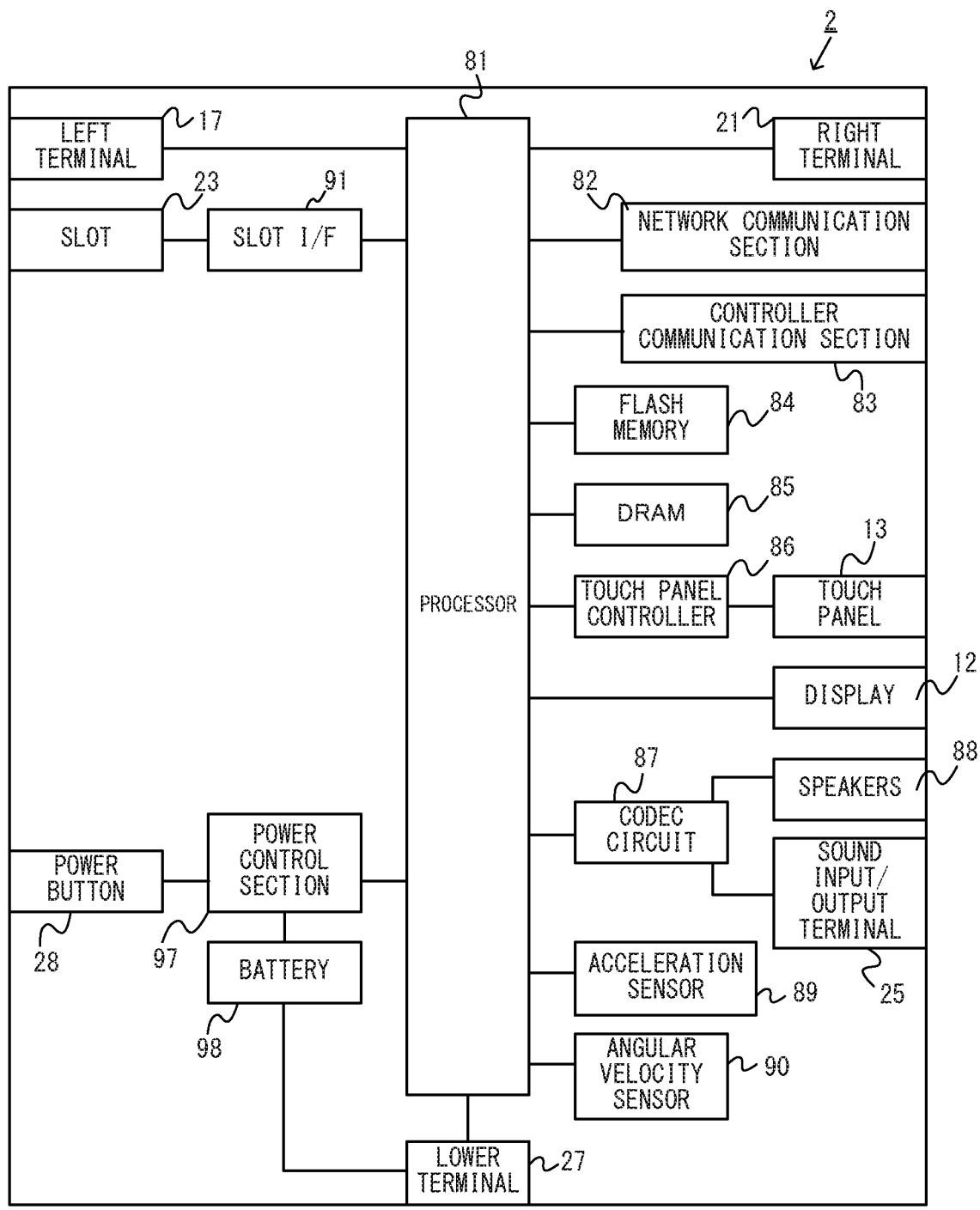
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program (e.g., a game program) stored in a storage section (specifically, an internal storage medium such as a flash memory 84, an external storage medium attached to the slot 23, or the like).

The main body apparatus 2 includes a flash memory 84 and a DRAM (Dynamic Random Access Memory) 85 as examples of internal storage media built in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data to be used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 performs the above information processing by reading and writing data from and to the flash memory 84, the DRAM 85, and each of the above storage media as appropriate.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Furthermore, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The method for communication between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. In addition, when performing wired communication with the right controller 4, the processor 81 transmits data to the right controller 4 via the right terminal 21 and also receives operation data from the right controller 4 via the right terminal 21. Moreover, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Furthermore, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Furthermore, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86 that is a circuit for controlling the touch panel 13. The touch panel controller 86 is connected between the touch panel 13 and the processor 81. On the basis of a signal from the touch panel 13, the touch panel controller 86 generates, for example, data indicating the position where a touch input is provided. Then, the touch panel controller 86 outputs the data to the processor 81.

Furthermore, the display 12 is connected to the processor 81. The processor 81 displays a generated image (e.g., an image generated by executing the above information processing) and/or an externally acquired image on the display 12.

The main body apparatus 2 includes a codec circuit 87 and the speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Furthermore, although not shown, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Furthermore, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
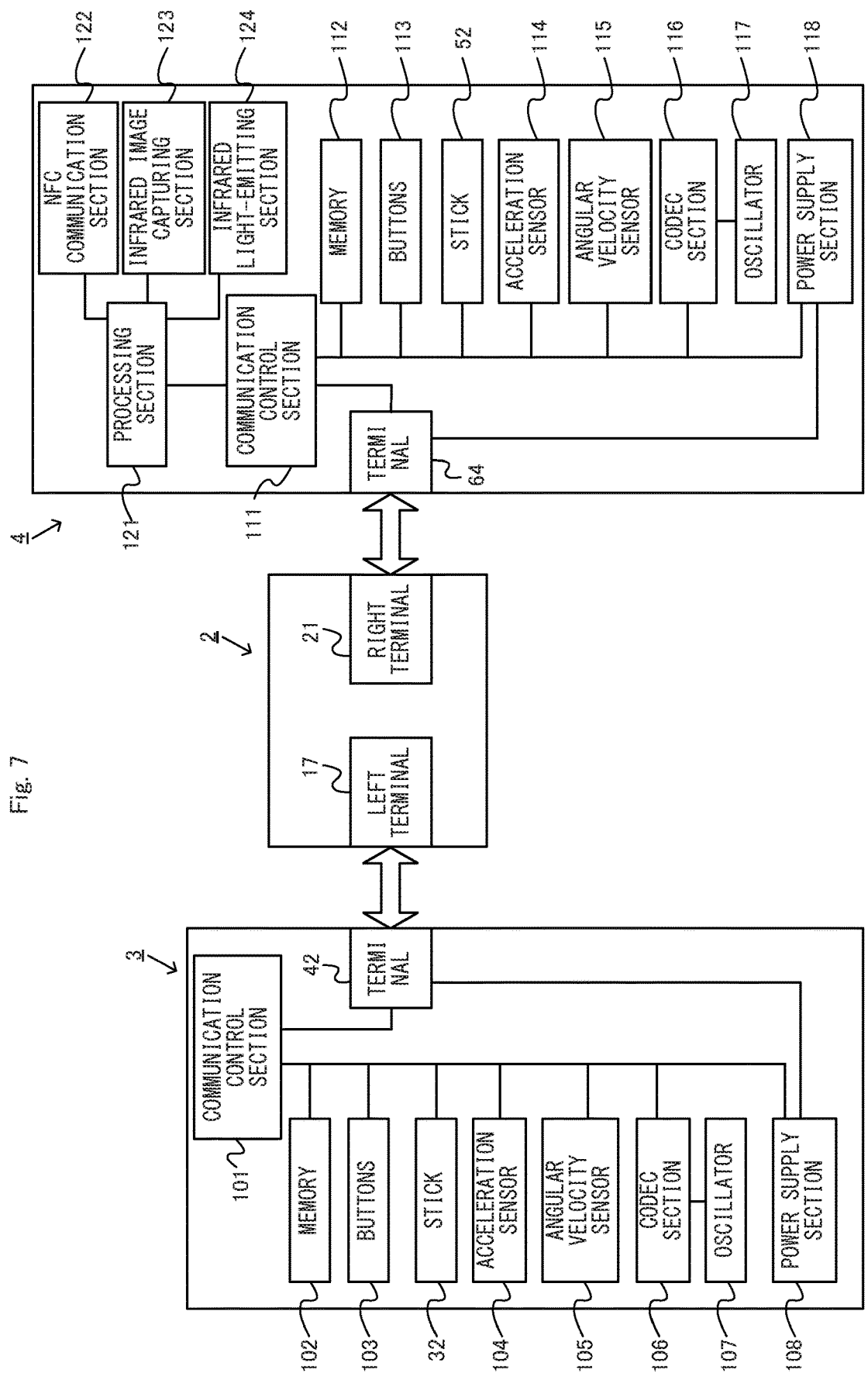
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101 that communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Furthermore, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Furthermore, the left controller 3 includes a memory 102 such as a flash memory. The communication control section 101 includes, for example, a microcomputer (or a microprocessor) and performs various processes by executing firmware stored in the memory 102.

The left controller 3 includes buttons 103 (specifically, the buttons 33 to 39, 43, 44, and 47). Furthermore, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Furthermore, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 on the basis of the operation data. Furthermore, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown, the power control circuit is connected to the battery and also connected to components of the left controller 3 (specifically, components that receive power supplied from the battery).

As shown in FIG. 7, the right controller 4 includes a communication control section 111 that communicates with the main body apparatus 2. Furthermore, the right controller 4 includes a memory 112 that is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similar to the input sections of the left controller 3.

The right controller 4 includes a power supply section 118. The power supply section 118 has a function similar to that of the power supply section 108 of the left controller 3 and operates similar to the power supply section 108.

[Outline of Game Process in Exemplary Embodiment]

Next, an operation outline of the game process executed in the game system according to the exemplary embodiment will be described. It should be noted that, in the exemplary embodiment, the case where the main body apparatus 2 alone is mounted on the cradle and a game is played in a form in which the main body apparatus 2 outputs image data or sound data to the stationary monitor or the like via the cradle, will be described as an example.

The game process assumed in the exemplary embodiment assumes the case where two players mainly play, that is, simultaneous play by two players. However, for easy understanding, first, an outline of a game according to the exemplary embodiment will be described with the case of play by a single player as an example.

Figure 8:
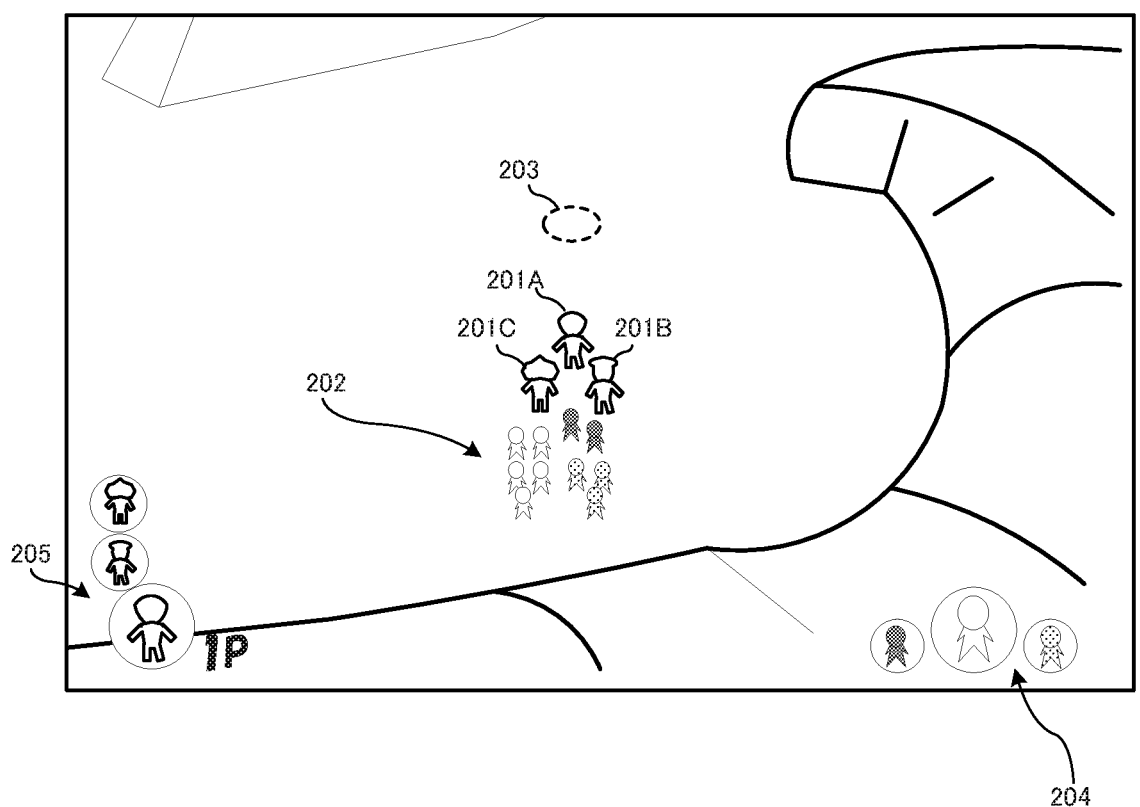
FIG. 8 shows a non-limiting example of a game screen according to an embodiment.

FIG. 8 shows an example of a screen of the game generated by taking an image of a virtual three-dimensional game space, which is a stage for the game, using a virtual camera. In FIG. 8, player characters 201A, 201B, and 201C (hereinafter, occasionally referred to collectively as player character), a plurality of companion characters 202, a cursor object 203 (hereinafter, simply referred to as cursor), a to-be-thrown object selection UI (user interface) 204, and an operation character information image 205 are displayed. Each player character is an object that can be operated on the basis of an operation input by a player. Meanwhile, each companion character 202 is an object that cannot be operated directly by a player. The companion characters 202 basically move following movement of the player characters. Here, the game has a concept of a "party". The "party" can be composed of one "leader" and a plurality of "members". The party needs at least one "leader", but the number of "members" may be 0. That is, there can be a party composed of only a "leader". Then, among the above three player characters 201, any player character can be a "leader". The other player characters 201 that are not a "leader" become "members", or become "leaders" of other parties. In addition, the companion characters 202 are included as "members". The companion characters 202 are scattered on a game field, and the player can add determined companion characters 202 to the party by performing a predetermined operation. In the game, the characters in the "party" basically move together as a unit. The game is a game that proceeds using the companion characters 202 in various situations.

The cursor 203 is an object that is displayed at a position away from the position of the player character 201 by a predetermined distance at the movement direction side of the player character 201, and has a role as an aiming point. Although will be described later, the companion character 202 can be "thrown" to a spot at which the cursor 203 is present, in the game. In addition, the to-be-thrown object selection UI 204 is a UI for selecting an object to be thrown. The to-be-thrown object selection UI 204 will be described later. The operation character information image 205 indicates the player characters 201 present in the same party and indicates the currently operated player character. Although will be described later, the player can operate either one of the three player characters as an operation target in the game. In addition, the operation target can be switched.

Moreover, although not shown, various types of information regarding the game such as a mini map image and an image indicating carried items and the number of the items are also displayed on the game screen.

In the game, motions that can be made by the player characters 201 include a motion of "throwing" and a motion of "whistling". The motion of "throwing" is a motion of throwing the companion character 202 within the party toward the spot of the cursor 203. The spot of the cursor 203 is a position away by a predetermined distance or longer from the position of either one of the player characters 201A to 201C that is currently an operation target. Thus, the motion of "throwing" can also be considered as a process of moving the companion character 202 to a spot away from the player character 201 by the predetermined distance or longer. The thrown companion character 202 performs various actions in accordance with various objects that are present near the location to which the companion character 202 has been thrown. For example, when an "enemy character" is present near the location to which the companion character 202 has been thrown, the companion character 202 attacks the enemy character. In addition, when a "material object" or a "food object" is present near the location to which the companion character 202 has been thrown, the companion character 202 makes an action of carrying the object to a place that is preset as a "base" on the game field. Regarding an object to be thrown, the player can also throw the player character 201 that is a "rear character" described later. Then, by throwing the "rear character", the player can create another party including the thrown rear character as a "leader". Creating another party by throwing the "rear character" as described above is referred to as "division" of the party. Operations for the division will be described separately later.

Meanwhile, the motion of "whistling" is a motion for controlling the structure of the party. Specifically, the companion characters 202 that are scattered on the game field can be caused to join the own party, or the party can be broken up, in accordance with the manner of whistling. Control for joining and breakup of the party will be described separately later.

In the game, several types of companion characters having different characteristics and abilities are prepared as the companion characters 202. In FIG. 8 described above, the differences in type are shown by differences in color between the companion characters 202. Actions that are performed by the companion characters 202 that are thrown as described above are different depending on the types thereof. Also, regarding attack actions, attacking power is different depending on the type, or a certain type of companion character 202 provides an abnormality state (e.g., a poisoned state or the like) to an enemy character. Thus, the player plays while considering which type of companion character 202 is appropriate to be thrown, in accordance with the object that is present near the destination of throwing. Operations for selecting a companion character or the like to be thrown will be described later.

Meanwhile, in the game, the three player characters 201A to 201C are present as described above. In the case of play by a single player, either one of these player characters can be directly operated by the player. The player can also switch the player character 201 that is an operation target. That is, in the case of play by a single player, the player can play while switching the three player characters. In addition, in the case of later-described play by two players, two of the three player characters 201 can be operated by the respective players. For example, the case where the player character 201A and the player character 201B are present in the same party and the player character 201C is present in another party is assumed. In this case, a first player can operate the player character 201A, and a second player can operate the player character 201B. In addition, since an operation target can be switched during play, the second player can switch the own operation target from the player character 201B to the player character 201C during play. Furthermore, thereafter, the first player can switch the own operation target from the player character 201A to the player character 201B. That is, the operation target can be switched to the player character 201 that is not an operation target. It should be noted that, in the exemplary embodiment, the player character to which the operation target is switched may be a player character within the same party, or may be a player character within another party. In another embodiment, for example, the operation target may be switchable to only a player character within another party.

When such switching occurs, basically, a virtual camera is controlled as appropriate such that the player character 201 that is an operation target is displayed substantially at the center of the screen. For example, virtual cameras corresponding to the respective player characters are prepared (that is, there are three virtual cameras in total), and control of switching a virtual camera to be used and the like are performed in accordance with the above switching operation. In addition, in another example, a virtual camera may be prepared for each player, and parameters such as the position and the direction of the virtual camera may be changed in accordance with the above switching operation such that the player character 201 that is an operation target is displayed substantially at the center of the screen. That is, a process in which one virtual camera is moved in accordance with change of an operation target may be performed.

Figure 9:
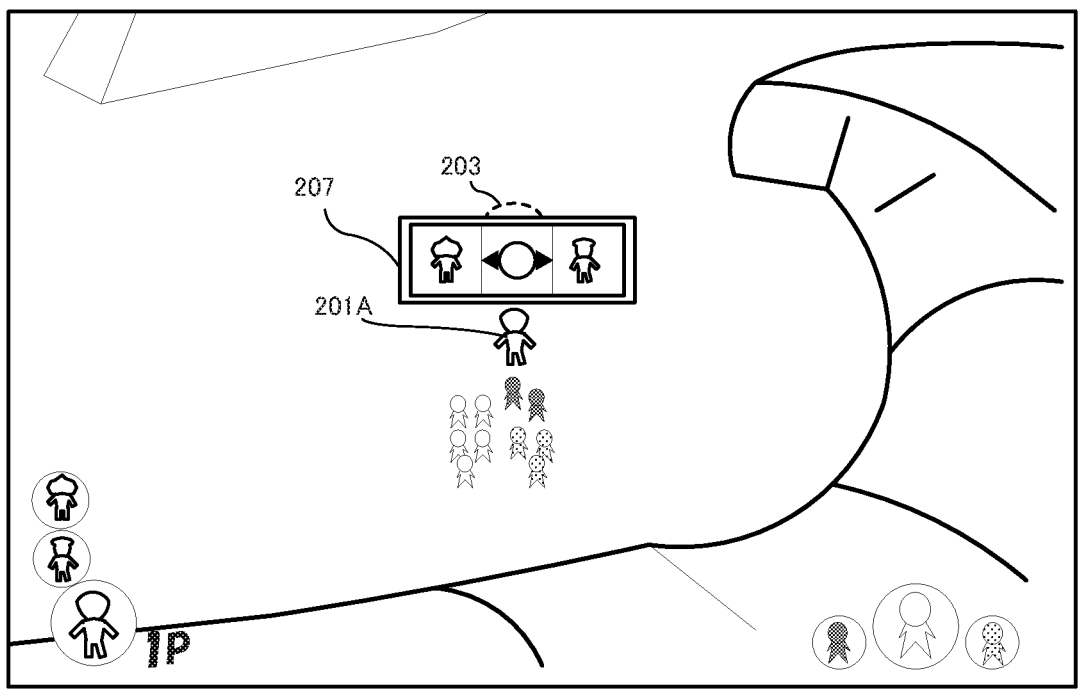
FIG. 9 shows a non-limiting example of the game screen according to the embodiment.
Figure 10:
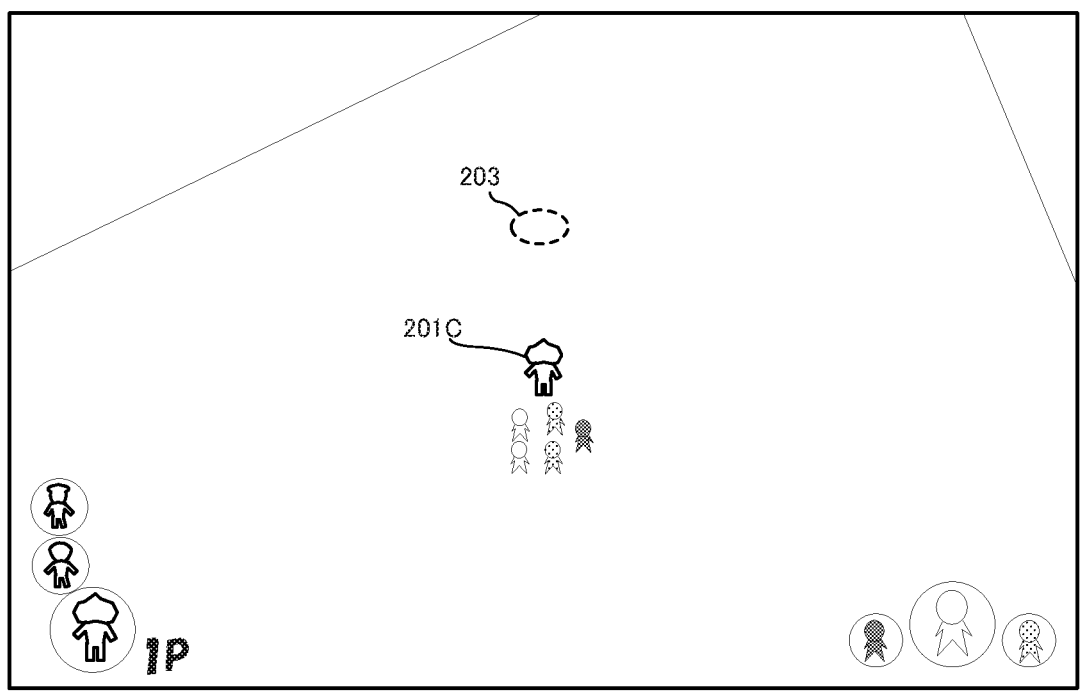
FIG. 10 shows a non-limiting example of the game screen according to the embodiment.

FIGS. 9 and 10 each show an example of a screen when switching a character in the case of play by a single player. FIG. 9 shows a state where the current operation target is the player character 201A. In addition, FIG. 9 shows a state where only the player character 201A is present as a player character within a party. Each of the player characters 201B and 201C is waiting at another place that is not displayed on the screen, as another party. For example, the case where the player switches the operation target to the player character 201C in this state is considered. In this case, when the player performs a predetermined operation for character switching, for example, presses the Y-button 56, a character switching menu 207 is displayed so as to be superimposed on the current game screen during play as shown in FIG. 9. In the character switching menu 207, images of switchable player characters are displayed. In this state, for example, by tilting the analog stick 32 rightward or leftward while pressing the Y-button 56 and then separating the finger from the Y-button 56, the player can switch the operation target to the player character 201 corresponding to the direction of the tilt. At this time, the character switching menu 207 is deleted from the screen. In the state in FIG. 9, for example, when the player tilts the stick 32 leftward while pressing the Y-button 56 and then separates the finger from the Y-button 56, the player can switch the operation target from the player character 201A to the player character 201C as shown in FIG. 10. In addition, the operation target may be switched by merely tilting the stick 32 while pressing the Y-button 56. With the switching, a game screen corresponding to the player character 201C is displayed as the game screen. Moreover, the position of the cursor 203 is also changed from a position on a straight line along the movement direction of the player character 201A to a position on a straight line along the movement direction of the player character 201C.

In the following description, the player character 201 that is an operation target of the first player is referred to as "1P character". In addition, the player character 201 that is an operation target of the second player is referred to as "2P character". Moreover, in the above party, either one of the above three player characters is set as a "leader". In the case of play by a single player, the 1P character is the leader of the party. That is, the leader moves in accordance with an operation of the player, and the other player characters 201 and the companion characters 202 within the party move following the leader. In the following description, the player characters 201 that are not a leader and become members of the party are referred to as "rear characters". The player character 201 that is set as a leader is referred to as "leader character".

Here, regarding the above motion of "throwing", the leader character can "throw" not only the companion characters 202 within the own party but also the rear characters in the game. Even when the rear character is an operation target of either player, the rear character can be an object to be "thrown". In other words, regarding the rear character, the position of the rear character can be forcedly moved by "throwing" the rear character regardless of presence/absence of an operation by the player. Thus, a motion described below is also enabled. First, in the case of play by a single player, for example, when the player character 201A is a 1P character, by "throwing" the player character 201B, the player character 201B can be removed from the party and caused to wait at a spot to which the player character 201B has been thrown. In addition, in accordance with this, another party including the player character 201B as a "leader" is created. That is, the party can be divided by "throwing" the player character 201B. Thereafter, by performing the above character switching operation and switching the 1P character from the player character 201A to the player character 201B, the operation target can be switched to the player character 201B. In this case, the party including the player character 201B as a leader character (however, no companion characters 202 are present therein at this time point) is operated. In addition, in the case of play by two players, for example, by the 1P character, which is a leader character, throwing the 2P character, the party can be divided such that another party including the 2P character as a leader character is created. Thus, in the case of play by two players, when the 1P character and the 2P character individually act in different parties, each of the 1P character and the 2P character is a leader character. Meanwhile, when the 1P character and the 2P character are present in the same party, either one of the 1P character or the 2P character is a leader character, and the other is handled as a rear character. In the following, in the description in which a leader character and a rear character need to be distinguished from each other, for example, when the 1P character is a leader character and the 2P character is a rear character, the 1P character and the 2P character are referred to as "1P character (leader)" and "2P character (rear)", respectively.

It should be noted that a rear character cannot throw a leader character. Thus, when the 1P character is a leader and the 2P character is a rear character within the same party, the 2P character cannot throw the 1P character. In addition, the rear character or each companion character within the same party can be thrown, and the player character 201 and the companion characters 202 within another party cannot be thrown.

Next, control performed during play of the game by two players will be described. First, flow in which play by two players is started from a state of play by a single player will be described, and then an outline of screen control and the like in the case of play by two players will be described.

[Start of Play by Two Players]

The game has a game mode called a "story mode" in which the game is caused to proceed along a predetermined scenario. Here, the case where this game mode is initially played by a single player and then the play is switched to play by two players in the middle, will be described as an example. First, in a state where the game screen during play by a single player as shown in FIG. 8 described above is displayed, the first player performs an operation of opening an "option menu". Furthermore, the first player selects an item of "Play by two persons" from the option menu. That is, an operation indicating that the play is changed from play by a single player to play by two players (play by two players is started) is performed.

Figure 11:
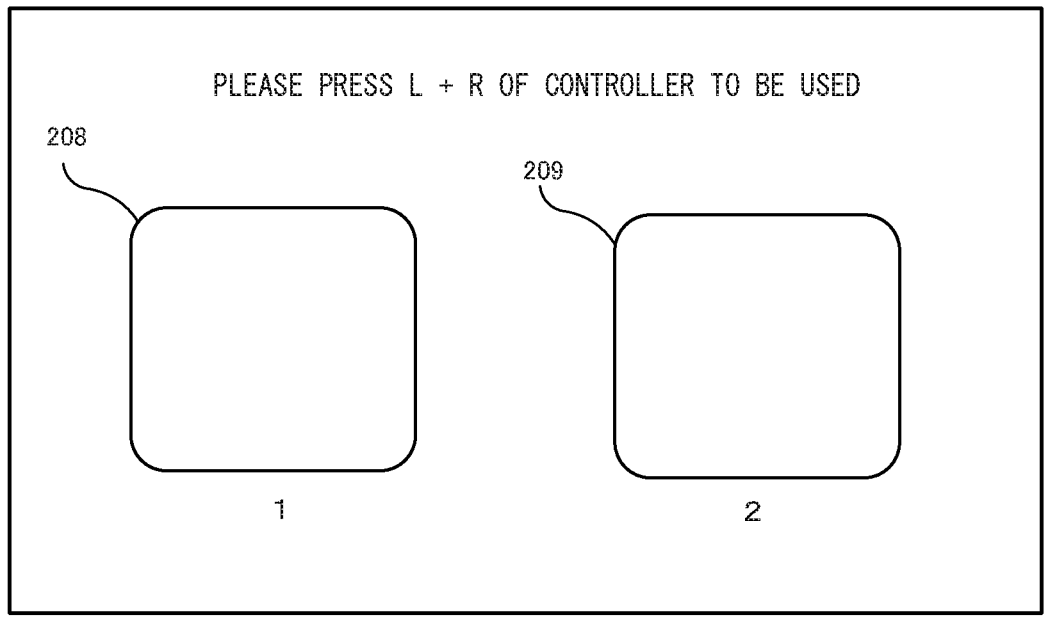
FIG. 11 shows a non-limiting example of the game screen according to the embodiment.

When the above operation has been performed, a screen for setting a controller to be used by each player is displayed as shown in FIG. 11. In FIG. 11, a controller frame 208 for the first player is displayed at the left side of the screen, and a controller frame 209 for the second player is displayed at the right side of the screen. In addition, a message, "Please press L+R of a controller to be used", is also displayed in an upper portion of the screen. Each of the first player and the second player can inform the main body apparatus 2 about a controller to be used by the player, by pressing L+R of the controller to be used by the player. Specifically, the pressed buttons and a controller ID or the like indicating the controller are transmitted from the controller to the main body apparatus 2. The main body apparatus 2 recognizes the controllers to be used by the first player and the second player by identifying the pressed buttons and the controller IDs. Images indicating the identified controllers are displayed in the controller frames 208 and 209.

Here, a supplemental description of types and use forms of controllers will be given. As described above, the game system 1 includes two controllers, that is, the left controller 3 and the right controller 4. In the game, the two controllers, that is, the left controller 3 and the right controller 4, can be used as one set. In other words, the left controller 3 and the right controller 4 can be considered as one unified controller and used. In this case, for example, the first player can perform operations for the game while holding the right controller 4 with the right hand and the left controller 3 with the left hand. In addition, in this case, the player holds each controller in the orientation in which the controller is vertically long when seen from the player's perspective (hereinafter, this holding manner is referred to as "vertically holding").

Figure 12:
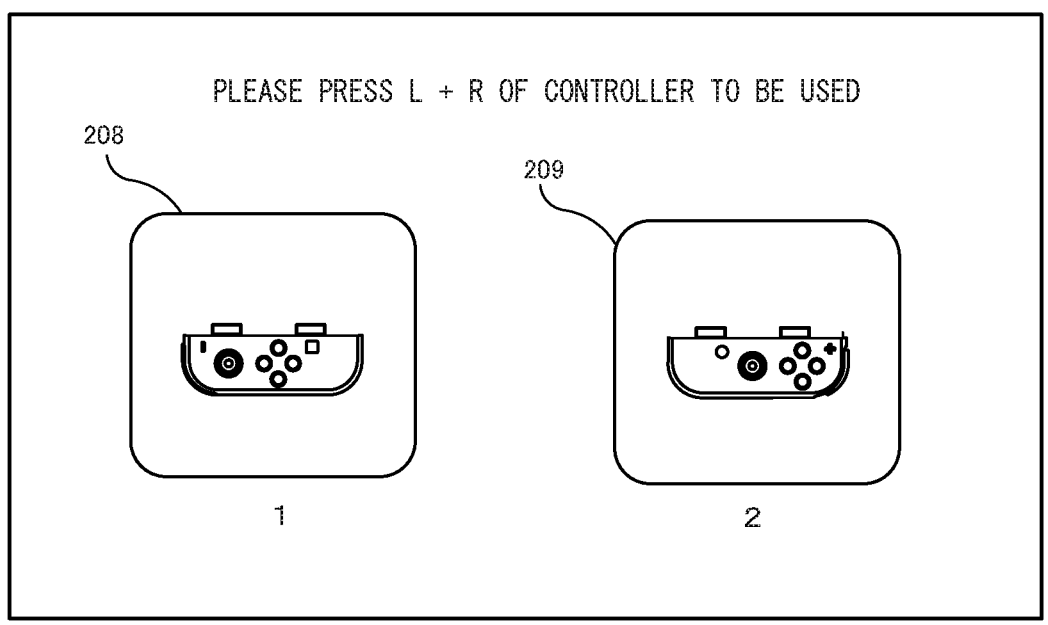
FIG. 12 shows a non-limiting example of the game screen according to the embodiment.

In addition, in the game, the left controller 3 and the right controller 4 can be handled as separate controllers. For example, in the case of play by two players, the first player can play using the left controller 3, and the second player can play using the right controller 4. That is, this use form is a form in which each player uses only either one of the left controller 3 or the right controller 4. FIG. 12 shows an example of a controller setting screen in the case where the first player and the second player individually use the left controller 3 and the right controller 4. In FIG. 12, an image of the left controller 3 oriented such that the left controller 3 is horizontally long is displayed in the controller frame 208 for the first player, and an image of the right controller 4 oriented such that the right controller 4 is horizontally long is displayed in the controller frame 209 for the second player. When the left controller 3 and the right controller 4 are individually used by the two players as described above, each player uses the controller in the orientation in which the controller is tilted by 90 degrees from the "vertically held" state. That is, each player holds the controller in the orientation in which the controller is horizontally long when seen from the player's perspective (hereinafter, this holding manner is referred to as "horizontally holding"). In this case, each controller is used as a controller having a smaller number of operation sections such as a stick and buttons as compared to the case where the left controller 3 and the right controller 4 are used in a unified manner. Thus, also in the game process, assignment of buttons is made different in consideration of such a difference in number of operation sections and such a difference in orientation.

Figure 13:
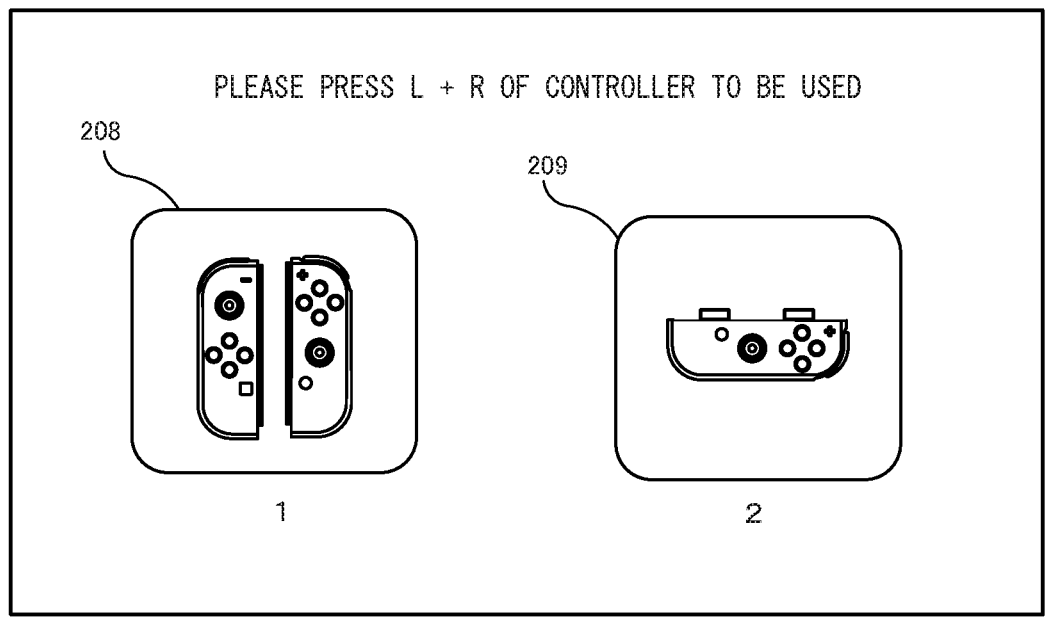
FIG. 13 shows a non-limiting example of the game screen according to the embodiment.
Figure 14:
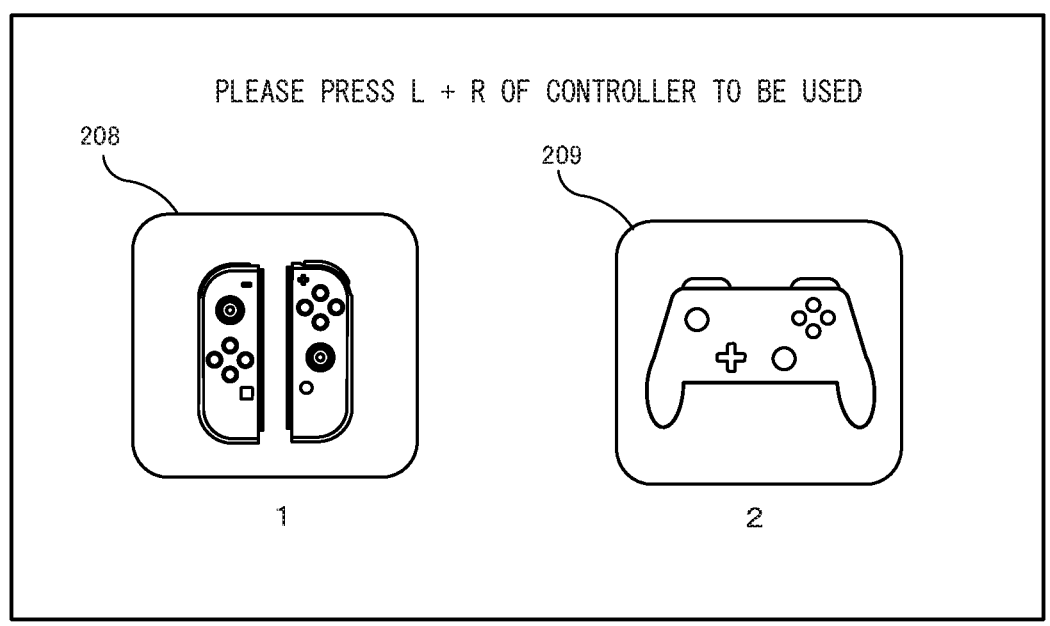
FIG. 14 shows a non-limiting example of the game screen according to the embodiment.

A combination of controllers to be used by the first player and the second player may be, for example, a combination described below. For example, as shown in FIG. 13, the first player may use the left controller 3 and the right controller 4 in a unified manner, and the second player may use a right controller 4 that is different from the right controller 4 used by the first player. In addition, as shown in FIG. 14, the second player may use another type of game controller that is different from the left controller 3 and the right controller 4.

Figure 15:
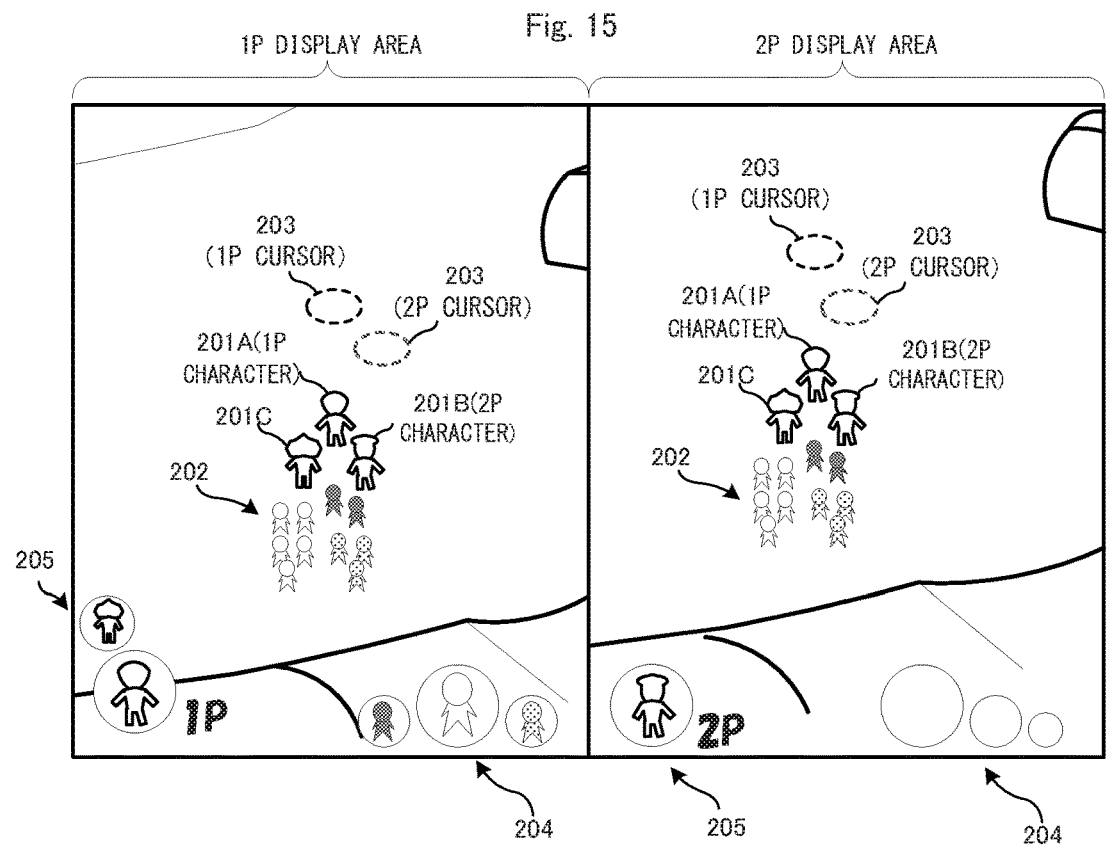
FIG. 15 shows a non-limiting example of the game screen according to the embodiment.

As described above, when setting of the controller to be used by each player has ended, play by two players is started. FIG. 15 shows an example of a game screen immediately after start of play by two players. In FIG. 15, the display area of the screen is divided laterally into two areas. The first player plays in the left display area, and the second player plays in the right display area. Hereinafter, the left display area in such a divided screen is referred to as "1P display area", and the right display area in such a divided screen is referred to as "2P display area". In addition, in the screen, the 1P character is the player character 201A, and the 2P character is the player character 201B. Moreover, cursors 203 are displayed above the 1P character and the 2P character. That is, cursors 203 corresponding to the 1P character and the 2P character, respectively, are displayed during play by two players. Hereinafter, the cursor 203 corresponding to the 1P character is referred to as "1P cursor", and the cursor 203 corresponding to the 2P character is referred to as "2P cursor". The 1P cursor and the 2P cursor have different colors, so that it is easy to recognize which cursor is the cursor for the 1P character or the cursor for the 2P character. Control of movement of the cursors will be described separately later.

In addition, the to-be-thrown object selection UI 204 and the operation character information image 205 are displayed in each of the "1P display area" and the "2P display area". The to-be-thrown object selection UI 204 and the operation character information image 205 are elements that change for each player, and thus are displayed in each display area.

Figure 16:
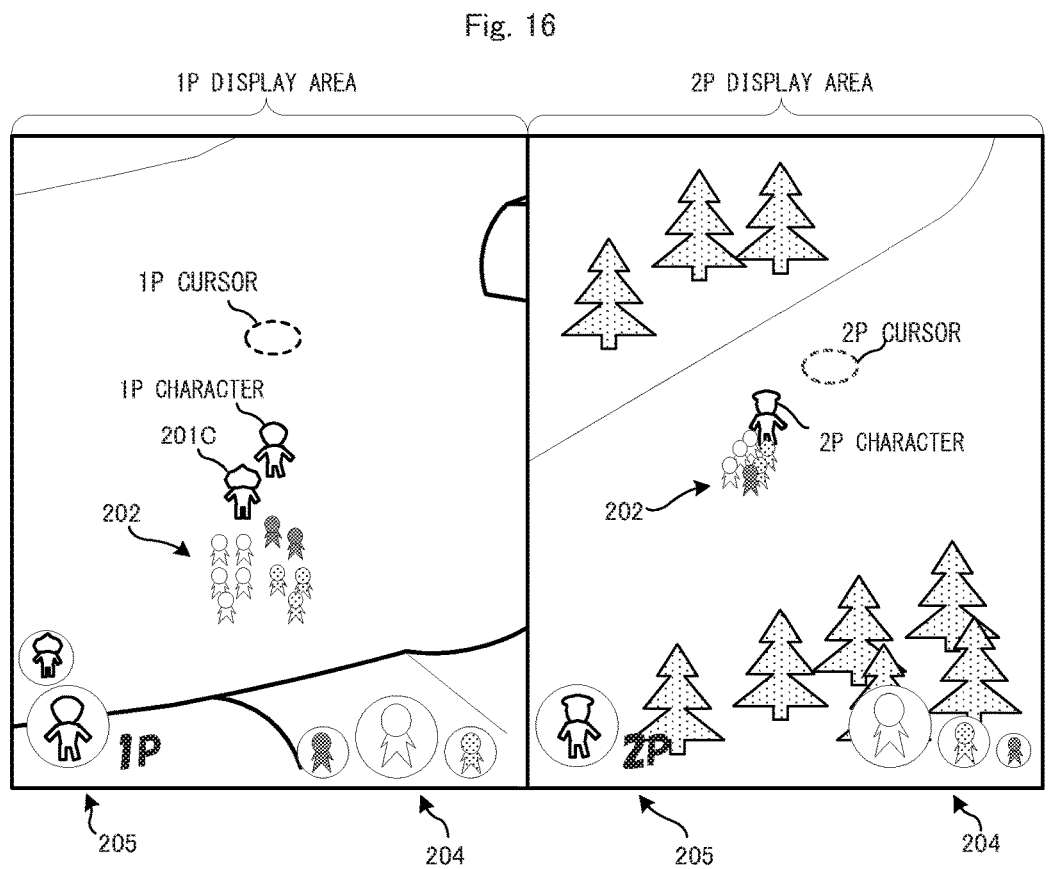
FIG. 16 shows a non-limiting example of the game screen according to the embodiment.

In the game, in a state immediately after start of play by two players, the 1P character and the 2P character are in different parties. That is, play by two players is started in a state where both the 1P character and the 2P character are leader characters. In addition, regarding the party of the 2P character, at this time point, only the 2P character is present. From the state in FIG. 15, the second player can operate the 2P character such that the 2P character acts separately from the 1P character. Then, the 2P character can individually add companion characters 202 to the own party. FIG. 16 shows an example of a screen in a state where the 2P character moves to a place different from that in FIG. 15 and some companion characters are added to the own party during the movement. As described above, the player characters 201 and the parties can be separately operated using the divided screen.

[Joining, Division, and the Like of Party]

Next, "joining", "division", and "breakup" of the above party and screen control accompanying them will be described. In the game, screen control in which divided screen display and single-screen display are selectively used depending on the state of the party is performed.

First, "joining" of the party will be described. As described above, immediately after start of play by two players, different parties are present. In the game, such different parties can be "joined" together into one party. The parties can be joined by performing a predetermined "joining operation". In the exemplary embodiment, the parties can be joined together into one party by performing an operation for bringing the 1P character and the 2P character in the different parties into contact with each other. In this case, regarding which character becomes a leader of the party, for example, control in which the "contacting" character adds the party of the "contacted" character to the own party may be performed, or control opposite thereto may be performed. In another embodiment, for example, in a state where the 1P character and the 2P character are close to each other to some extent, by performing an operation for either character to "whistle" in a predetermined pattern, the party of the other character may be joined to the party of the character that has whistled.

In the state of FIG. 15 described above, the second player performs the predetermined joining operation. Accordingly, control in which the 2P character is added to the party of the 1P character is performed. Furthermore, as a result of joining of the 1P character and the 2P character, the display form of the screen is changed. Specifically, the display form is changed from the divided screen to a single screen. FIG.

Figure 17:
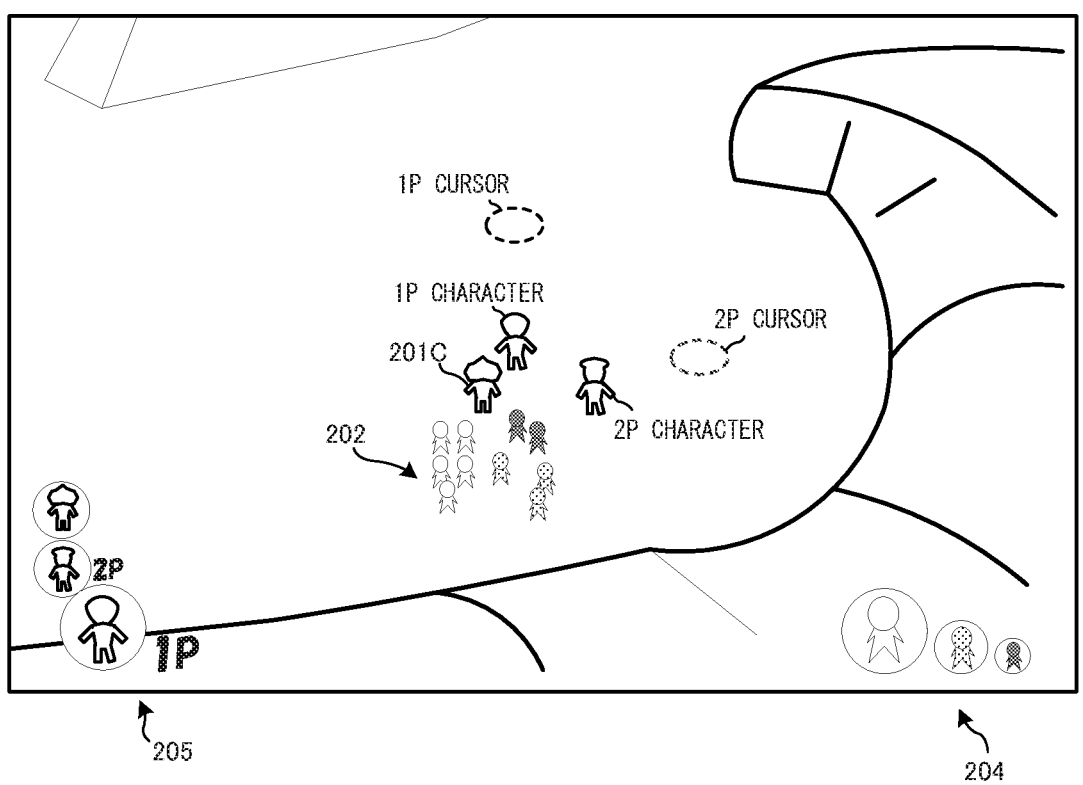
FIG. 17 shows a non-limiting example of the game screen according to the embodiment.

17 shows an example of a game screen in a state where the 1P character and the 2P character are joined together. In FIG. 17, the game screen is displayed using one display area (the entire screen in this example). In the following description, a game screen in the state where the 1P character and the 2P character are joined together is referred to as "joining screen". In addition, a screen in a state where the 1P character and the 2P character act in different parties is referred to as "division screen". Moreover, an operation mode in the joining screen is referred to as "joining mode", and an operation mode in the "division screen" is referred to as "other party mode".

In the joining screen shown in FIG. 17, the 1P character and the 1P cursor corresponding to the 1P character are displayed, and the 2P character and the 2P cursor corresponding to the 2P character are also displayed. In addition, regarding the to-be-thrown object selection UI 204 and the operation character information image 205, in the case of the above division screen, one to-be-thrown object selection UI 204 and one operation character information image 205 are displayed in each display area, but, in the joining screen, only one to-be-thrown object selection UI 204 and one operation character information image 205 are displayed. The to-be-thrown object selection UI 204 is shared by the first player and the second player (the layout of the to-be-thrown object selection UI 204 will be described separately later). Moreover, in the operation character information image 205, images indicating the player characters 201 within the party are displayed so as to be substantially vertically aligned. Letters "1P" are displayed at the right side of the image of the 1P character, and letters "2P" are displayed at the right side of the image of the 2P character, so that it is easy to recognize the player character operated by each player.

Figure 18:
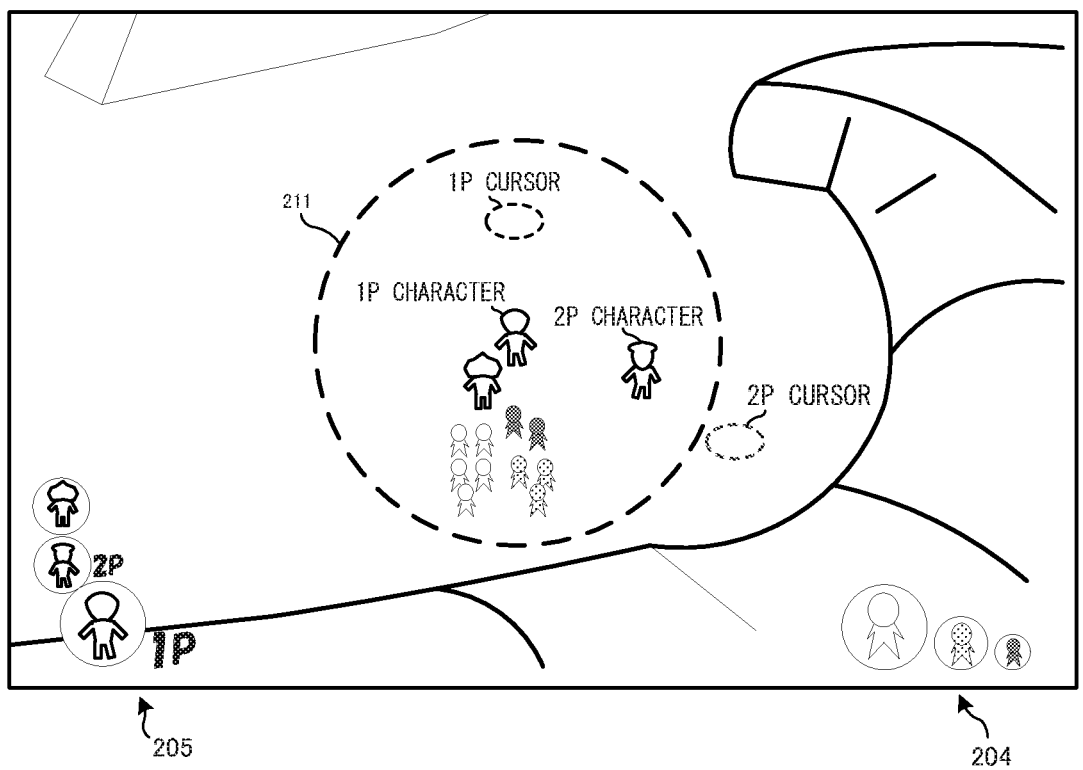
FIG. 18 shows a non-limiting example of the game screen according to the embodiment.

Here, a movement range of and possible operations on a rear character in the case where the operation target is the rear character will be described. FIG. 18 is a diagram showing a concept of the movement range of the rear character. In a circular range 211 centered at the 1P character (leader), the 2P character (rear) is freely movable on the basis of an operation by the second player. The range 211 is, for example, a range where the companion character 202 reaches when thrown by the leader character. When the 2P character (rear) moves away to such a distance that the 2P character comes out of the range 211, movement control is performed such that the 2P character (rear) automatically follows 1P character (leader), regardless of presence/absence of an operation for moving the 2P character, and the 2P character (rear) is controlled such that the distance to the 1P character (leader) is automatically maintained. In other words, there is the range 211 moving with the 1P character (leader), and movement control is performed on the 2P character (rear) such that the 2P character (rear) cannot come out of the range 211.

Regarding movement of the 2P character (rear), the above limitation is provided. However, regarding a motion of "throwing", the second player can freely perform such a motion. In other words, while the 2P character is a rear character, the second player can leave movement of the 2P player to the first player and concentrate on "throwing".

Next, operations, etc., for division and breakup of the party will be described. In the joining mode, the party can be divided or broken up by performing an operation described below. Here, the case where the 1P character is a leader character and the 2P character is a rear character is taken as an example. First, in the joining mode, when the first player performs a "breakup operation", the party can be broken up.

In this case, the 1P character and the 2P character are separated to be in different parties (when there is a rear character that is not the 2P character, this rear character remains in the party of the 1P character). In addition, each party includes no companion characters 202 present therein. In addition, accordingly, the operation mode is switched to the "other party mode", and the screen is also changed to the above "division screen".

Meanwhile, in the joining mode, when the second player performs the "breakup operation", only the 2P character is removed from the party and caused to form a new party, whereby the party can be divided. In this case as well, the operation mode is switched to the "other party mode", and the screen is also changed to the above "division screen". Regarding the party structure, the party of the 1P character has a party structure in which only the 2P character is eliminated from the state so far. The party of the 2P character includes no companion characters 202 present therein.

Figure 19:
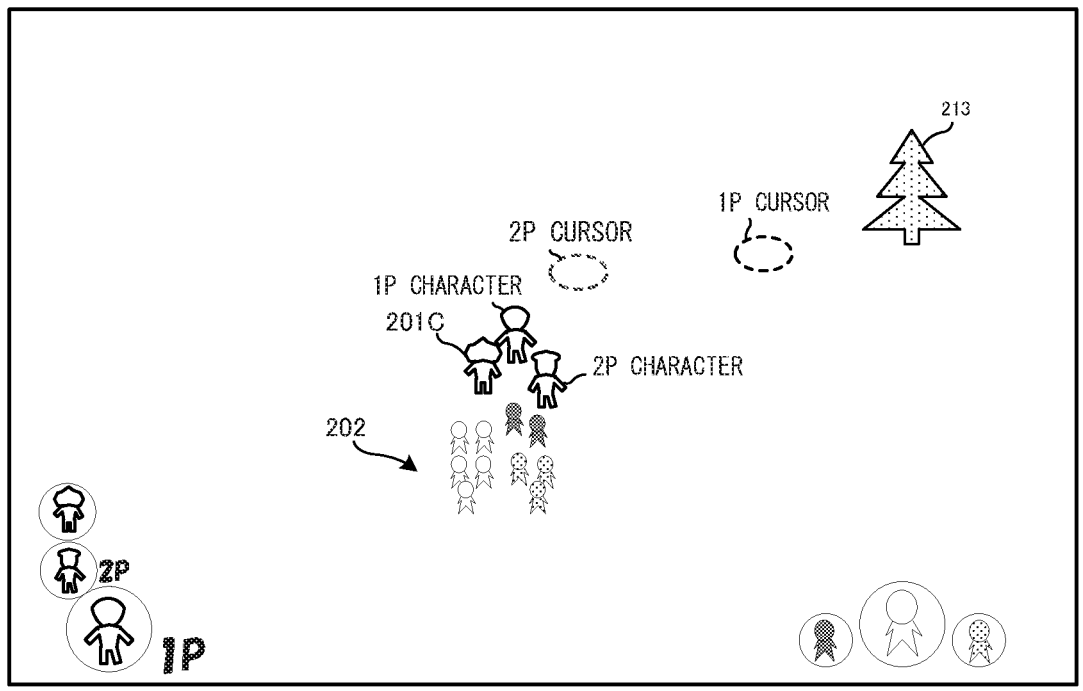
FIG. 19 shows a non-limiting example of the game screen according to the embodiment.
Figure 20:
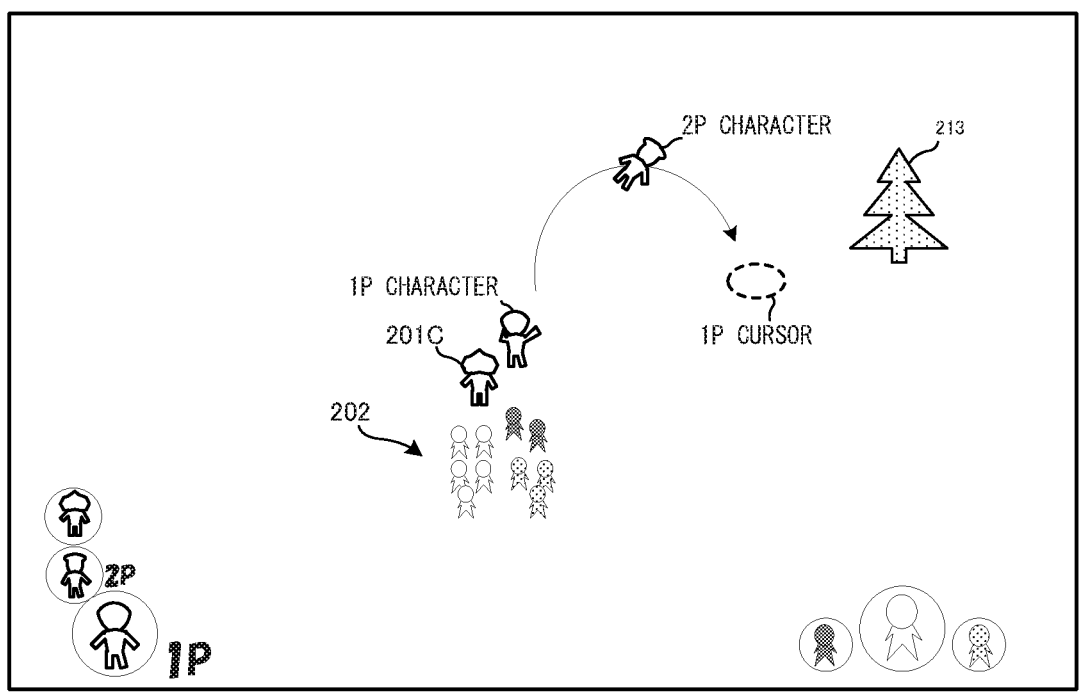
FIG. 20 shows a non-limiting example of the game screen according to the embodiment.
Figure 21:
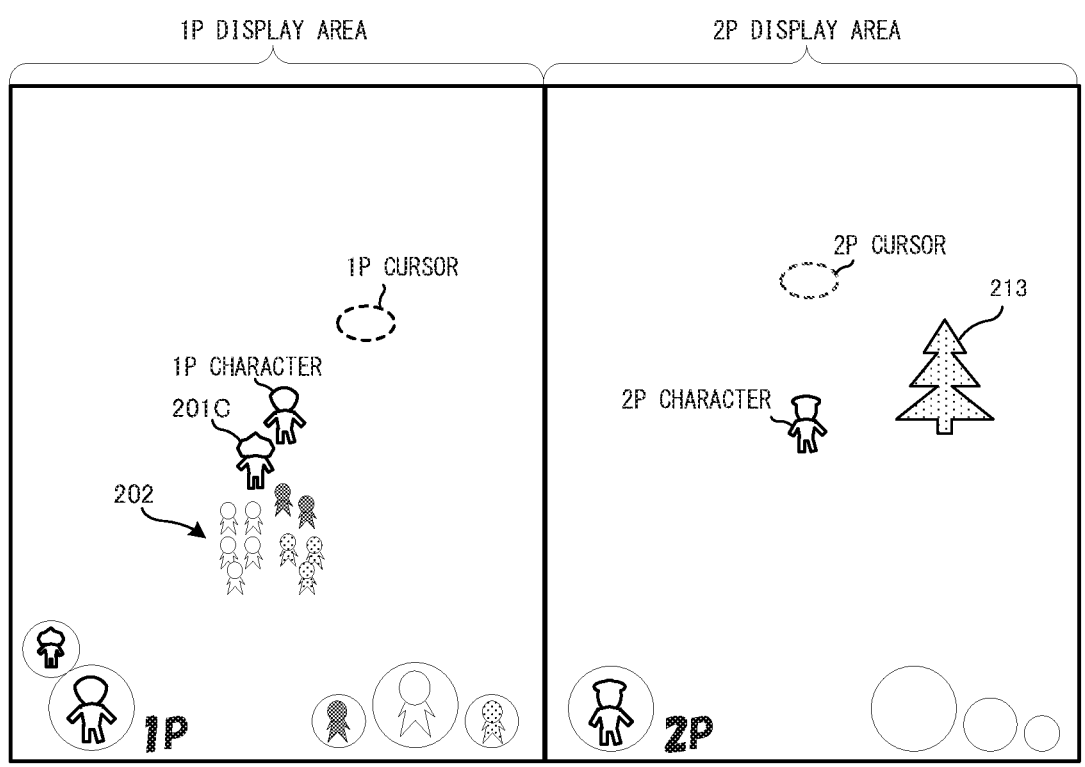
FIG. 21 shows a non-limiting example of the game screen according to the embodiment.

Moreover, in the joining mode, also by the 1P character (leader) "throwing" the 2P character (rear), only the 2P character can be removed from the party and caused to form a new party. That is, an operation for throwing the 2P character (rear) can also be considered as one kind of breakup operation. For example, in the state of a joining screen shown in FIG. 19, the 1P character (leader) throws the 2P character (rear) to a location near a tree object 213 as shown in FIG. 20. In this case, the 2P character (rear) is removed from the party of the 1P character and set as a leader of a new party. Then, similar to the above, the operation mode is switched to the "other party mode", and the screen is also changed to the "division screen" as shown in FIG. 21. In addition, the party of the 2P character includes no companion characters 202 present therein.

Figure 22:
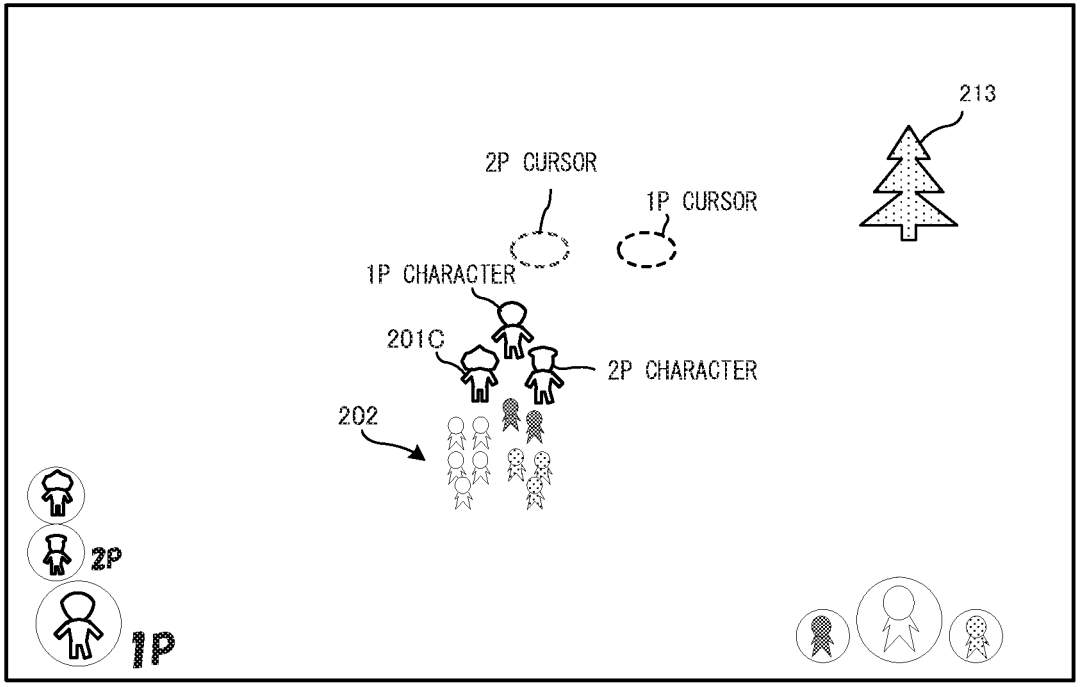
FIG. 22 shows a non-limiting example of the game screen according to the embodiment.
Figure 23:
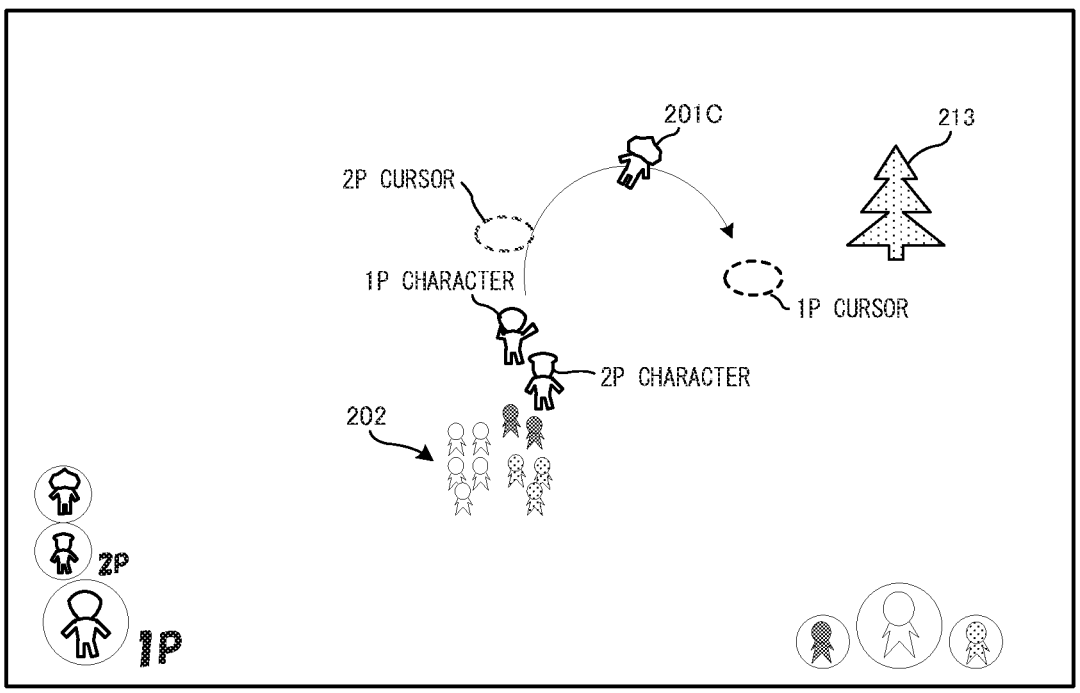
FIG. 23 shows a non-limiting example of the game screen according to the embodiment.
Figure 24:
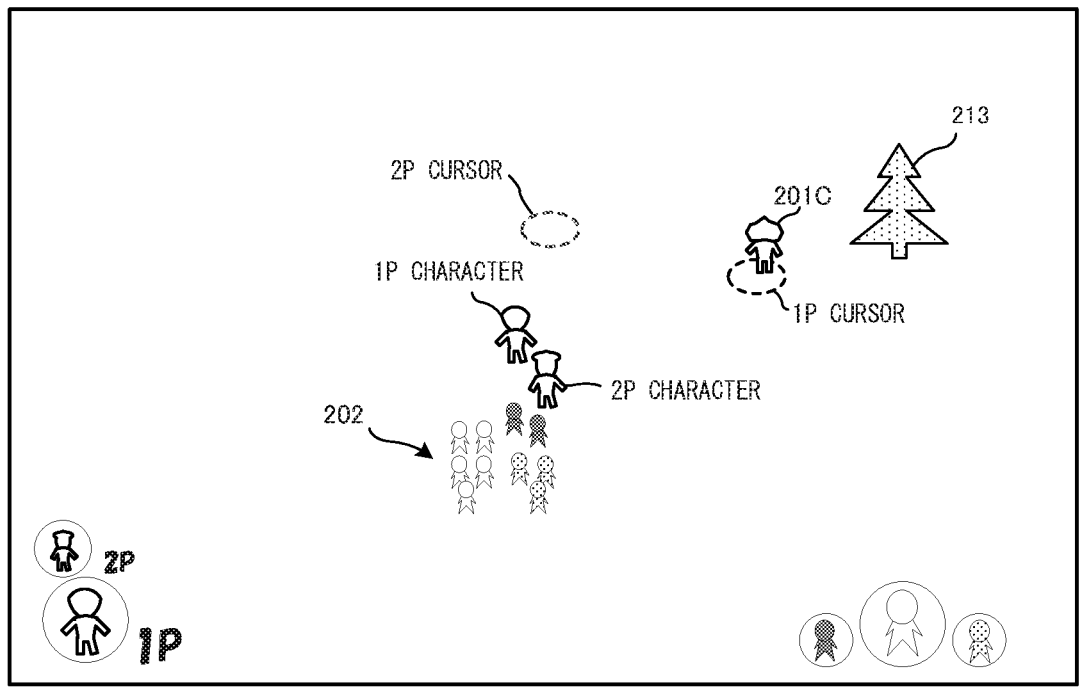
FIG. 24 shows a non-limiting example of the game screen according to the embodiment.

Furthermore, in addition to the above, when an operation described below is performed, the screen is switched from the joining screen to the division screen. For example, in a state of a joining screen shown in FIG. 22, the 1P character throws the player character 201C, which is not the 2P character (rear), to a location near the tree object 213 as shown in FIG. 23. In this case, the player character 201C is set as a leader of another party. However, a player that is in charge of operations is not assigned to the player character 201C, and thus the player character 201C waits near the tree object 213 as shown in FIG. 24.

Figure 25:
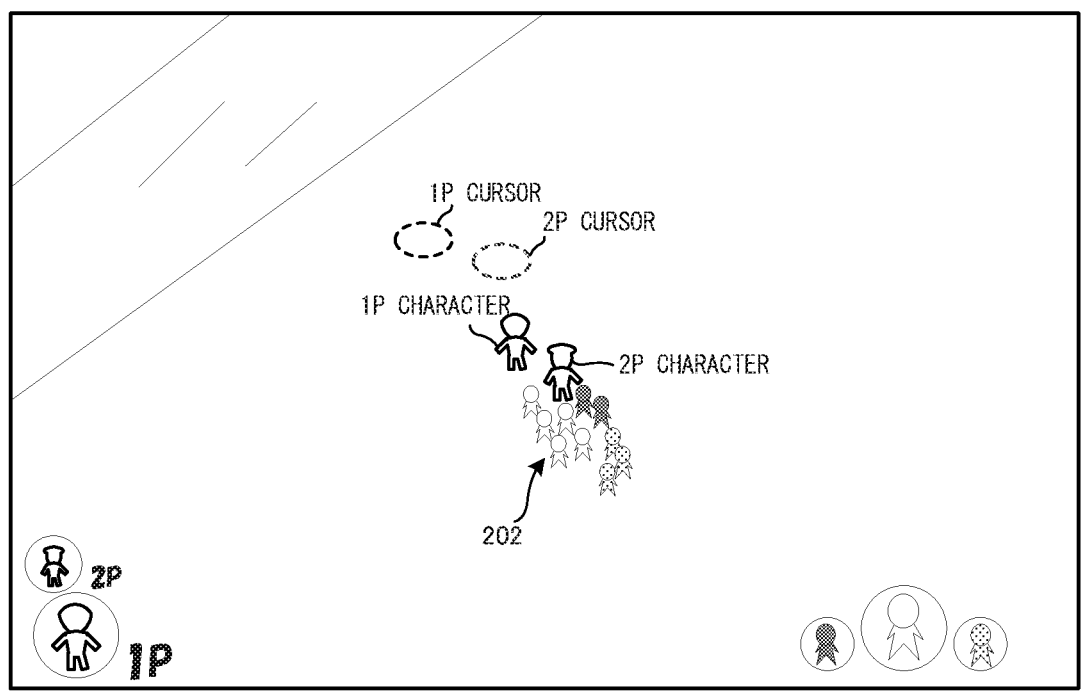
FIG. 25 shows a non-limiting example of the game screen according to the embodiment.
Figure 26:
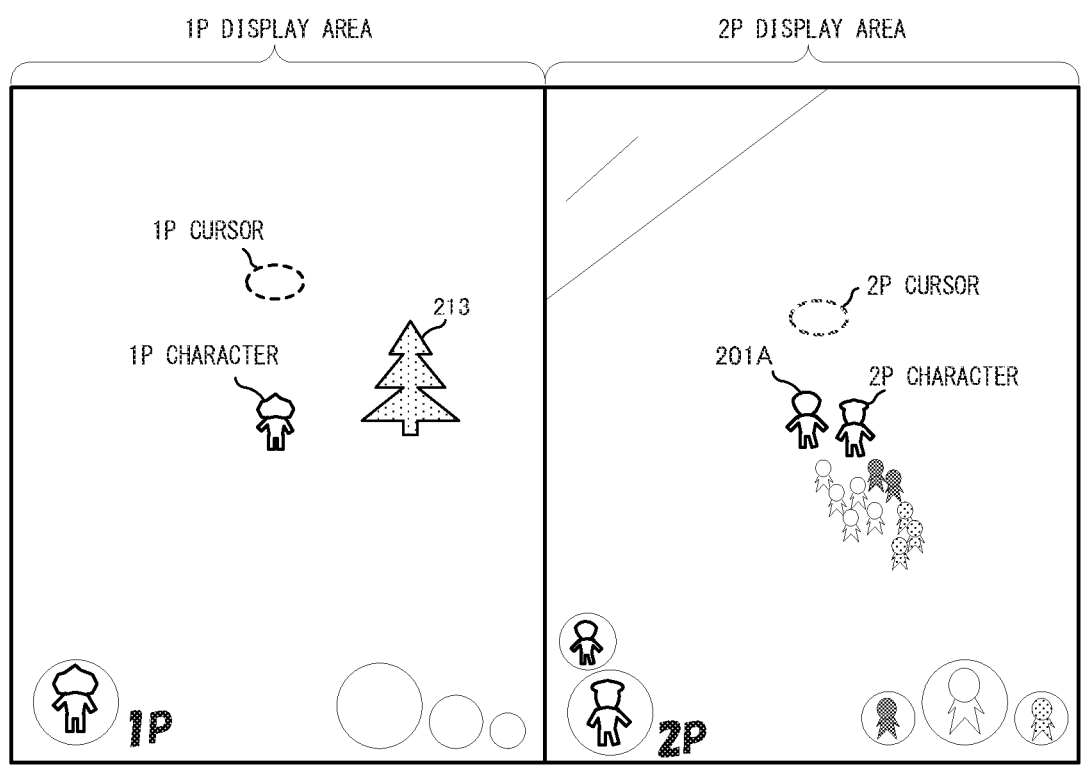
FIG. 26 shows a non-limiting example of the game screen according to the embodiment.

Thereafter, the party including the 1P character (leader) and the 2P character (rear) moves to another place as shown in FIG. 25. In this state, the first player performs an operation for switching the operation target as described above, and switches the operation target of the first player to the waiting player character 201C. In this case, as shown in FIG. 26, the screen is switched to the division screen, and the player character 201C is displayed as the 1P character in the 1P display area. In addition, the 2P character that has been a rear character so far is newly set as a leader character in the 2P display area. Moreover, the player character 201A that has been a leader character so far is set as a rear character. Then, the second player takes over the party structure and can operate the party.

In the game, as described above, the operation target can be switched, or the party can be joined or divided. When the party joining/division operation is performed as described above, switching between the joining screen and the division screen is seamlessly performed (that is, it is not necessary to perform operations for setting display or switching of the screen). In particular, in a game in which the frequency of occurrence of joining/division of a party as described above is high during play by two players, the convenience of each player can be enhanced by performing seamless screen switching in accordance with the state of the party of each player.

Here, an example of a screen representation performed when switching to the joining screen or the division screen will be described. In the exemplary embodiment, when the screen is switched from the joining screen to the division screen, for example, a representation in which the 2P display area enters the screen from the right side toward the left side so as to push the 1P display area, is performed. Accordingly, the width of the 1P display area gradually decreases and finally becomes half the original width. In addition, also during the representation, various parameters such as the position and the angle of view of the virtual camera are adjusted as appropriate such that the display position of the 1P character is maintained substantially at the center position of the 1P display area, and control of the virtual camera is also performed. The same applies to the virtual camera at the 2P character side. It should be noted that this representation is merely an example, and any representation may be performed as the screen representation when the screen is switched between the joining screen and the division screen.

[Cursor Control]

Next, control of the cursor 203 in the game will be described. In the game, the cursor 203 is basically located at a position shifted from the position of the player character 201 that is an operation target, by a predetermined amount in a direction along the direction (movement direction) of the player character 201. Hereinafter, this position is referred to as "cursor basic position". The cursor basic position is changed in accordance with an operation for moving the player character 201. The cursor 203 is seen to be constantly displayed at a forward position away from the operation target character by a predetermined distance when seen from the player's perspective. However, in the exemplary embodiment, the position of the cursor can be further finely adjusted on the basis of inputs to the above inertial sensors.

Figure 27:
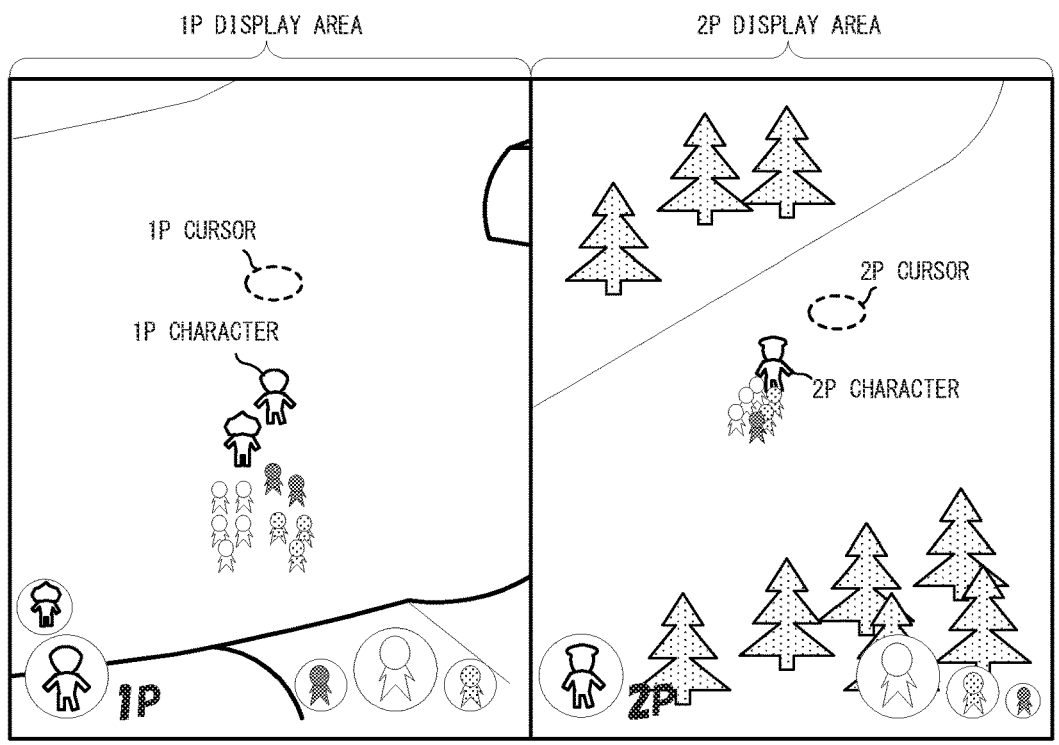
FIG. 27 shows a non-limiting example of the game screen according to the embodiment.
Figure 28:
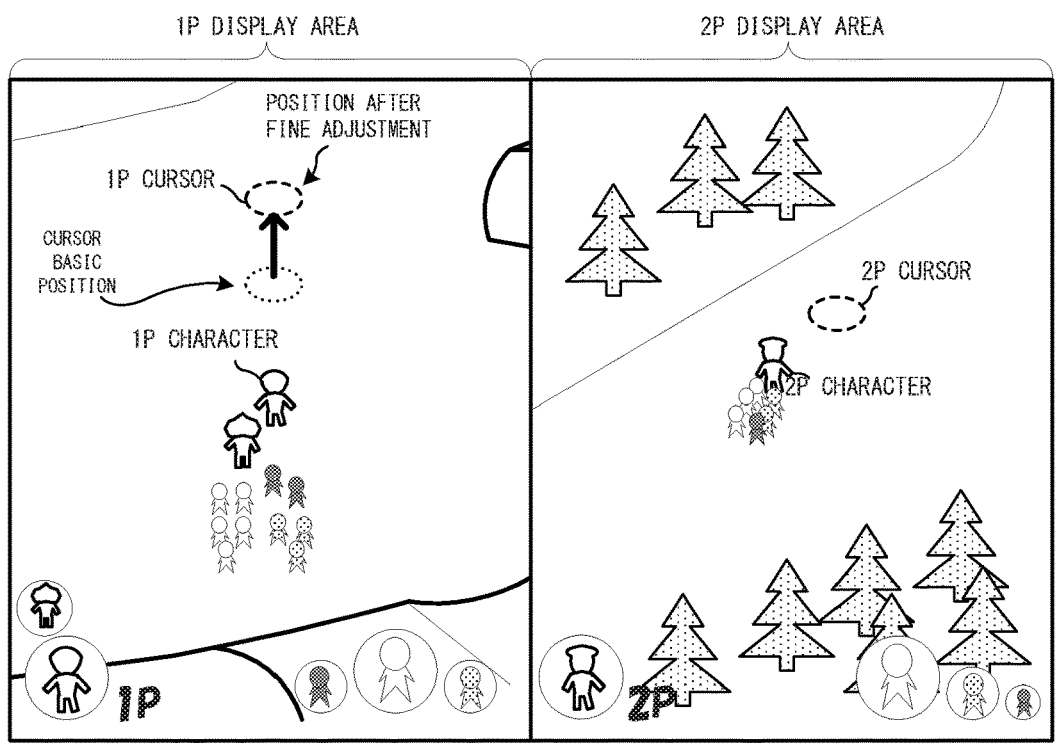
FIG. 28 shows a non-limiting example of the game screen according to the embodiment.

FIGS. 27 and 28 show an example of fine adjustment of the cursor position using the above inertial sensors. First, in a state shown in FIG. 27, the first player does not provide an input to a direction key or the like, and changes the orientation of the vertically held left controller 3 such that, for example, an end portion of the left controller 3 is slightly raised. In this case, for example, as shown in FIG. 28, the position of the 1P cursor can be slightly moved in the virtual game space toward the far side direction as seen from the 1P character. In addition, although not shown, for example, when the orientation of the left controller 3 is changed such that the left controller 3 is tilted rightward, the 1P cursor can be moved rightward. Similarly, by changing the orientation of the left controller 3 such that the left controller 3 is tilted leftward, the 1P cursor can be moved leftward. As described above, by changing the orientation of the left controller 3, the player can further move the position of the cursor 203 from the cursor basic position. As a result of fine adjustment of the cursor position, if the cursor position is a position that the companion character 202 cannot reach when the companion character 202 is thrown, the display color of the cursor is changed in order to indicate this.

Figure 29:
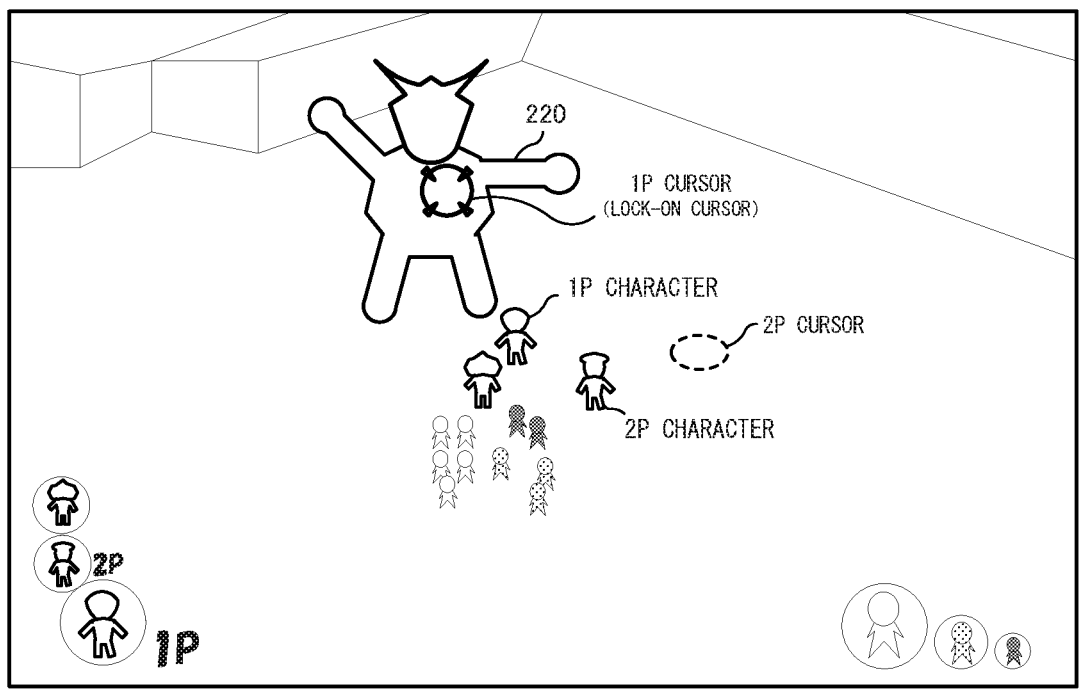
FIG. 29 shows a non-limiting example of the game screen according to the embodiment.

Meanwhile, in the game, the cursor can be caused to lock on a predetermined object. For example, when the cursor 203 is present near a predetermined enemy character, a lock-on state in which the cursor 203 is displayed corresponding to the position of the enemy character can be obtained by the player performing a predetermined "lock-on operation". FIG. 29 shows an example of a screen in a state where an enemy character is being locked on. FIG. 29 shows an example of the case of the "joining screen" and shows a state where the 1P character is locking on an enemy character 220. As an example, in a state where the 1P cursor is located near the feet of the enemy character 220, a state where the 1P character locks on the enemy character 220 (hereinafter, referred to as lock-on state) can be obtained by the first player pressing, for example, the ZR-button 61, as the "lock-on operation". It should be noted that the position at which the cursor is initially displayed when the lock-on operation is performed is defined in advance for each object. Hereinafter, this position is referred to as "lock-on reference position". In addition, an object that is locked on is referred to as "lock-on target".

Figure 30:
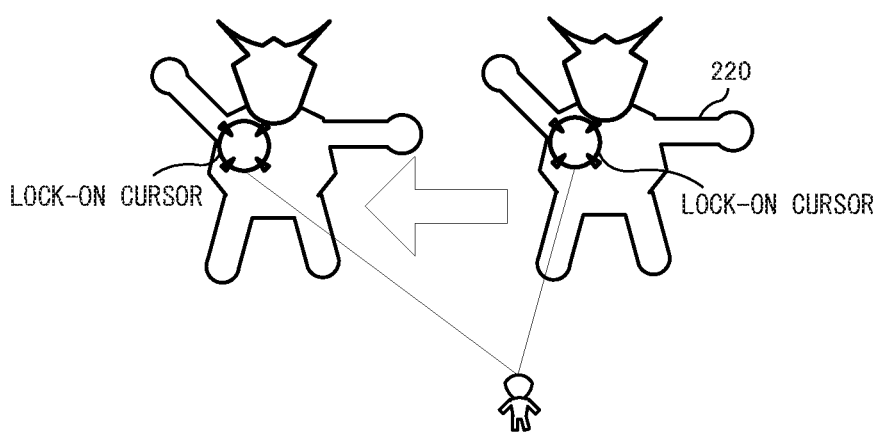
FIG. 30 is a diagram for explaining following movement of a lock-on cursor.

In addition, in the lock-on state, the display form of the cursor 203 is also slightly changed, for example, in order for the player to easily understand that the current state is the lock-on state. In FIG. 29, the display form of the 1P cursor is changed to an appearance like an aiming point. Hereinafter, the cursor, in the lock-on state, having a display form changed as described above is referred to as "lock-on cursor". In addition, when the enemy character 220 that is a lock-on target moves, the lock-on cursor moves following the movement of the enemy character 220. That is, the relative positional relationship between the lock-on cursor and the object that is a lock-on target does not change. FIG. 30 shows an example in which the lock-on cursor moves following the lock-on target. FIG. 30 shows an example in which, in a state where the lock-on cursor is aligned with a position near the right shoulder of the enemy character 220 that is set as the lock-on reference position, the enemy character 220 moves leftward. In this movement, the display position of the lock-on cursor moves leftward while the lock-on cursor is being maintained at the position near the right shoulder of the enemy character 220.

When the distance between the 1P character and the locked-on enemy character 220 is increased to a certain distance or longer, the lock-on state is automatically cancelled, and the display form of the 1P cursor returns to the original form. In addition, the position at which the 1P cursor is located becomes a position obtained by adding an amount of the above fine adjustment to the cursor basic position. Moreover, when a plurality of objects that can be locked on are present within a predetermined distance from the 1P character, the lock-on target is switched each time the above lock-on operation is performed.

Figure 31:
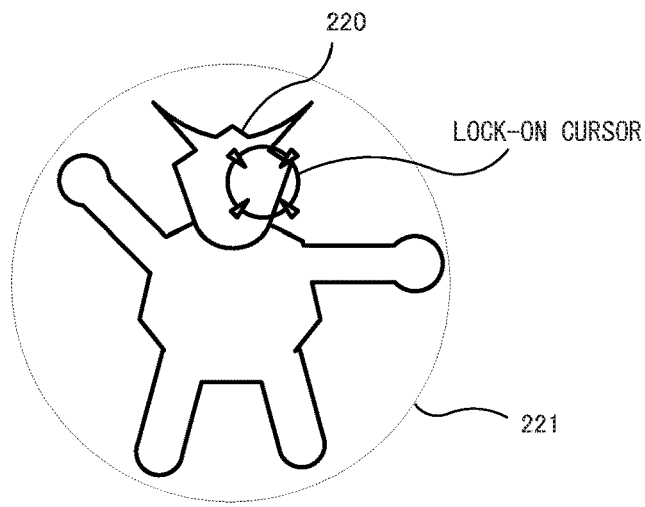
FIG. 31 is a diagram for explaining a lock-on adjustable range.
Figure 32:
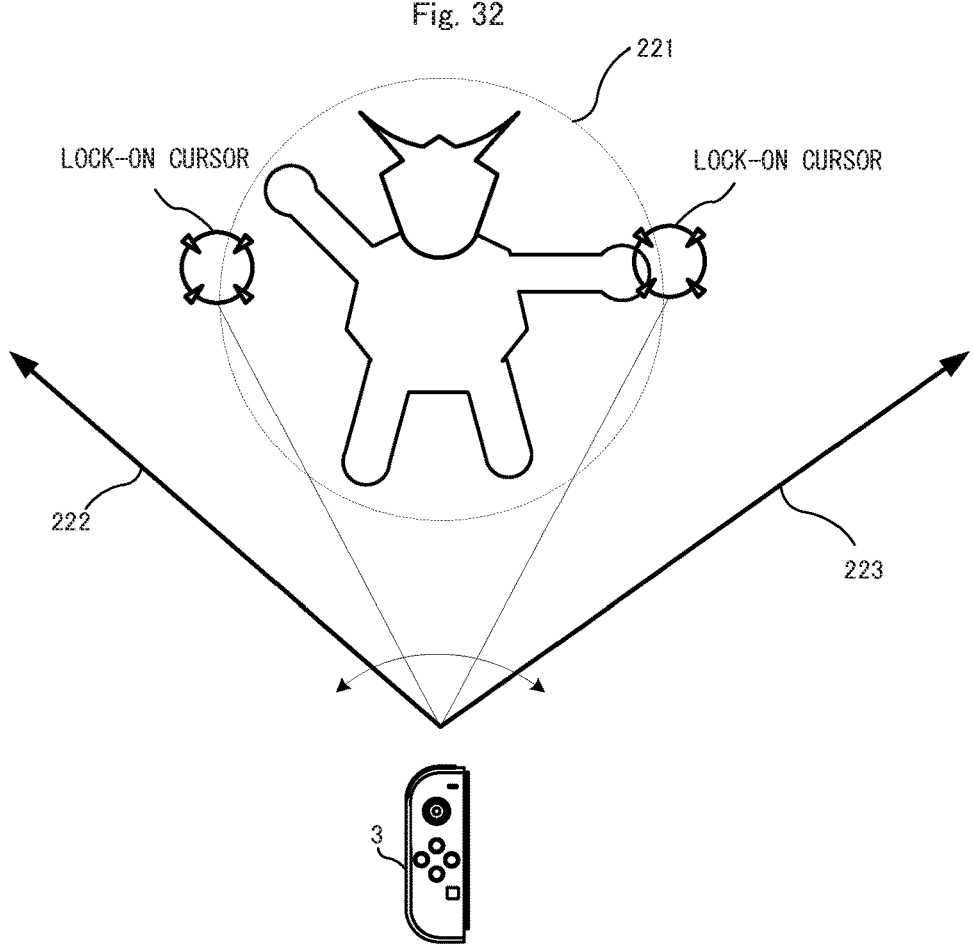
FIG. 32 is a diagram for explaining the lock-on adjustable range.

The lock-on cursor moves following movement of the lock-on target as described above. The position of the lock-on cursor can also be finely adjusted from the lock-on reference position using the above inertial sensors. FIGS. 31 and 32 show an example of fine adjustment of the position of the lock-on cursor in the lock-on state. First, in FIG. 31, the lock-on cursor is located at a position of a right-side portion of the face of the enemy character 220 that is a lock-on reference position. The player can move (the center of) the lock-on cursor within a lock-on adjustable range 221 by changing the orientation of the controller. The lock-on adjustable range 221 is an area that substantially surrounds the enemy character 220. This area is an area defined in advance for each object that can be locked on. For easy understanding of the description, in FIG. 31, the lock-on adjustable range 221 is shown by a dotted line, but this dotted line is not displayed in the actual game screen. In the lock-on state, no matter how much the player tilts the left controller 3, (the center of) the lock-on cursor does not come out of the range 221. For example, as shown in FIG. 32, even when the player tilts the direction of the end portion of the left controller 3 leftward to an angle indicated by an arrow 222, the lock-on cursor does not move leftward beyond the lock-on adjustable range 221. Similarly, even when the player tilts the end of the left controller 3 rightward to an angle indicated by an arrow 223, the lock-on cursor does not move rightward beyond the lock-on adjustable range 221.

Furthermore, in the exemplary embodiment, a movement speed of the cursor based on the above orientation change is made different between the case where the current state is the lock-on state and the case where the current state is not the lock-on state. Specifically, control in which the movement speed of the cursor at the same degree of tilt is lower is also performed such that finer adjustment is enabled in the case of the lock-on state. For example, the case where the orientation of the left controller 3 is changed rightward by 20 degrees is assumed. In this case, control, in which, when the current state is not the lock-on state, for example, the cursor is moved within the virtual space by a distance of 20, and when the current state is the lock-on state, the cursor is moved only by a distance of 5 (control in which the movement speed is reduced to 25%), is performed. Accordingly, in the lock-on state or the like in which it is assumed that the necessity of aiming at the enemy character 220 is increased, the operability can be enhanced. For example, it becomes easy to aim at a location that is preset as a "weak portion" when attacking the enemy character 220.

Meanwhile, in the exemplary embodiment, when performing fine adjustment as described above, a process of setting a reference orientation for the controller as appropriate is also performed. For example, when the lock-on operation is performed, the orientation of the controller at the time when this operation is performed is set as a reference orientation and is associated with the above lock-on reference position. Thus, the player can finely adjust the position of the cursor (lock-on cursor) by changing the orientation of the controller on the basis of the orientation of the controller at the time when the lock-on operation is performed. Accordingly, an intuitive fine adjustment operation having less uncomfortable feeling is enabled.

As described above, in the exemplary embodiment, regarding control of movement of the cursor, the cursor position can be further changed by changing the orientation of the controller while the cursor is basically located at the above cursor reference position. Accordingly, for movement of the cursor, intuitive and flexible operability can be provided. In addition, in the exemplary embodiment, play is enabled even when the controller is either "horizontally held" or "vertically held" as described above. In this case, particularly, when playing while "horizontally holding" the controller, intuitive easy-to-understand operability can be provided for fine adjustment of the cursor in the far side direction.

[To-be-Thrown Object Selection UI]

As described above, in the game, when the companion characters 202 are "thrown" to an enemy character and the like, the companion characters 202 can be caused to take various actions. In addition, as described above, several types of companion characters 202 are prepared as the companion characters 202. Thus, the to-be-thrown object selection UI 204 for selecting which type of companion character or which rear character is to be thrown is provided for the player.

Meanwhile, the game can be played using the left controller 3 and the right controller 4 as one set serving as one controller, and can also be played using the left controller 3 and the right controller 4 individually as separate controllers. When the left controller 3 and the right controller 4 are used as separate controllers as described above, the number of usable physical buttons and operation sections such as a stick are reduced as compared to those in the case where the left controller 3 and the right controller 4 are used as one set. In view of such a difference in number of operation sections, in the exemplary embodiment, a different "to-be-thrown object selection UI" is presented to each player in accordance with the type of the controller to be used by each player.

Figure 33:
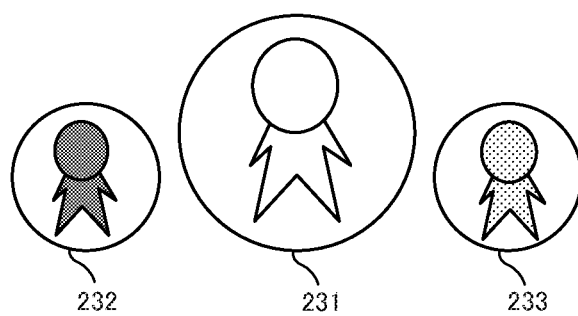
FIG. 33 shows a non-limiting example of a to-be-thrown object selection UI.
Figure 34:
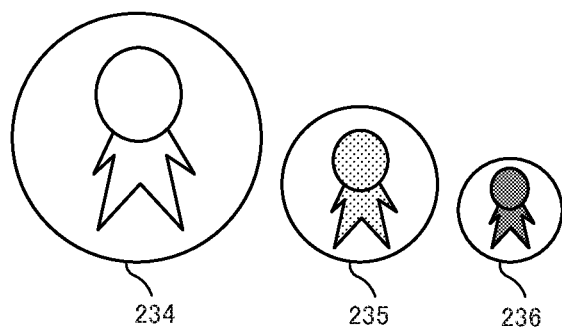
FIG. 34 shows a non-limiting example of the to-be-thrown object selection UI.

An example of display of the to-be-thrown object selection UI 204 will be described with, as an example, the case where play by two players is performed while the first player is using a left controller 3 and a right controller 4 as one set and the second player is using only a left controller 3. During play, the first player vertically holds the left controller 3 and the right controller 4, and the second player horizontally holds the left controller 3. FIG. 33 shows an example of the to-be-thrown object selection UI 204 displayed in the above 1P display area in such a case. In addition, FIG. 34 shows an example of the to-be-thrown object selection UI 204 displayed in the above 2P display area in such a case. In the following description, the to-be-thrown object selection UI shown in FIG. 33 is referred to as "a selection UI having a first layout", and the to-be-thrown object selection UI shown in FIG. 34 is referred to as "selection UI having a second layout".

First, FIG. 33 will be described. In the selection UI having the first layout shown in FIG. 33, three frames, that is, a current frame 231, a previous-turn frame 232, and a next-turn frame 233, are displayed. Regarding the arrangement of these frames, the current frame 231 is located at the center, the previous-turn frame 232 is located at the left side of the current frame 231, and the next-turn frame 233 is located at the right side of the current frame 231. In addition, the current frame 231 is displayed such that the size thereof is larger than those of the other two frames. The previous-turn frame 232 and the next-turn frame 233 are displayed in the same size. When the player performs a "throwing" operation, the rear character or the companion character 202 of the same type as a companion character displayed in the current frame 231 is thrown.

Figure 35:
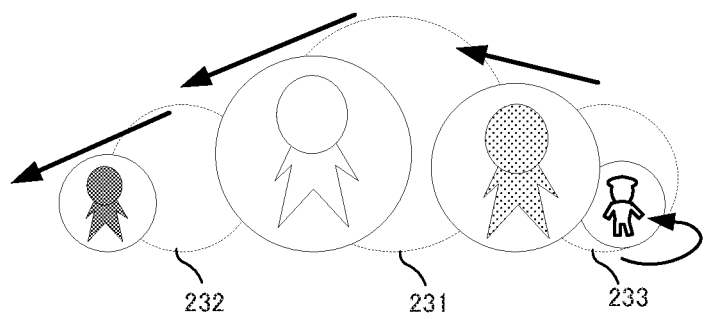
FIG. 35 is a diagram for explaining a non-limiting example of the manner of movement in the to-be-thrown object selection UI.
Figure 36:
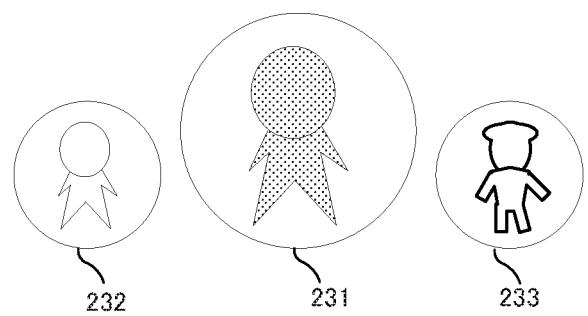
FIG. 36 is a diagram for explaining a non-limiting example of the manner of movement in the to-be-thrown object selection UI.

Next, an operation in the selection UI having the first layout will be described. In this case, the player can switch the content within the current frame 231 using the above first L-button 38 and the above first R-button 60. For example, in FIG. 33 described above, the case where a companion character A is displayed in the current frame 231, a companion character B is displayed in the previous-turn frame 232, a companion character C is displayed in the next-turn frame 233, and the player presses the first L-button 38, is assumed. In this case, the entire display of the selection UI having the first layout moves leftward. Specifically, as shown in FIG. 35, the current frame 231 moves to the position of the previous-turn frame 232 while the size thereof is being reduced, and the next-turn frame 233 moves to the position of the current frame 231 while the size thereof is being increased. In addition, a state where a new frame in which a rear character is displayed such that the new frame moves around from behind the next-turn frame 233 and the new frame moves to the position of the next-turn frame 233, is shown. Moreover, the previous-turn frame 232 moves around to behind this frame and disappears from the screen. As a result, as shown in FIG. 36, the companion character A is displayed in the previous-turn frame 232, the companion character C is displayed in the current frame 231, and the rear character is displayed in the next-turn frame 233.

When the player presses the first R-button 60 in the state shown in FIG. 33 described above, movement in the direction opposite to that of the above movement is performed. That is, the entire display of the selection UI having the first layout moves rightward. As a result, for example, the rear character is displayed in the previous-turn frame 232, the companion character B is displayed in the current frame 231, and the companion character A is displayed in the next-turn frame 233. When the left controller 3 and the right controller 4 are used as one set as described above, two buttons, that is, the first L-button 38 and the first R-button 60, are assigned for operations for selecting an object to be thrown. The selection UI having the first layout that is a layout adapted for such operations is also used as the to-be-thrown object selection UI 204.

Next, the selection UI having the second layout shown in FIG. 34 described above will be described. In the selection UI having the second layout shown in FIG. 34, three frames, that is, a current frame 234, a next-turn frame 235, and an after-next-turn frame 236, are displayed. Regarding the arrangement of these frames, the current frame 234 is located at the leftmost position, the next-turn frame 235 is located to the right of the current frame 234, and the after-next-turn frame 236 is located to the right of the next-turn frame 235. In addition, the current frame 234 is displayed such that the size thereof is larger than those of the other two frames. Moreover, the next-turn frame 235 is displayed such that the size thereof is larger than that of the after-next-turn frame 236.

Figure 37:
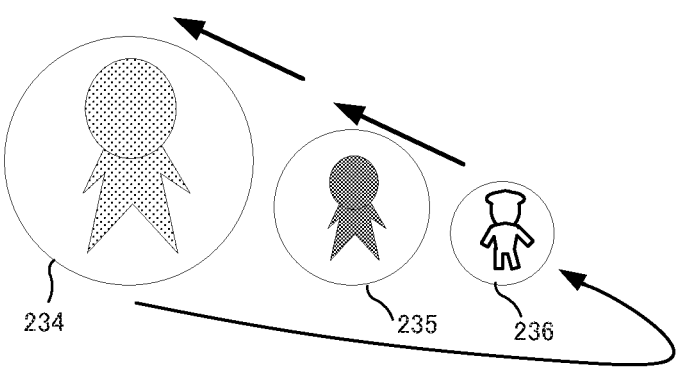
FIG. 37 is a diagram for explaining a non-limiting example of the manner of movement in the to-be-thrown object selection UI.

Next, an operation in the selection UI having the second layout will be described. In this case, the player can switch the content within the current frame 234 using only the above second L-button 43. Specifically, when the player presses the second L-button 43 in the state in FIG. 34, the entire display of the selection UI having the second layout moves leftward as shown in FIG. 37. Specifically, the next-turn frame 235 moves to the position of the current frame 234, and the after-next-turn frame 236 moves to the position of the next-turn frame 235. In addition, a state where a new frame appears such that the new frame moves around from behind the after-next-turn frame 236 and this frame moves to the position of the after-next-turn frame 236, is displayed. That is, unlike the above selection UI having the first layout, this operation is a switching operation only in one direction. When the second player plays using only the left controller 3 as described above, only one button, the second L-button 43, is assigned for an operation for selecting an object to be thrown, in view of the number of operation sections being small. The selection UI having the second layout that is a layout suitable for an operation only with the one button is also used as the to-be-thrown object selection UI 204.

Here, the case where play by two players is performed while the first player is using the left controller 3 and the right controller 4 as one set and the second player is using only the left controller 3 as described above, and the above joining screen is displayed, will be described. As described above, in the joining screen, the to-be-thrown object selection UI 204 is shared by the first player and the second player. In this case, a to-be-thrown object selection UI having a layout suitable for the controller having a smaller number of operation sections is used. In the above example, the selection UI having the second layout is used. Then, the first player performs a selection operation using only the first L-button 38, and the second player performs a selection operation using only the second L-button 43. In another embodiment, also in the joining screen, the to-be-thrown object selection UIs 204 suitable for the controllers of the respective players may be displayed.

As described above, the to-be-thrown object selection UI corresponding to each player is made different depending on the controller used by each player. Accordingly, the operability of the selection operation is enhanced in accordance with the number of operation sections of each controller, and the content displayed in the to-be-thrown object selection UI can also be suitable for each controller.

[Details of Game Process of Exemplary Embodiment]

Next, the game process in the exemplary embodiment will be described in more detail with reference to FIGS. 38 to 52.

[Data to be Used]

Figure 38:
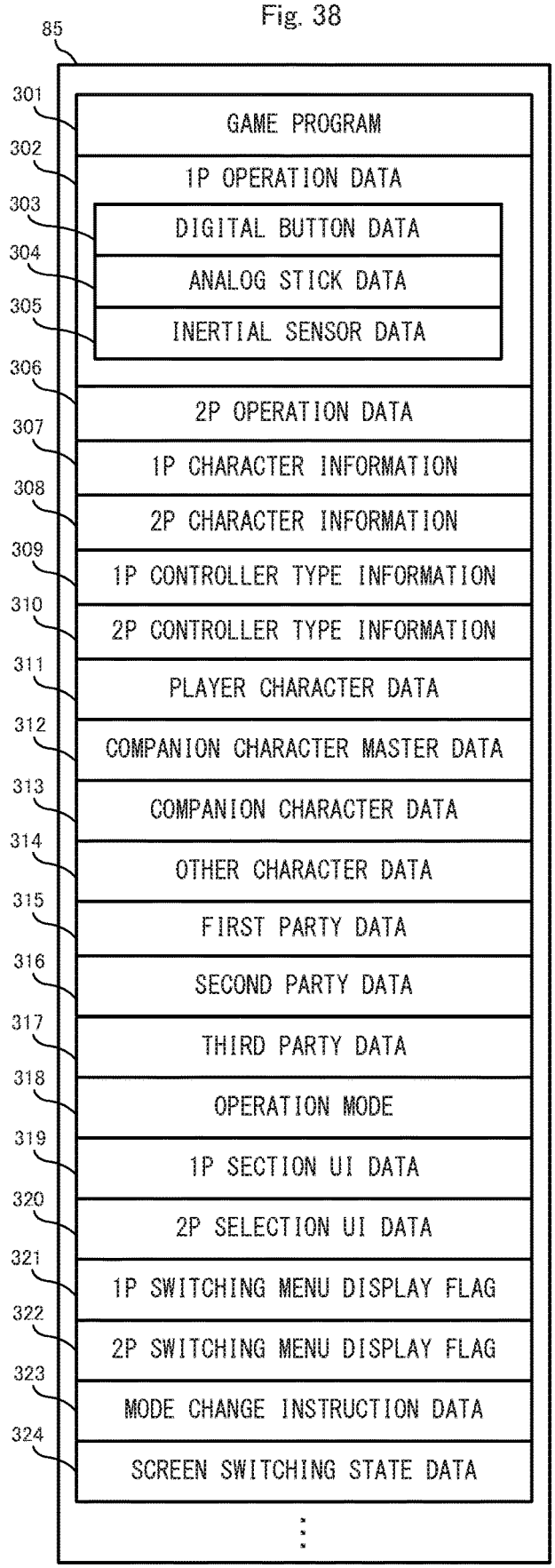
FIG. 38 is a memory map showing a non-limiting example of various data stored in a DRAM 85 of the main body apparatus 2.

First, various data to be used in the game process will be described. FIG. 38 is a memory map showing an example of various data stored in the DRAM 85 of the main body apparatus 2. In the DRAM 85 of the main body apparatus 2, a game program 301, 1P operation data 302, 2P operation data 306, 1P character information 307, 2P character information 308, 1P controller type information 309, 2P controller type information 310, player character data 311, companion character master data 312, companion character data 313, other character data 314, first party data 315, second party data 316, third party data 317, an operation mode 318, 1P section UI data 319, 2P selection UI data 320, a 1P switching menu display flag 321, a 2P switching menu display flag 322, mode change instruction data 323, screen switching state data 324, etc., are stored.

The game program 301 is a program for performing the game process according to the exemplary embodiment.

The 1P operation data 302 is data acquired from the controller operated by the first player and is data indicating the content of an operation by the first player. In addition, similarly, the 2P operation data 306 is data acquired from the controller operated by the second player and is data indicating the content of an operation by the second player. The 1P operation data 302 includes digital button data 303, analog stick data 304, and inertial sensor data 305. Moreover, the 2P operation data 306 also includes similar data. The digital button data 303 is data indicating pressed states of various buttons of the controller. The analog stick data 304 is data indicating the content of an operation on the analog stick of the controller. The inertial sensor data 305 is data indicating detection results of the inertial sensors such as the above-described acceleration sensors and the above-described angular velocity sensors. Specifically, acceleration data and angular velocity data are included.

The 1P character information 307 is information about the above 1P character. Specifically, the 1P character information 307 includes information for indicating which of the above three player characters 201 is the current operation target of the first player. More specifically, a player character ID (described later) for the player character 201 that is the operation target is set. In addition, the 1P character information 307 includes information indicating whether the 1P character is "locking on" any object, and also includes information indicating the locked-on object, when the 1P character is locking on any object. Moreover, the 2P character information 308 is information about the 2P character, and includes information similar to the 1P character information 307.

The 1P controller type information 309 and the 2P controller type information 310 are each data for indicating the type and use form of the controller used by each player for playing the game, and mapping information of the operation sections. The mapping information of the operation sections is information that defines assignment of each operation section for various operations in the game in accordance with such a controller type and use form. As the information indicating the type and use form of the controller, for example, information indicating that only the left controller 3 is used (number of used controllers=1), information indicating that two controllers, the left controller 3 and the right controller 4, are used as one set (number of used controllers=2), or the like is stored. In addition, the mapping information is, for example, information indicating that, when only the left controller 3 is used, the A-button 53 is assigned for a "throwing" operation, and when the left controller 3 and the right controller 4 are used, the button 34 is assigned for a "throwing" operation.

The player character data 311 is data about the three player characters 201A, 201B, and 201C. The player character data 311 includes player character IDs for uniquely identifying these player characters, image data of the appearance of these player characters, modeling data, etc.

The companion character master data 312 is data that defines basic information of the above companion characters 202. In addition, the companion character data 313 is data for management and the like of the individual companion characters 202 that actually appear in the virtual game space. FIG. 39 is a diagram showing an example of the data structure of the companion character master data 312. The companion character master data 312 is data in a table format having items such as a type ID 331, appearance data 332, and action definition data 333. The type ID 331 is an ID indicating the "type" of each companion character 202. The appearance data 332 is image data and modeling data of the type of companion character 202. The action definition data 333 is data that defines the content of action that can be taken by the type of companion character 202. For example, the action definition data 333 is data about by what motion and method the companion character 202 attacks when "attacking". In addition, various parameters for the type of companion character 202, for example, basic values of parameters such as a HP (hit point) and attacking power, are also defined. Each of the companion characters 202 that appear in the virtual game space is created on the basis of the companion character master data 312, a unique ID is assigned to each companion character 202, and the companion characters 202 are managed through the companion character data 313 described next.

FIG. 40 is a diagram showing an example of the data structure of the companion character data 313. The companion character data 313 is data in a table format having items such as a companion character ID 341, a type ID 342, participation party information 343, current position data 344, and current state data 345. The companion character ID 341 is an ID for uniquely identifying each companion character 202 that appears in the virtual game space. The type ID 342 is an ID indicating the type of the companion character 202 and corresponds to the type ID 331 of the above companion character master data 312. The participation party information 343 is information for indicating whether the companion character 202 is participating in any party or is in a "free" state where the companion character 202 is not participating in any party. In addition, when the companion character 202 is participating in any party, the participation party information 343 is also information indicating which party the companion character 202 is participating in. The current position data 344 is data indicating the current position of the companion character 202 within the virtual game space. The current state data 345 is data for indicating, for example, which action the companion character 202 is currently making. For example, information indicating that the companion character 202 is attacking an enemy character, information indicating that the companion character 202 is moving following a leader character, or the like is set as appropriate in accordance with the situation of the game.

Referring back to FIG. 38, the other character data 314 is data about various characters other than the above player characters 201 and the above companion characters 202. For example, the other character data 314 is data that defines the appearance and motion of each enemy character. In addition, in particular, for an object that can be an object to be locked on as described above, information that defines the above-described "lock-on reference position" and "lock-on adjustable range" is also included.

The first party data 315, the second party data 316, and the third party data 317 are data indicating the structures of the above-described parties. In the game, the three player characters 201 are present, and thus the number of parties that can coexist at the same time is at most three. Thus, three party data are prepared. FIG. 41 shows an example of the data structure of the first party data 315. The first party data 315 includes leader character information 351, first rear character information 352, second rear character information 353, and companion character information 354. The leader character information 351 is information indicating which player character 201 the leader character of the party is. The first rear character information 352 and the second rear character information 353 are each information indicating presence/absence of a rear character in the party. In addition, when rear characters are present, the first rear character information 352 and the second rear character information 353 are each information indicating which player character 201 the rear character is. For example, when only one rear character is present in the party, the player character ID of the rear character is set in the first rear character information 352, and information indicating that a rear character is "not present" is set in the second rear character information 353. The companion character information 354 is information about each companion character 202 that is participating in the party. Specifically, the companion character ID 341 is included.

The second party data 316 and the third party data 317 also have the same structure, and thus the description thereof is omitted. In the following description, the first party data 315, the second party data 316, and the third party data 317 are occasionally collectively referred to simply as "party data".

Referring back to FIG. 38, the operation mode 318 is data for indicating whether the current state is a state where the 1P character and the 2P character are joined together (the above joining mode) or a state where the 1P character and the 2P character are acting in different parties (the above other party mode). Specifically, information indicating that the current mode is the joining mode, or information that the current mode is the other party mode, is set.

Figure 42:
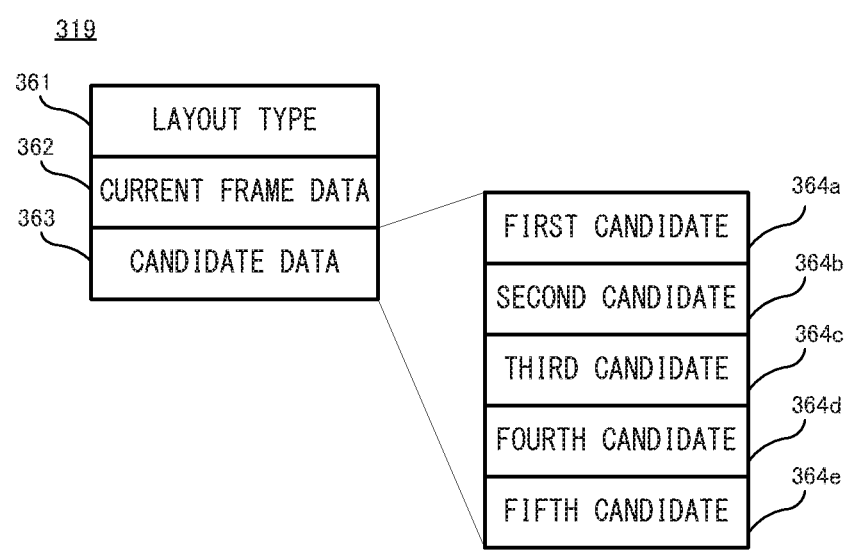
FIG. 42 is a diagram showing a non-limiting example of the data structure of 1P section UI data 319.

The 1P section UI data 319 and the 2P selection UI data 320 are data about the to-be-thrown object selection UIs described above with reference to FIGS. 33 to 37. The 1P section UI data 319 is mainly data for the first player, and the 2P selection UI data 320 is data for the second player. When the to-be-thrown object selection UI is shared by the first player and the second player in the joining screen as described above, the 1P section UI data 319 is shared. FIG. 42 shows an example of the data structure of the 1P section UI data 319. The data structure of the 2P selection UI data 320 is the same. In FIG. 42, the 1P section UI data 319 includes a layout type 361, current frame data 362, and candidate data 363. The layout type 361 is information for indicating whether to use the above-described selection UI having the first layout or the above-described selection UI having the second layout. Information for specifying either UI is set in accordance with the use form of the controller to be used by each player. The current frame data 362 is data indicating the content of the current frame 231 in the selection UI having the first layout or the content of the current frame 234 in the selection UI having the second layout. The candidate data 363 is data for indicating the contents of the previous-turn frame 232 and the next-turn frame 233 in the selection UI having the first layout or the contents of the next-turn frame 235 and the after-next-turn frame 236 in the selection UI having the second layout. In addition, the current frame data 362 is also data having a role as a pointer designating any one of data sets included in the candidate data 363 described next. The candidate data 363 is data indicating selection candidates in the UI, and data indicating each type of companion character 202 in the party and data indicating rear characters are stored as sequential data in a predetermined order. The number of data sets included in the candidate data 363 increases or decreases in accordance with the types of the companion characters 202 that are participating in the party and the number of rear characters. FIG. 42 shows an example of the candidate data 363 in the case where it is assumed that three types of companion characters and two rear characters are present in the party. In this case, in the candidate data 363, five data sets of a first candidate 364a to fifth candidate 364e are stored. For example, a data set indicating a first type of companion character is stored as the first candidate 364a, a data set indicating a second type of companion character is stored as the second candidate 364b, a data set indicating a third type of companion character is stored as the third candidate 364c, a data set indicating a first rear character is stored as the fourth candidate 364d, and a data set indicating a second rear character is stored as the fifth candidate 364e.

The 1P switching menu display flag 321 is a flag for indicating whether to display the character switching menu 207 based on an operation by the first player on the screen. In addition, the 2P switching menu display flag 322 is a flag for indicating whether to display the character switching menu 207 based on an operation by the second player on the screen. When each flag is set to be ON, the flag indicates that the character switching menu 207 is to be displayed on the screen.

The mode change instruction data 323 is data to be used for control of switching the above operation mode (in other words, control of switching between the joining screen and the division screen) in processes described later, and information indicating whether to set the operation mode to the other party mode or the joining mode is set. In this example, an "other party mode change instruction" is set in the case of setting the operation mode to the other party mode, and a "joining mode change instruction" is set in the case of setting the operation mode to the joining mode.

The screen switching state data 324 is data for indicating whether the current state is a state of switching from the above "joining screen" to the above "division screen" or a state of switching the above "division screen" to the above "joining screen". In the exemplary embodiment, each of the above screen switching is performed through several frames, and this data is used for setting of various parameters of the virtual camera and the like during switching. In this example, when the screen switching state data 324 indicates a state of switching from the "division screen" to the "joining screen", information of "during switching to joining screen" is set. In addition, when the screen switching state data 324 indicates a state of switching from the "joining screen" to the "division screen", information of "during switching to division screen" is set. Moreover, when the screen switching state data 324 indicates a state that is not any of the above state, nothing is set in this data.

[Details of Process to be Performed by Processor 81]

Next, the details of the game process according to the exemplary embodiment will be described with reference to flowcharts in FIGS. 43 to 56. In the following, joining and separation of parties as described above and screen control accompanying them, cursor movement control, and control for the to-be-thrown object selection UI will be mainly described, and the description of other game processes is omitted.

Figure 43:
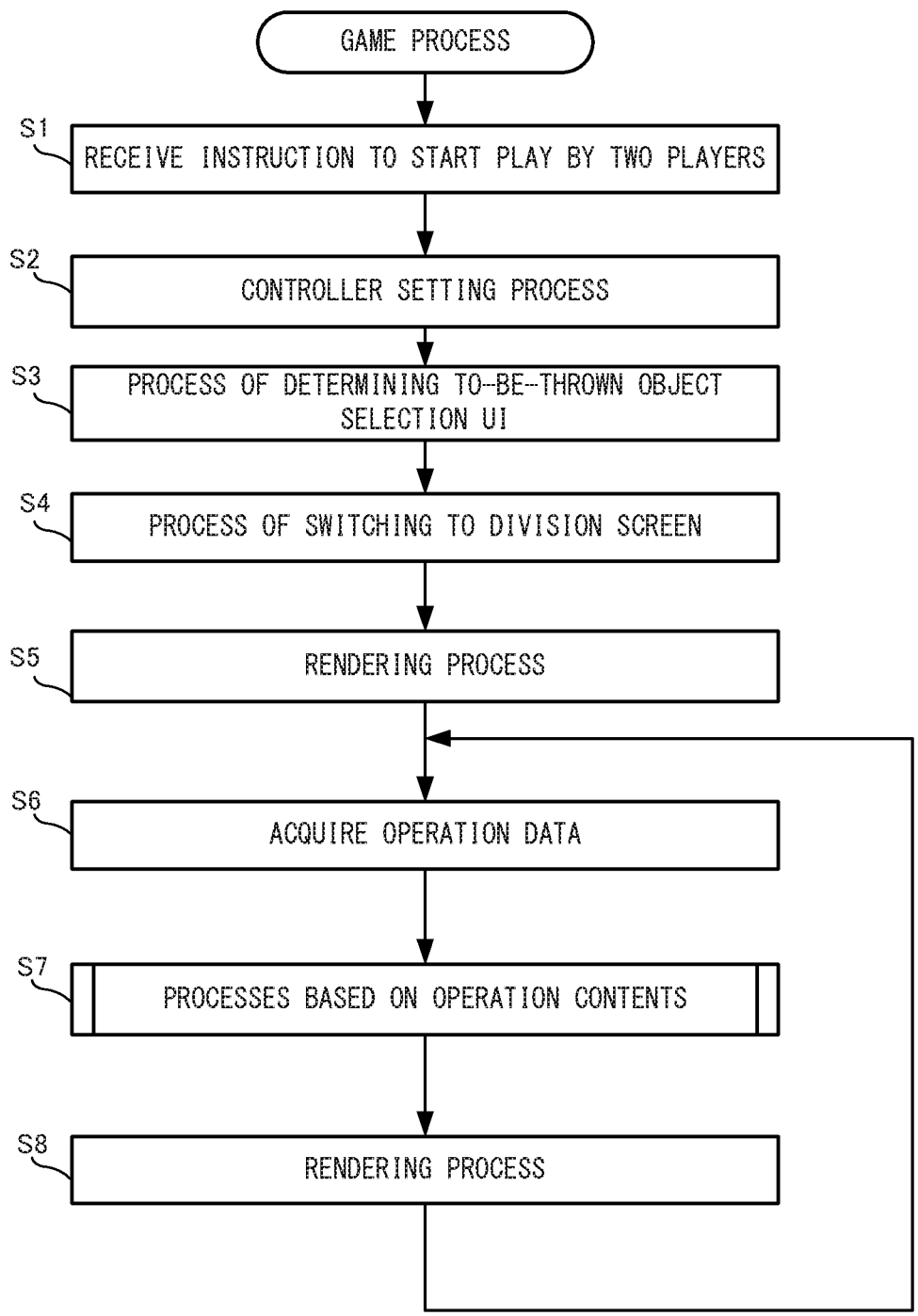
FIG. 43 is a flowchart showing the details of a game process.

FIG. 43 is a flowchart showing the details of the game process. Here, a situation in which play by two players as described above is started from a state during play by a single player (that is, the second player joins in the middle of the game) is assumed. That is, a situation in which, during play by a single player, the first player opens the above-described option menu is assumed.

First, in step S1, a process of receiving an instruction to start play by two players is performed. That is, on the basis of the 1P operation data 302, the processor 81 detects that an instruction operation for starting play by two players has been performed from the above option menu.

Next, in step S2, the processor 81 performs a controller setting process. This process is a process for identifying a controller to be used by each player in play by two players. Specifically, the processor 81 displays the controller setting screen shown in FIG. 11 described above. Then, the processor 81 determines the type and use form of the controller to be used by each player, on the basis of a signal sent from the controller. For example, whether the type of the controller is, for example, the left controller 3, the right controller 4, or a game controller other than the controllers 3 and 4 is determined. In addition, whether the use form is a form in which the left controller 3 and the right controller 4 are used as one set, or a form in which the left controller 3 or the right controller 4 is used alone, is determined. Then, on the basis of the determination result, the processor 81 sets information indicating the controller to be used by the first player, in the 1P controller type information 309. In addition, the processor 81 sets information indicating the controller to be used by the second player, in the 2P controller type information 310. The above mapping information of the operation sections corresponding to the respective controllers is also set in the 1P controller type information 309 and the 2P controller type information 310. In subsequent processes, when determining an operation content on the basis of operation data, the processor 81 refers to the mapping information corresponding to the respective controllers, and determines the operation content. When the use form and the like of the controller to be used by each player are recognized, a process for determining an operation target of the second player is also performed. Then, a process of setting the player character ID of the operation target of the second player in the 2P character information 308 is also performed. It should be noted that, since the case where play by a single player has already been performed is taken as an example, the 1P character information 307 has already been set. In addition, when play by two players is performed from the beginning without anyone joining in the middle of the game, a process for determining an operation target of the first player may also be performed at this timing.

Next, in step S3, the processor 81 performs a process of determining a to-be-thrown object selection UI 204 suitable for each player. Specifically, on the basis of the above 1P controller type information 309, the processor 81 determines a layout of the to-be-thrown object selection UI 204 to be displayed in the 1P display area. Then, the processor 81 sets information indicating the determined layout, in the layout type 361 of the 1P section UI data 319. In addition, on the basis of the above 2P controller type information 310, the processor 81 determines a to-be-thrown object selection UI to be displayed in the 2P display area and sets information of the to-be-thrown object selection UI in the layout type 361 of the 2P selection UI data 320.

Next, in step S4, the processor 81 performs a process of switching to the "division screen", regarding screen display. Specifically, first, the processor 81 determines any one of the player characters 201 that are not the operation target of the first player, as an operation target of the second player. Which player character 201 is set as the operation target may be determined by any method. For example, the player character 201 having a smaller player character ID may be automatically selected, or a screen for selecting an operation target may be displayed and a selection may be made by the second player. After the operation target of the second player, that is, the 2P character, is determined, the processor 81 sets appropriate parameters to each of the virtual camera corresponding to the 1P character and the virtual camera corresponding to the 2P character, such that a division screen as shown in FIG. 15 is displayed. In addition, the processor 81 calculates a position at which the 2P cursor is to be placed, on the basis of the position of the 2P character. Then, the processor 81 places the 2P cursor at the calculated position. Moreover, the processor 81 sets information indicating that the current operation mode is the other party mode, in the operation mode 318.

Next, in step S5, the processor 81 performs a process of rendering a game image. Specifically, the processor 81 generates an image obtained by capturing, with the virtual camera corresponding to the 1P character, a virtual game space in which the operation character information image 205 and the appropriate to-be-thrown object selection UI 204 are located, and the process 81 renders the image in the 1P display area. In addition, similarly, the processor 81 generates an image obtained by capturing the virtual game space with the virtual camera corresponding to the 2P character, and renders the image in the 2P display area. Then, the processor 81 performs a process of displaying the game image on the stationary monitor.

Next, in step S6, the processor 81 acquires the 1P operation data 302 and the 2P operation data 306. Subsequently, in step S7, the processor 81 performs various processes based on the operation contents of the respective players indicated by the acquired operation data. Next, in step S8, the processor 81 takes images of the virtual game space in which a result of the processes in step S7 is reflected, with the virtual cameras, and performs a process for rendering the images as a game image. Thereafter, the processor 81 returns to step S6 described above, and the process is repeated.

[Various Processes Based on Operation Contents]

Figure 44:
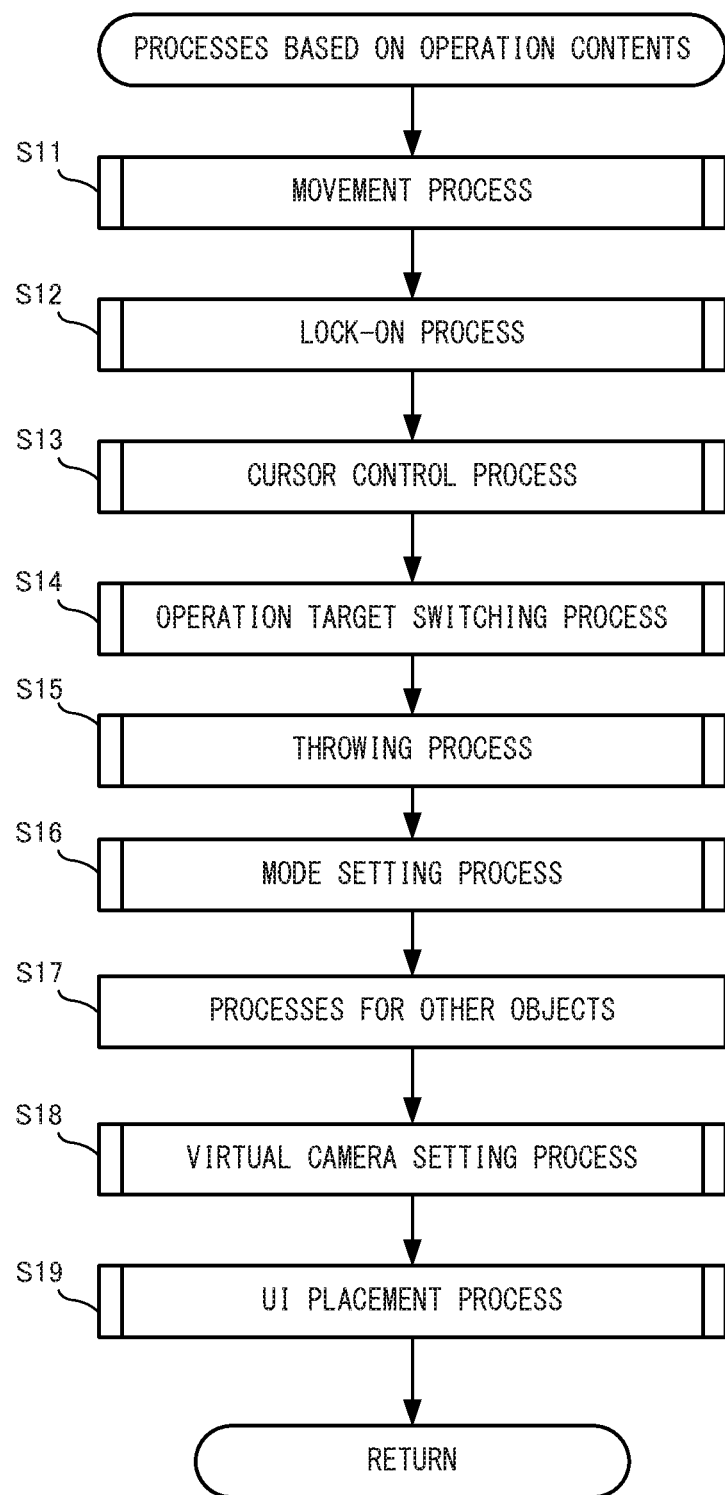
FIG. 44 is a flowchart showing the details of processes based on operation contents.

Next, the processes, based on the operation contents, that are performed in step S7 described above will be described. FIG. 44 is a flowchart showing the details of the processes based on the operation contents. In FIG. 44, first, in step S11, the processor 81 performs a movement process. In this process, a process for moving each player character 201 is performed on the basis of the content of a movement operation performed by each player. An example of the movement operation is a direction input operation using the analog stick 32 when the controller is "vertically held". In addition, an example of the movement operation is also a direction input operation using the analog stick 32 when the controller is "horizontally held". The orientation of the controller is rotated by 90 degrees between when the controller is "vertically held" and when the controller is "horizontally held", and thus, in the game process, in accordance with this, assignment of a direction input signal and a movement direction is changed as appropriate. For example, when an input is provided by tilting the analog stick 32 toward the first L-button 38 in FIG. 4 described above, this input is handled as an input in the "upward direction" when the controller is "vertically held", but is handled as an input in the "leftward direction" when the controller is "horizontally held".

[Movement Process]

Figure 45:
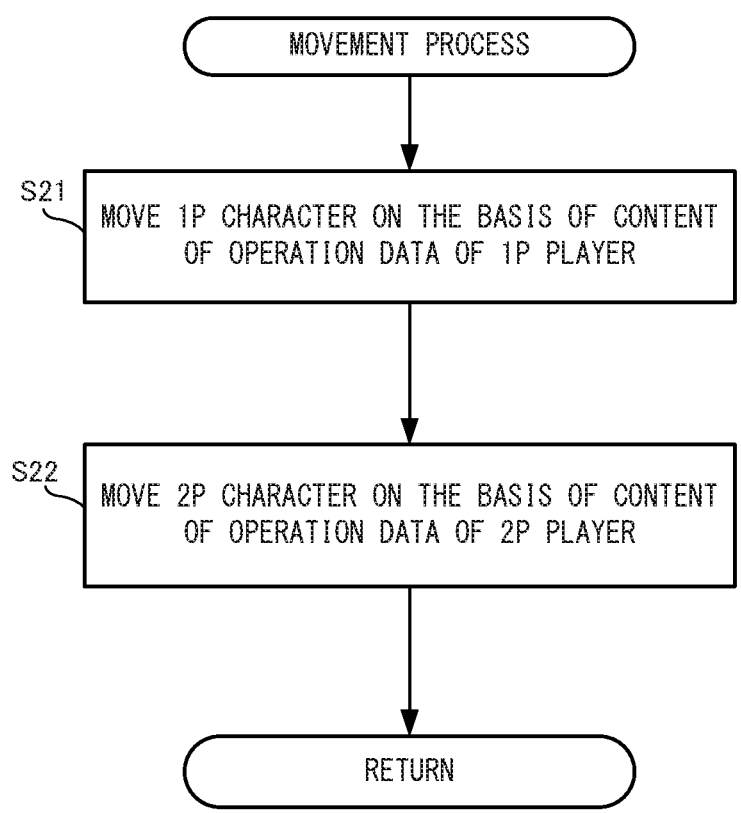
FIG. 45 is a flowchart showing the details of a movement process.

FIG. 45 is a flowchart showing the details of the above movement process. In FIG. 45, first, in step S21, the processor 81 performs a process of moving the 1P character, on the basis of the 1P operation data 302. Subsequently, in step S22, the processor 81 performs a process of moving the 2P character, on the basis of the 2P operation data 306. Regarding movement control in steps S21 and S22, when the operation mode 318 is the "joining mode", control is performed as appropriate such that the 2P character moves within the rear character movement range 211 described above with reference to FIG. 18. This is the end of the movement process.

[Lock-on Process]

Referring back to FIG. 44, next, in step S12, the processor 81 performs a lock-on process. The process is mainly a process performed when the player performs a lock-on operation. Examples of the lock-on operation are, for example, to press the ZR-button 61 when the controller is "vertically held", and to press the second R-button 44 when the controller is "horizontally held".

Figure 46:
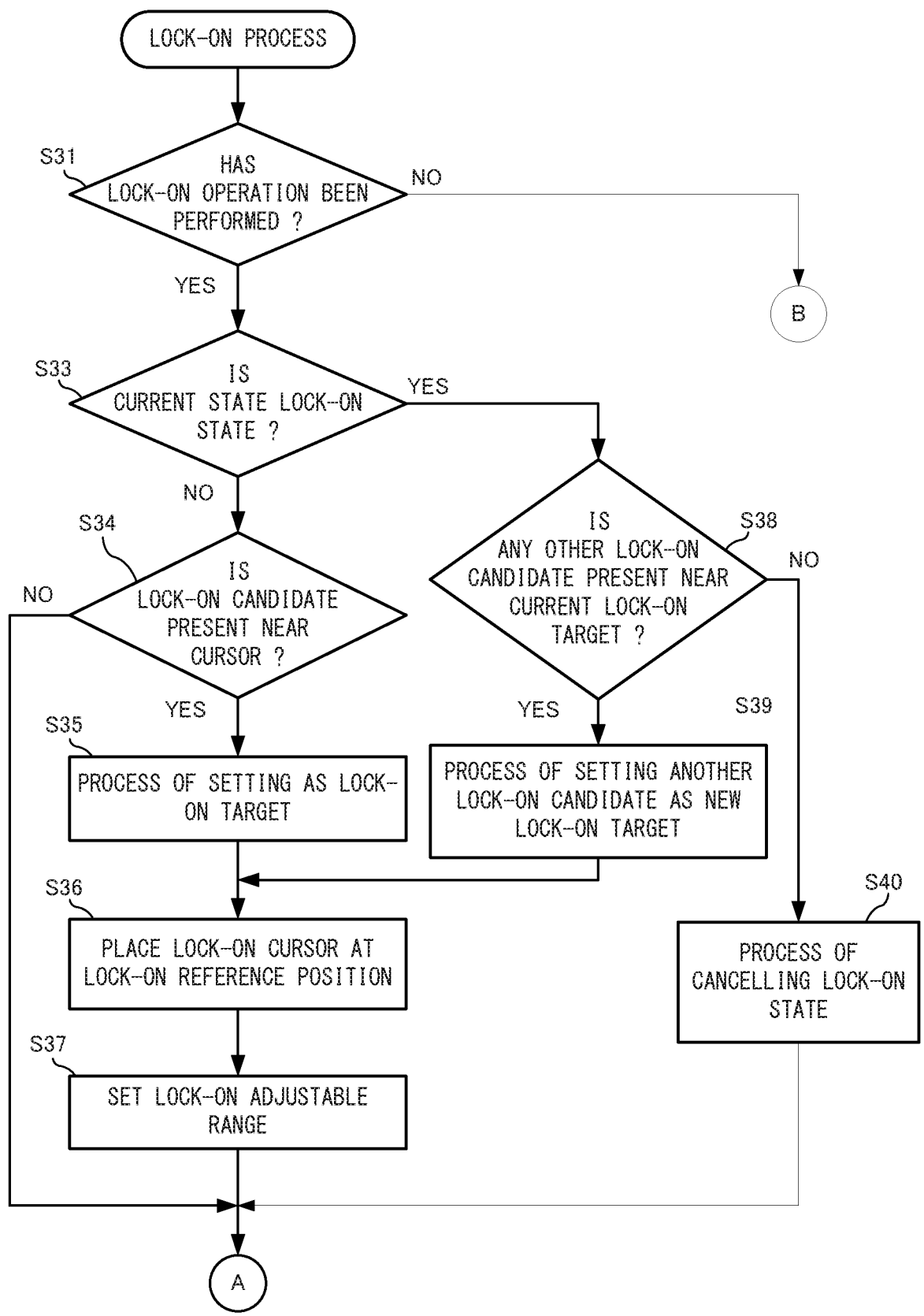
FIG. 46 is a flowchart showing the details of a lock-on process.
Figure 47:
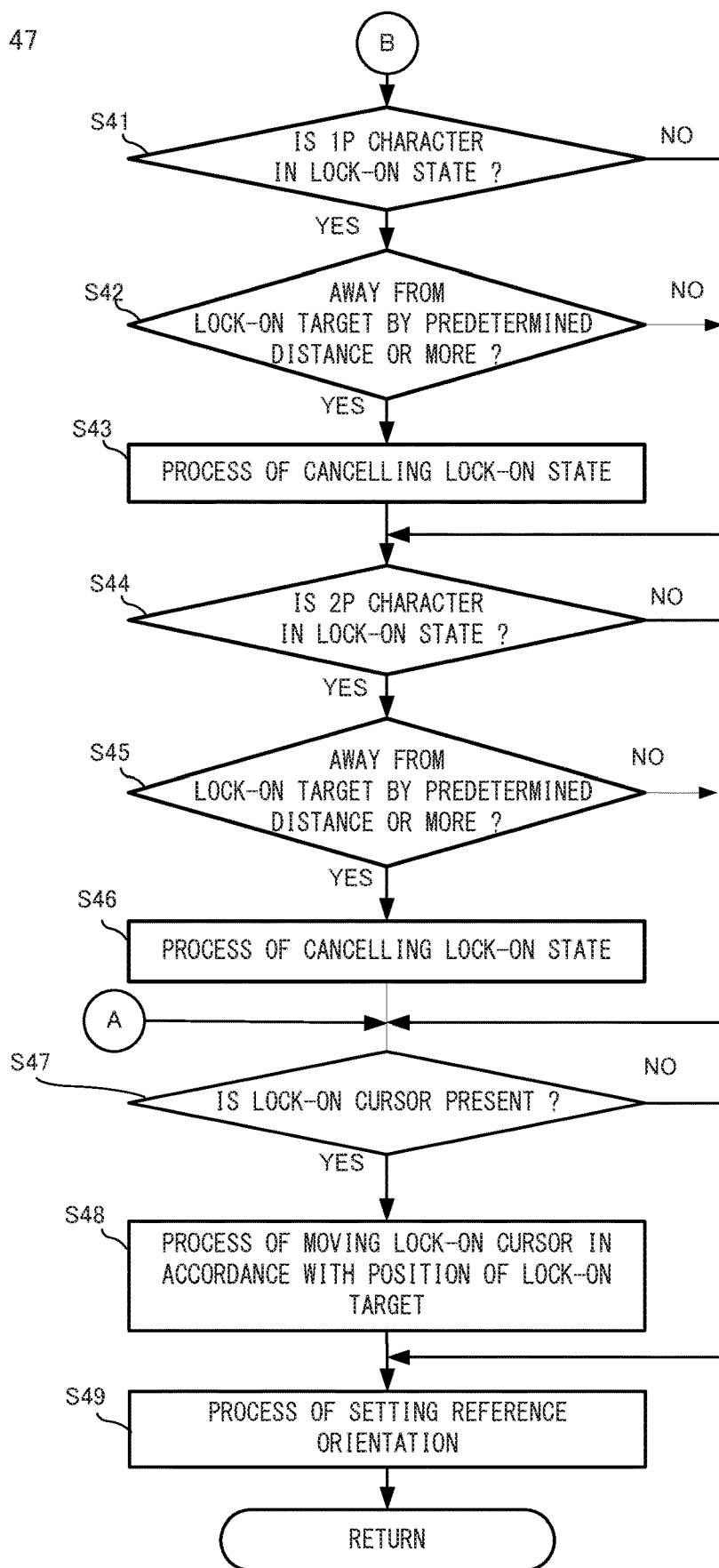
FIG. 47 is a flowchart showing the details of the lock-on process.

FIGS. 46 and 47 are flowcharts showing the details of the above lock-on process. In FIG. 46, first, in step S31, the processor 81 determines whether either player has performed the lock-on operation, on the basis of the 1P operation data 302 and the 2P operation data 306. As a result of the determination, when the lock-on operation has not been performed (NO in step S31), the processor 81 advances the processing to step S41 described later. On the other hand, when the lock-on operation has been performed (YES in step S31), the processor 81 proceeds to step S33.

Next, in step S33, the processor 81 refers to the 1P character information 307 or the 2P character information 308 in accordance with the player who has performed the lock-on operation, and determines whether the current state is the above lock-on state where the player character 201 operated by the specified player is locking on a predetermined object. As a result of the determination, when the current state is not the lock-on state (NO in step S33), the processor 81 determines in step S34 whether any object that is a candidate to be locked on (hereinafter, referred to as a lock-on candidate) is present near the cursor (the 1P cursor or the 2P cursor) for the specified player. As a result, when no lock-on candidate is present (NO in step S34), the processor 81 advances the processing to step S47 described later. On the other hand, when any lock-on candidate is present (YES in step S34), the processor 81 sets the lock-on candidate as a lock-on target in step S35. It should be noted that, when a plurality of lock-on candidates are present, the lock-on candidate closest to the cursor is selected. In addition, the processor 81 sets information indicating that the current state is the lock-on state, for the specified player. That is, the processor 81 sets information indicating that the current state is the lock-on state, in either the 1P character information 307 or the 2P character information 308 in accordance with the specified player.

Next, in step S36, the processor 81 changes the appearance of the cursor to the appearance of the above "lock-on cursor". Furthermore, the processor 81 places the lock-on cursor at the above lock-on reference position that is preset for each lock-on target described above.

Next, in step S37, the processor 81 sets the above-described lock-on adjustable range 221 for the lock-on target. In the exemplary embodiment, in the other character data 314, the size and the like of the lock-on adjustable range 221 are defined in advance for each character that can be a lock-on target. Thus, the processor 81 refers to the other character data 314 and sets the lock-on adjustable range 221 corresponding to the lock-on target. Thereafter, the processor 81 advances the processing to step S47 described later.

On the other hand, as a result of the above determination in step S33, when the current state is the lock-on state (YES in step S33), the processor 81 determines in step S38 whether any other lock-on candidate is present within a predetermined distance from the current lock-on target. As a result, when any other lock-on candidate is present (YES in step S38), the processor 81 performs a process of switching the lock-on target in step S39. That is, the processor 81 performs a process of setting the other lock-on candidate as a new lock-on target. When a plurality of other lock-on candidates are present, the lock-on candidate closest to the current lock-on target may be selected, for example. Alternatively, lock-on candidates that are present within a circular range having a predetermined size and centered at the current lock-on target are sequenced in order of the lock-on candidates closer to the current lock-on target, and the current lock-on target may be switched according to this order each time the lock-on operation is performed. After switching of the lock-on target is performed, the processor 81 advances the processing to step S36 described above.

On the other hand, when no other lock-on candidate is present (NO in step S38), the processor 81 performs a process of cancelling the lock-on state in step S40. That is, the processor 81 sets information indicating that the current state is not the lock-on state, in the 1P character information 307 or the 2P character information 308. In addition, the appearance of the cursor is also returned from the appearance of the lock-on cursor to the cursor appearance at the time of normal movement. Furthermore, regarding the position of the cursor, the cursor is placed at a position that is determined on the basis of the position and the direction of the 1P character or the 2P character as described above. Thereafter, the processor 81 advances the processing to step S47 described later.

On the other hand, as a result of the above determination in step S31, when the lock-on operation has not been performed, the processor 81 refers to the 1P character information 307 and determines whether the 1P character is in the lock-on state, in step S41 in FIG. 47. As a result of the determination, when the 1P character is not in the lock-on state (NO in step S41), the processor 81 advances the processing to step S44 described later. On the other hand, when the 1P character is in the lock-on state (YES in step S41), the processor 81 determines in step S42 whether the distance between the 1P character and the lock-on target is equal to or larger than a predetermined distance. As a result, when the distance is equal to or larger than the predetermined distance (YES in step S42), the processor 81 performs a process for cancelling the lock-on state of the 1P character in step S43. Specifically, the processor 81 sets information that the 1P character is not in the lock-on state, in the 1P character information 307. In addition, the processor 81 also performs a process of deleting the lock-on cursor, calculating a position at which the 1P cursor is to be placed, similar to the above, and moving the 1P cursor to the position. On the other hand, when the distance is not equal to or larger than the predetermined distance (NO in step S42), the processor 81 does not perform the process in step S43 described above and advances the processing to the next step S44. That is, the lock-on state of the 1P character is maintained.

Next, in step S44, the processor 81 refers to the 2P character information 308 and determines whether the 2P character is in the lock-on state. As a result of the determination, when the 2P character is not in the lock-on state (NO in step S44), the processor 81 advances the processing to step S47 described later. On the other hand, when the 2P character is in the lock-on state (YES in step S44), the processor 81 determines in step S44 whether the distance between the 2P character and the lock-on target is equal to or larger than a predetermined distance. As a result, when the distance is equal to or larger than the predetermined distance (YES in step S45), the processor 81 performs a process for cancelling the lock-on state of the 2P character in step S46, similar to the above case of the 1P character. Specifically, the processor 81 sets information indicating the 2P character is not in the lock-on state, in the 2P character information 308. In addition, the processor 81 also performs a process of deleting the lock-on cursor, calculating a position at which the 2P cursor is to be placed, and moving the 2P cursor to the position. On the other hand, when the distance is not equal to or larger than the predetermined distance (NO in step S45), the process in step S46 described above is not performed, and the lock-on state of the 2P character is maintained.

Next, in step S47, the processor 81 determines whether the above-described lock-on cursor is displayed. That is, the processor 81 determines whether either player character is in a state of locking on a predetermined object. As a result of the determination, when the lock-on cursor is displayed (YES in step S47), the processor 81 performs a process of moving, as appropriate, the lock-on cursor so as to correspond to the position of the lock-on target, in step S48. That is, the processor 81 performs a process of moving the lock-on cursor following the lock-on target. On the other hand, when the lock-on cursor is not present (NO in step S47), the process in step S48 is skipped, and the processor 81 proceeds to the next process step.

Next, in step S49, the processor 81 performs a process of resetting the "reference orientation" of the controller in relation to the above-described fine adjustment of the cursor position using the inertial sensors. Specifically, the processor 81 initializes the movement amount of the lock-on cursor from the lock-on reference position and resets the current orientation of the controller on which the lock-on operation has been performed, as the "reference orientation". That is, the above "reference orientation" is reset when the lock-on operation is performed. This is the end of the lock-on process.

[Cursor Control Process]

Referring back to FIG. 44, subsequent to the lock-on process, the processor 81 performs a cursor control process in step S13. In this process, a process of determining a position of the cursor on the basis of the position of the player character and a process for further finely adjusting the position using the inertial sensors are performed.

Figure 48:
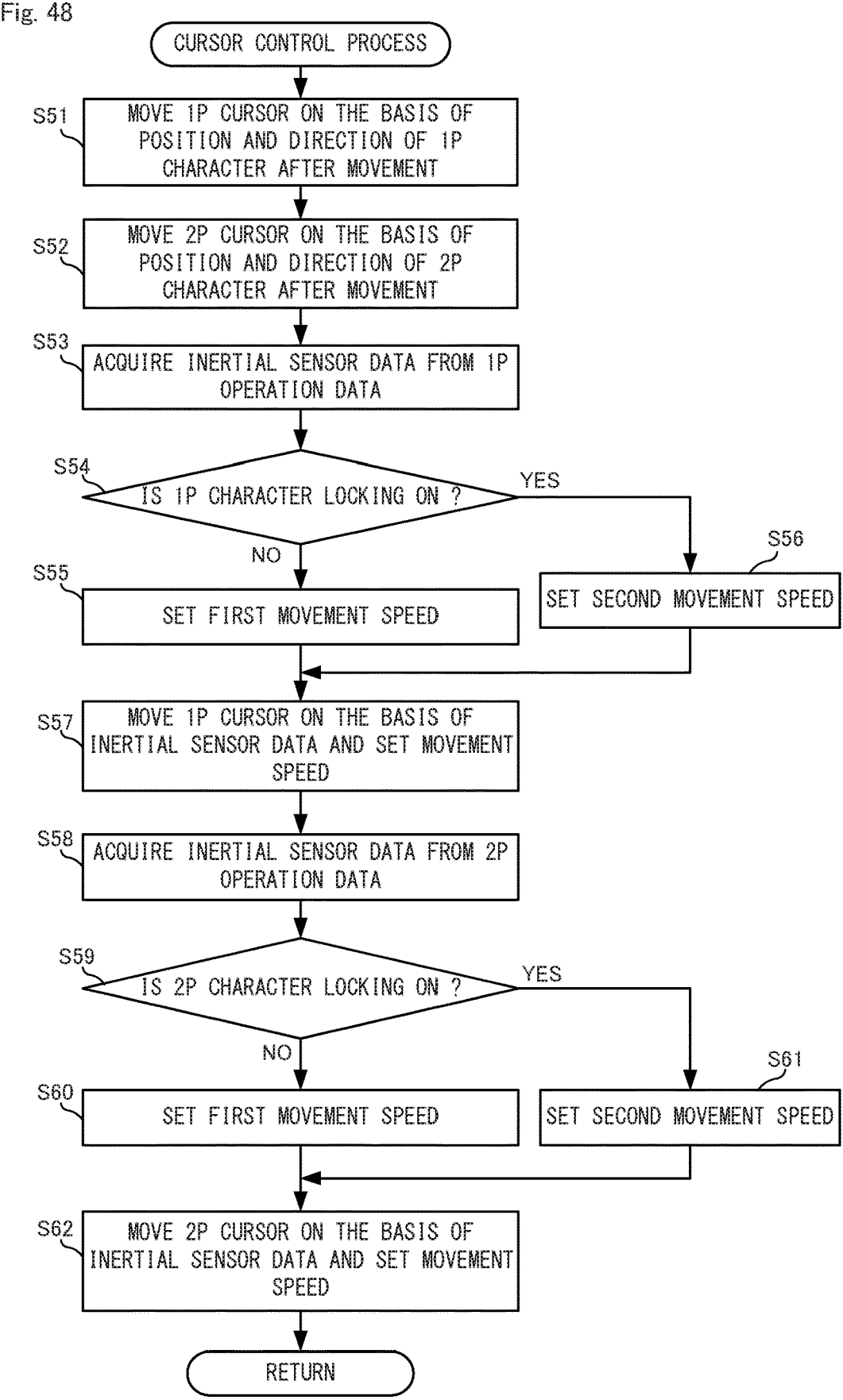
FIG. 48 is a flowchart showing the details of a cursor control process.

FIG. 48 is a flowchart showing the details of the above cursor control process. First, in step S51, the processor 81 calculates a position at which the 1P cursor is to be placed, on the basis of the position and the direction (movement direction) of the 1P character after the movement. Then, the processor 81 moves the 1P cursor to the calculated position. This position is a position shifted from the position of the 1P character after the movement by a predetermined amount along the direction of the 1P character. In addition, this position is also a position that is a "reference position" in a later-described process of fine adjustment of the cursor position.

Next, in step S52, similar to the case of the 1P character, the processor 81 calculates a position at which the 2P cursor is to be placed, on the basis of the position and the direction (movement direction) of the 2P character after the movement. This position is also a position that is a "reference position" in the later-described process of fine adjustment of the cursor position. Then, the processor 81 moves the 2P cursor to the calculated position.

Next, a process regarding fine adjustment of the cursor position using the above inertial sensors is performed. Specifically, first, in step S53, the processor 81 acquires the inertial sensor data 305 from the 1P operation data 302. Next, in step S54, the processor 81 refers to the 1P character information 307 and determines whether the 1P character is in the lock-on state. As a result, when the 1P character is not in the lock-on state (NO in step S54), the processor 81 sets a first movement speed, as a speed when moving the 1P cursor on the basis of the inertial sensors, in step S55. On the other hand, when the 1P character is in the lock-on state (YES in step S54), the processor 81 sets a second movement speed, as a speed when moving the 1P cursor on the basis of the inertial sensors, in step S56. The first movement speed is a movement speed when the 1P character is not in the lock-on state, and the second movement speed is a movement speed when the 1P character is in the lock-on state. As described above, a lower movement speed is set as a movement speed of the cursor at the same degree of tilt such that finer adjustment is enabled when the 1P character is in the lock-on state. For example, the second movement speed is set as a speed that is 25% of the first movement speed.

It should be noted that, in another embodiment, a content similar to the above may be calculated and set, for example, as a movement amount or a movement distance, not as a movement speed.

Next, in step S57, the processor 81 performs a process of moving the position of the 1P cursor, on the basis of the inertial sensor data 305 and the above set first movement speed or second movement speed. In the exemplary embodiment, first, the processor 81 calculates the current orientation of the controller from the angular velocity data included in the inertial sensor data 305. Furthermore, the processor 81 calculates the difference between the current orientation of the controller and a predetermined reference orientation that is set at a predetermined timing. That is, the processor 81 calculates an amount of change from the reference orientation. Then, the processor 81 moves the 1P cursor from the above-described "reference position" on the basis of the above set movement speed and the calculated difference. In another embodiment, the processor 81 may perform control in which an angular velocity at each frame is calculated without using the reference orientation and the 1P cursor is moved on the basis of the angular velocity. In this case, for example, the processor 81 may perform control in which the 1P cursor is moved from the position of the 1P cursor at the previous frame on the basis of the angular velocity at each frame.

When the 1P character is in the lock-on state, movement control is performed such that the position of the 1P cursor does not come out of the above-described lock-on adjustable range 221 (see FIG. 31 described above) (the lock-on adjustable range 221 is set in a lock-on process described later). In addition, when the 1P character is not in the lock-on state, a process of changing the color of the 1P cursor is also performed in accordance with whether the position of the 1P cursor is a position that the companion character 202 reaches when the companion character 202 is thrown, as a result of movement based on the above fine adjustment.

When the process in step S57 has ended, a process similar to the above-described cursor movement control based on the inertial sensors is subsequently performed for the 2P cursor. First, in step S58, the processor 81 acquires the inertial sensor data 305 from the 2P operation data 306. Next, in step S59, the processor 81 refers to the 2P character information 308 and determines whether the 2P character is in the lock-on state. As a result, when the 2P character is in the lock-on state (YES in step S59), the above second movement speed is set in step S61, and, when the 2P character is not in the lock-on state (NO in step S59), the above first movement speed is set in step S60. Then, in step S62, similar to the case of the 1P cursor, the processor 81 performs a process of moving the position of the 2P cursor, on the basis of the inertial sensor data 305 and the above set movement speed (movement control regarding the lock-on adjustable range 221 and change of the cursor color are performed similar to those in the case of the 1P cursor). This is the end of the cursor control process.

[Operation Target Switching Process]

Referring back to FIG. 44, subsequent to the cursor control process, an operation target switching process is performed in step S14. In this process, a process for controlling switching of the operation target using the above character switching menu 207 is performed.

Figure 49:
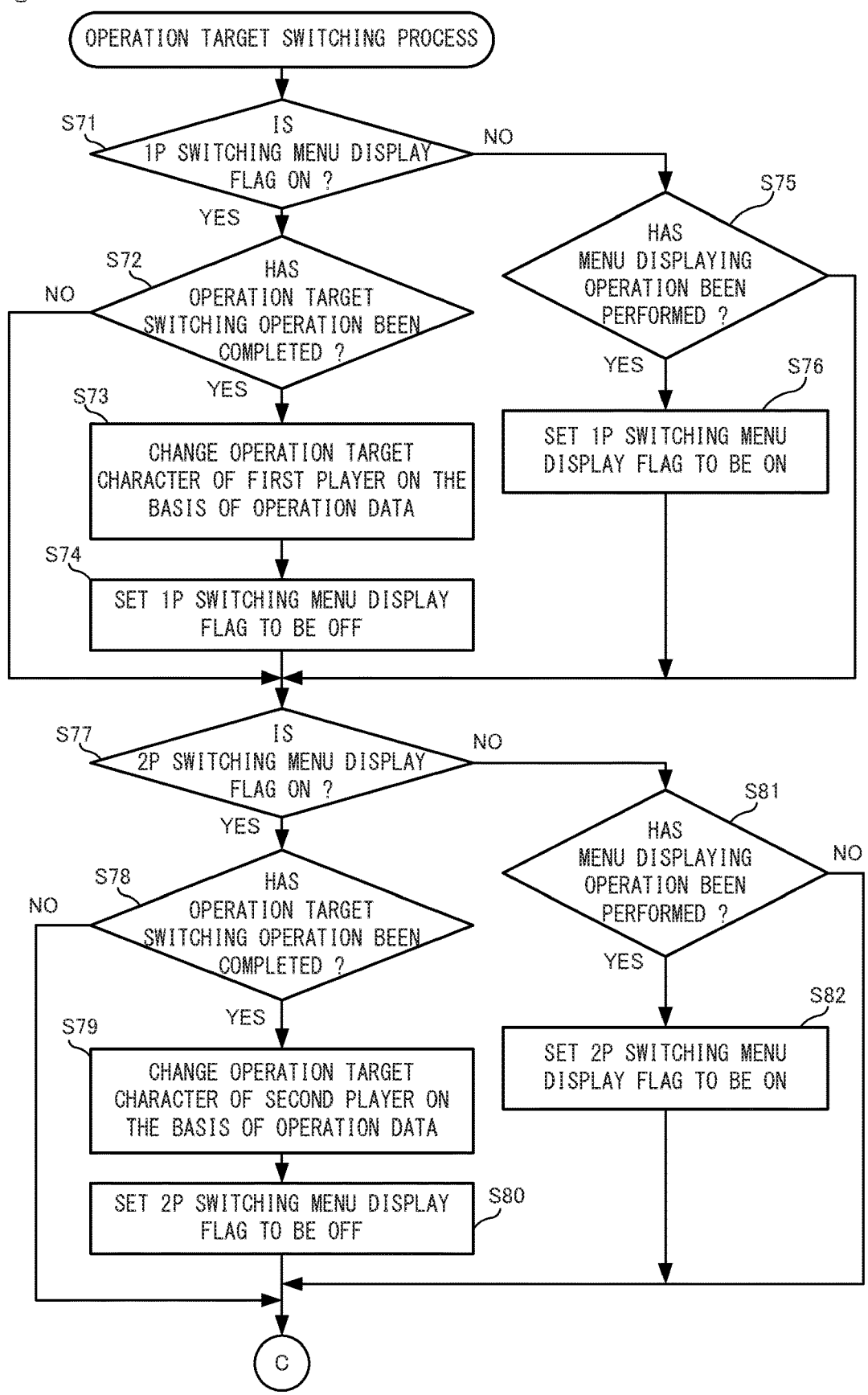
FIG. 49 is a flowchart showing an operation target switching process.
Figure 50:
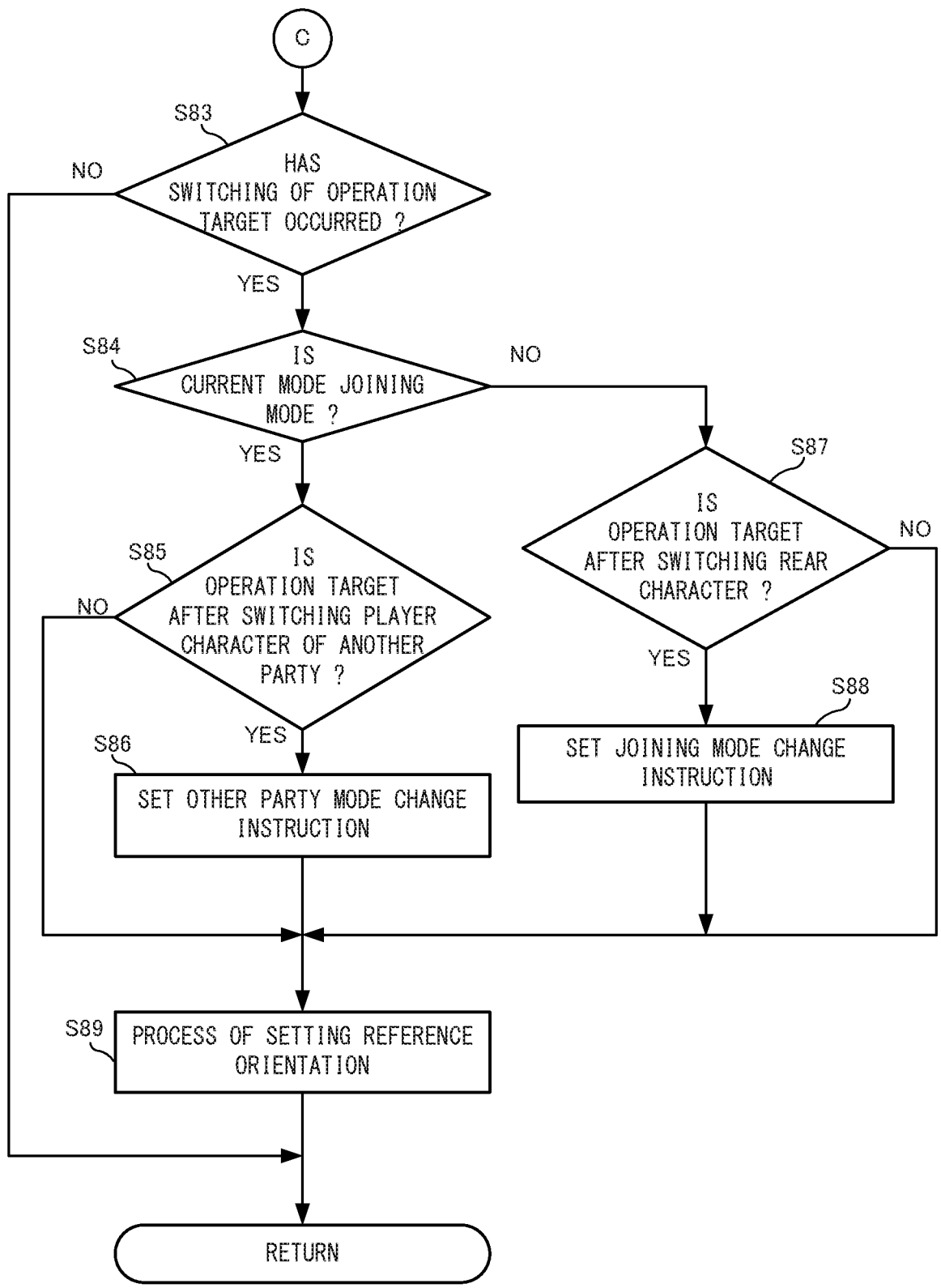
FIG. 50 is a flowchart showing the details of the operation target switching process.

FIG. 49 is a flowchart showing the details of the operation target switching process. First, in step S71, the processor 81 determines whether the 1P switching menu display flag 321 is set to be ON. That is, the processor 81 determines whether the character switching menu 207 based on an operation by the first player is currently displayed. As a result of the determination, when the 1P switching menu display flag 321 is not ON (NO in step S71), the character switching menu 207 is not displayed. In this case, in step S75, the processor 81 determines whether an operation for displaying the character switching menu 207 has been performed, on the basis of the 1P operation data 302. As a result, when the operation has been performed (YES in step S75), the processor 81 sets the 1P switching menu display flag 321 to be ON in step S76. On the other hand, when the operation has not been performed (NO in step S75), the above process in step S76 is skipped, and the processor 81 advances the processing to step S77 described later.

On the other hand, as a result of the above determination in step S71, when the 1P switching menu display flag 321 is set to be ON (YES in step S71), the character switching menu 207 based on an operation by the first player is currently displayed, and the current state is a state during operation on the character switching menu 207. In this case, in step S72, the processor 81 determines whether an operation target switching instruction operation by the first player has been completed, on the basis of the 1P operation data 302. As a result of the determination, when the operation target switching instruction operation has not been completed (NO in step S72), the processor 81 advances the processing to step S77 described later. On the other hand, when the operation target switching instruction operation has been completed (YES in step S72), the processor 81 changes the operation target character of the first player on the basis of the 1P operation data 302 in step S73. Specifically, a process of updating the player character ID indicating the current operation target in the 1P character information 307 as appropriate is performed on the basis of the operation content. Thereafter, in step S74, the processor 81 sets the 1P switching menu display flag 321 to be OFF. That is, a process for deleting the character switching menu 207 for the first player from the screen is performed.

Next, in steps S77 to S82, processes similar to those in steps S71 to S76 described above are performed for the second player. First, in step S77, the processor 81 determines whether the 2P switching menu display flag 322 is set to be ON. As a result, when the 2P switching menu display flag 322 is not ON (NO in step S77), the processor 81 determines in step S81 whether an operation for displaying the above character switching menu 207 has been performed, on the basis of the 2P operation data 306. As a result, when the operation has been performed (YES in step S81), the processor 81 sets the 2P switching menu display flag 322 to be ON in step S82. On the other hand, when the operation has not been performed (NO in step S81), the process in step S82 is skipped, and the processor 81 advances the processing to step S83 described later.

On the other hand, as a result of the above determination in step S77, when the 2P switching menu display flag 322 is set to be ON (YES in step S77), the processor 81 determines in step S78 whether an operation target switching instruction operation by the second player has been completed, on the basis of the 2P operation data 306. As a result of the determination, when the operation target switching instruction operation has not been completed (NO in step S78), the processor 81 advances the processing to step S83 described later. On the other hand, when the operation target switching instruction operation has been completed (YES in step S78), the processor 81 changes the operation target character of the second player on the basis of the 2P operation data 306 in step S79. Specifically, a process of updating the player character ID indicating the current operation target in the 2P character information 308 as appropriate is performed on the basis of the operation content. Thereafter, in step S80, the processor 81 sets the 2P switching menu display flag 322 to be OFF.

Next, in step S83, whether switching of the operation target of either player has occurred as a result of the above processes in steps S71 to S82 is determined. That is, whether an operation target switching operation has been completed by either player is determined. As a result of the determination, when switching of the operation target of any player has not occurred (NO in step S83), the processor 81 ends the operation target switching process. On the other hand, when switching of the operation target of any player has occurred (YES in step S83), the processor 81 determines in step S84 whether the operation mode 318 is the "joining mode". As a result of the determination, when the operation mode 318 is the "joining mode" (YES in step S84), the processor 81 determines in step S85 whether the operation target after the switching is the player character 201 that belongs to a party different from the party to which the previous operation target belongs. That is, the processor 81 determines whether switching of the operation target has been performed, when another player character 201 that is not the operation target is present in another party in a state where the 1P character and the 2P character are joined together. As a result of the determination, when the switching of the operation target is switching to the player character 201 in the other party (YES in step S85), the processor 81 sets the "other party mode change instruction" in the mode change instruction data 323, in step S86, in order to switch the operation mode from the joining mode to the other party mode. On the other hand, as a result of the above determination, when the switching of the operation target is not switching to the player character 201 in the other party (NO in step S85), the process in step S86 is not performed, and the processor 81 advances the processing to the next step.

On the other hand, as a result of the above determination in step S84, when the operation mode 318 is not the "joining mode" (NO in step S84), the processor 81 determines in step S87 whether the operation target after the switching is the rear character in another party. That is, the processor 81 determines whether, for example, the second player has performed an operation for switching the 2P character to the rear character of the party of the 1P character in a state where the second player plays in another party (division screen). As a result of the determination, when the switching of the operation target is switching to the rear character (YES in step S87), the processor 81 sets the "joining mode change instruction" in the mode change instruction data 323, in step S88, in order to switch the operation mode from the other party mode to the joining mode. On the other hand, when the switching of the operation target is not switching to the rear character (NO in step S87), the process in step S88 is not performed, and the processor 81 advances the processing to the next step.

Next, in step S89, as a process related to a fine adjustment operation using the above-described inertial sensors, the processor 81 performs a process of initializing the movement amount of the cursor from the reference position and setting the current orientation of the controller on which the above switching operation has been performed, as the "reference orientation". This process is a process for resetting the orientation of the controller at timing when an operation other than a movement operation is performed, thereby enhancing the operability of the above cursor fine adjustment operation. This is the end of the operation target switching process.

[Throwing Process]

Referring back to FIG. 44, subsequent to the operation target switching process, the processor 81 performs a throwing process in step S15. In this process, a process regarding an operation for "throwing" the companion character 202 or the like and an operation for selecting an object to be thrown is performed. Here, the operation for "throwing" is, for example, to press the A-button 53 when the controller is "vertically held" as described above, and to press the button 34 when the controller is "horizontally held" as described above. In addition, the operation for selecting an object to be thrown is different depending on the displayed to-be-thrown object selection UI 204 as described above, and is, in principle, to press either the first L-button 38 or the first R-button 60 when the controller is "vertically held", and to press the second L-button 43 when the controller is "horizontally held". It should be noted that, when the to-be-thrown object selection UI 204 having a layout suitable for the controller having a smaller number of operation sections is shared in the joining screen, only the first L-button 38 is assigned for a selection operation even when the controller is "vertically held". In the following description, various objects to be thrown through a throwing operation are referred to as "to-be-thrown objects".

Figure 51:
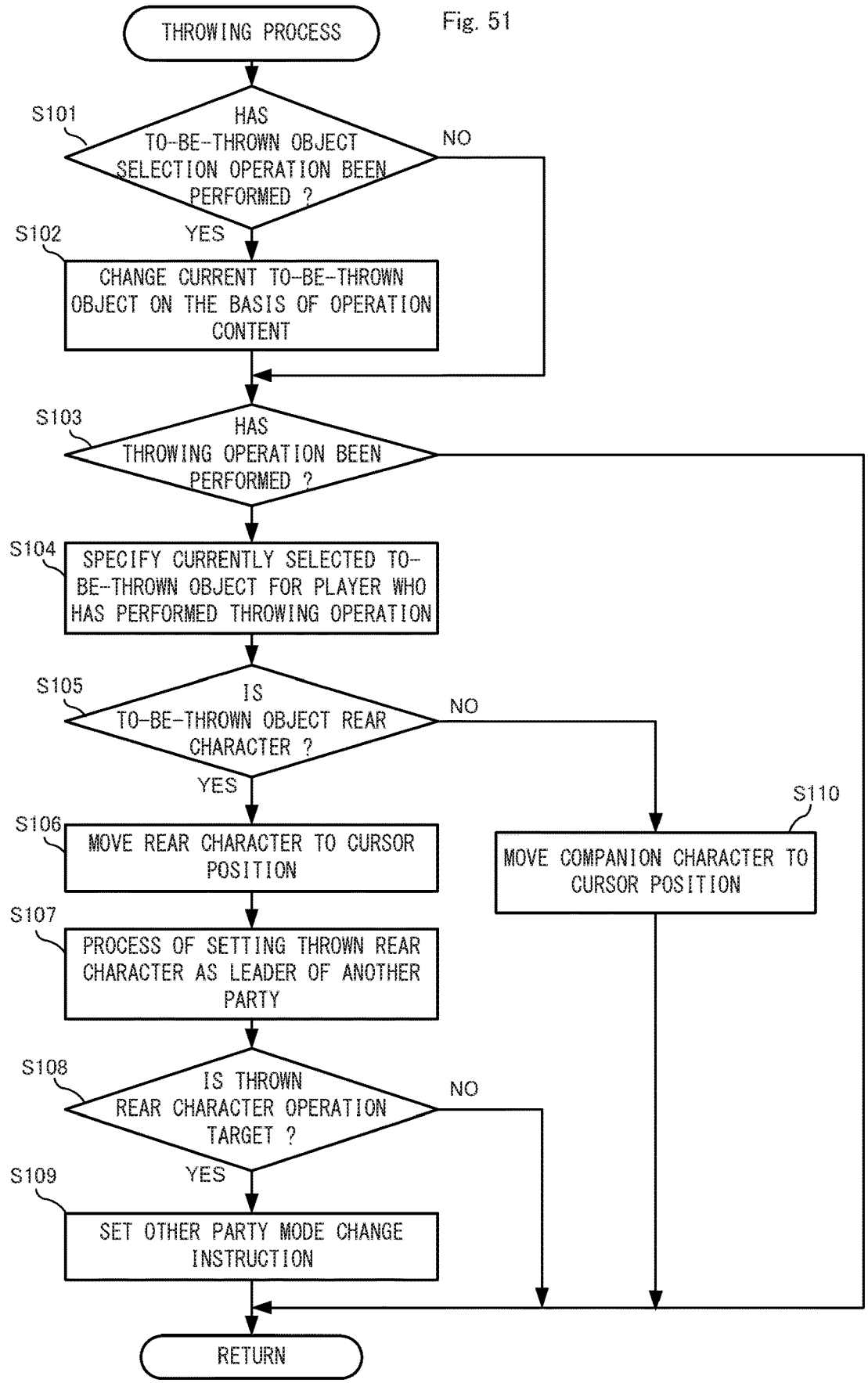
FIG. 51 is a flowchart showing the details of a throwing process.

FIG. 51 is a flowchart showing the details of the above throwing process. First, in step S101, the processor 81 determines whether an operation for selecting a to-be-thrown object has been performed by either player, on the basis of the 1P operation data 302 and the 2P operation data 306. As a result, when the operation for selecting a to-be-thrown object has been performed (YES in step S101), the processor 81 changes the content of the current frame data 362 of the 1P section UI data 319 or the 2P selection UI data 320 on the basis of the content of the operation in step S102. In addition, the processor 81 also updates the content of the candidate data 363 as appropriate accordingly. On the other hand, when the operation for selecting a to-be-thrown object has not been performed (NO in step S101), the above process in step S102 is skipped, and the processor 81 advances the processing to the next step.

Next, in step S103, the processor 81 determines whether a "throwing" operation has been performed by either player, on the basis of the 1P operation data 302 and the 2P operation data 306. As a result, when the "throwing" operation has not been performed (NO in step S103), the processor 81 ends the throwing process. On the other hand, when the "throwing" operation has been performed (YES in step S103), the processor 81 specifies the currently selected to-be-thrown object for the player who has performed the "throwing" operation, in step S104. For example, when the operation mode is the other party mode, a companion character or a rear character that is set in the current frame of the to-be-thrown object selection UI for the player who has performed the operation becomes a "to-be-thrown object". In addition, when the operation mode is the joining mode, only one to-be-thrown object selection UI 204 is displayed and shared by the first player and the second player. Thus, depending on a selection operation by either player, a companion character or a rear character that is set in the current frame 231 (in the case of the selection UI having the first layout) or the current frame 234 (in the case of the selection UI having the second layout) becomes a "to-be-thrown object".

Next, in step S105, the processor 81 determines whether the "to-be-thrown object" is the above rear character. When the "to-be-thrown object" is the rear character (YES in step S105), the processor 81 causes the 1P character or the 2P character, for which the "throwing" operation has been performed, to make a motion of throwing the rear character in step S106. Furthermore, the processor 81 moves the rear character to the position of the cursor (1P cursor or 2P cursor) corresponding to the player character for which the "throwing" operation has been performed (such that a parabola is drawn, for example).

Next, in step S107, the processor 81 updates the content of the party data as appropriate such that the thrown rear character becomes a leader of another party.

Next, in step S108, the processor 81 determines whether the thrown rear character is the operation target of either player. As a result, when the thrown rear character is the operation target (YES in step S108), it is considered that the current situation is a situation in which division of the party occurs by "throwing" the rear character in a state where the 1P character and the 2P character are present in the same party. Thus, in this case, in order to switch the operation mode from the joining mode to the other party mode, the processor 81 sets the "other party mode change instruction" in the mode change instruction data 323 in step S109. On the other hand, when the thrown rear character is not the operation target (NO in step S108), the process in step S109 is skipped. It should be noted that a process of causing the thrown rear character in this case to wait at the location to which the rear character has been thrown is performed.

On the other hand, as a result of the above determination in step S105, when the "to-be-thrown object" is not the rear character (NO in step S105), the processor 81 throws a companion character 202. In this case, in step S110, the processor 81 causes the 1P character or the 2P character, for which the "throwing operation has been performed, to make a motion of throwing the companion character that is set as the "to-be-thrown object" toward the position of the cursor (1P cursor or 2P cursor) for the 1P character or the 2P character. Here, a plurality of companion characters 202 may be present within the party. In this case, the processor 81 selects any one of the companion characters 202 of the same type as the companion character indicated as the "to-be-thrown object", within the party, and causes the 1P character or the 2P character to make a throwing motion. The method for the selection may be any method, and an example thereof is to select the closest companion character 202. Then, the processor 81 starts moving the companion character 202, which is the to-be-thrown object, to the position of the 1P cursor or the 2P cursor.

It should be noted that, thereafter, the processor 81 causes the thrown companion character 202 to make a predetermined action at the location to which the companion character 202 has moved, on the basis of the type ID 331 and the action definition data 333 of the companion character master data 312. For example, the predetermined action is to attack an enemy character. In addition, a process of updating the contents of the current position data 344 and the current state data 345 as appropriate on the basis of the content of the action is also performed. This is the end of the throwing process.

[Mode Setting Process]

Figure 52:
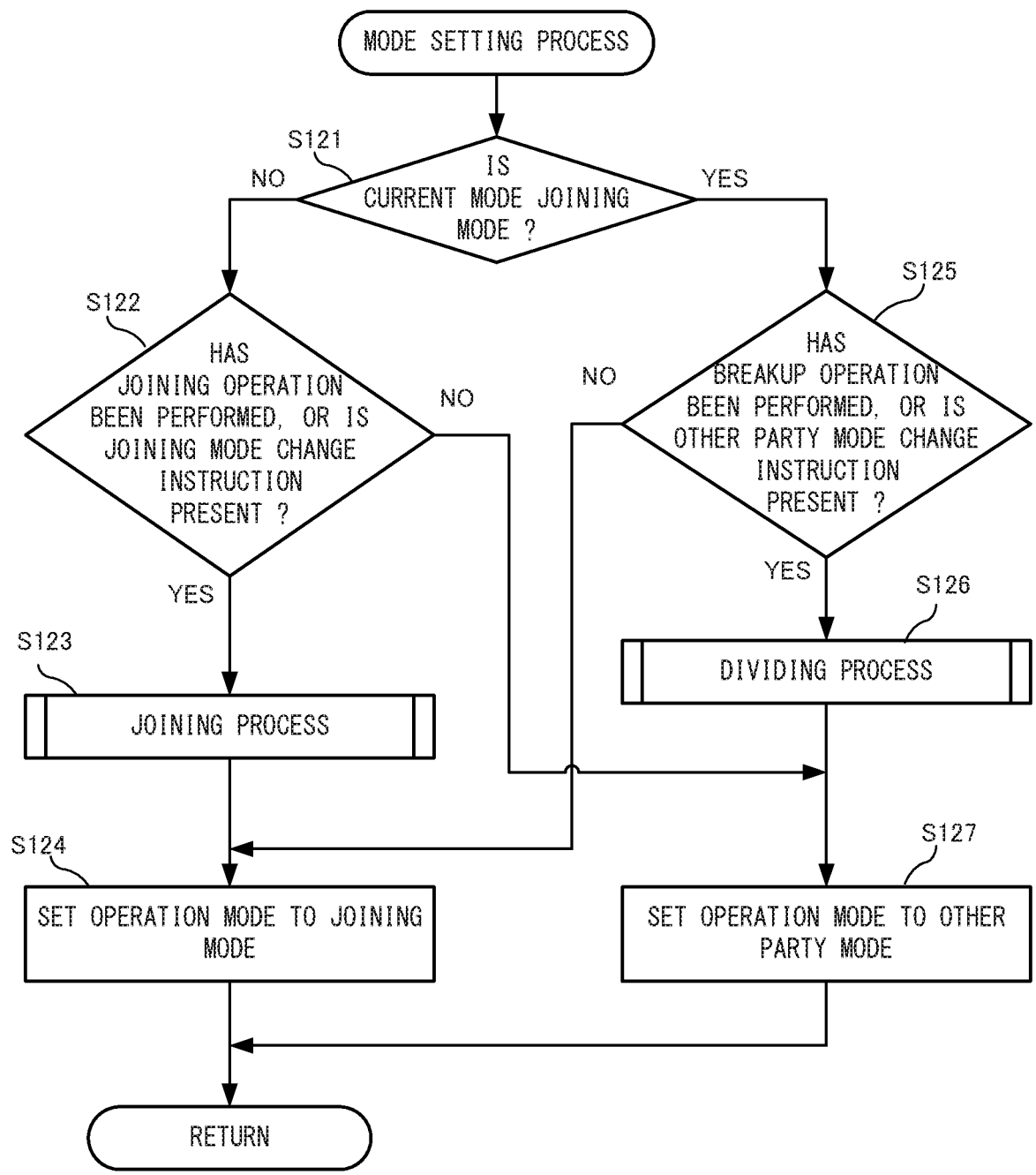
FIG. 52 is a flowchart showing the details of a mode setting process.

Referring back to FIG. 44, subsequent to the throwing process, the processor 81 performs a mode setting process in step S16. In this process, a process for changing the operation mode is performed. FIG. 52 is a diagram showing the details of the mode setting process. First, in step S121, the processor 81 refers to the operation mode 318 and determines whether the current operation mode is the "joining mode". As a result of the determination, when the current operation mode is not the "joining mode", that is, is the "other party mode" (NO in step S121), the processor 81 determines in step S122 whether the above-described "joining operation" has been performed, or the "joining mode change instruction" is set in the mode change instruction data 323. As a result of the determination, when the joining operation has not been performed and the "joining mode change instruction" is not set (NO in step S122), the processor 81 advances the processing to step S127 described later. On the other hand, when the "joining operation" has been performed or when the "joining mode change instruction" is set (YES in step S122), the processor 81 performs a joining process in step S123.

Figure 53:
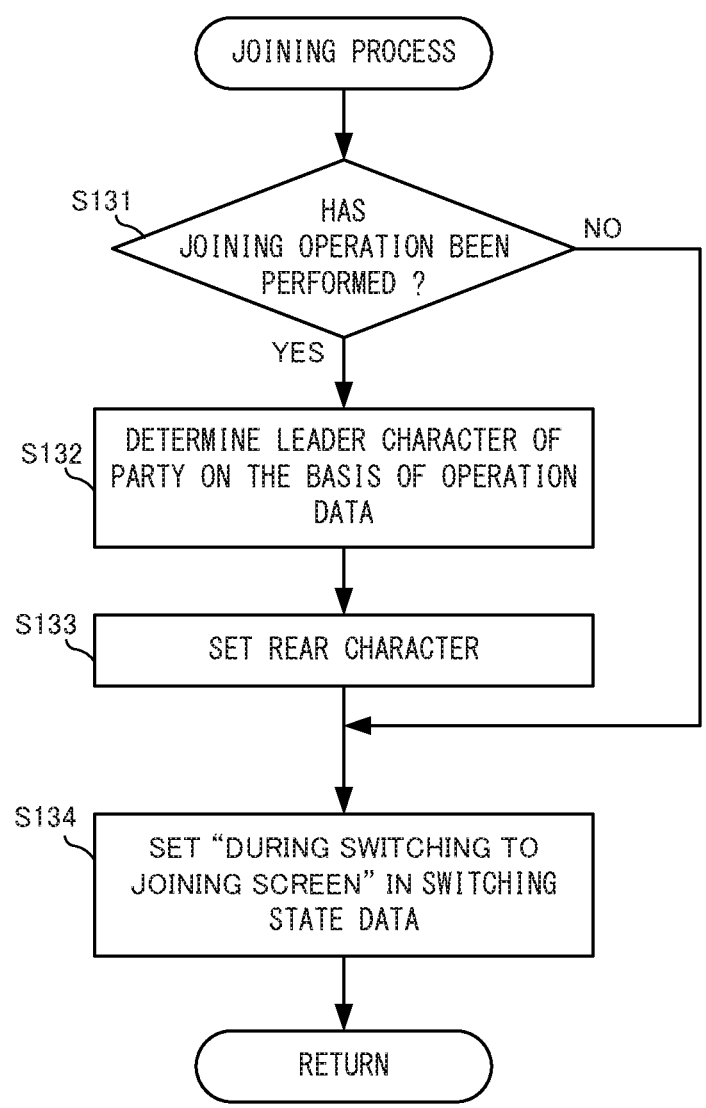
FIG. 53 is a flowchart showing the details of a joining process.

FIG. 53 is a flowchart showing the details of the above joining process. First, in step S131, the processor 81 determines whether the joining operation has been performed. That is, the processor 81 determines whether the joining process has been performed on the basis of the joining operation or the "joining mode change instruction". As a result of the determination, when the joining operation has been performed (YES in step S131), the processor 81 performs, in step S132, a process of referring to the 1P operation data 302 and the 2P operation data 306 and determining either the 1P character or the 2P character as a leader character on the basis of the operation content. Furthermore, in step S133, the processor 81 performs a process of setting the character that has not been determined as the leader character, as a rear character. For example, when the 2P character moves toward and thus comes into contact with the 1P character that is not moving (that is, when the 2P character comes into contact with the 1P character such that the 2P character collides with the 1P character), the 1P character is determined as a leader character. That is, the processor 81 performs a process in which the 2P character is added to the party of the 1P character. Specifically, the processor 81 performs a process of setting the player character ID of the 1P character in the leader character information of the party data corresponding to the party to which the determined leader character belongs (here, the first party data 315) and setting the player character ID of the 2P character in the first rear character information 352. That is, the processor 81 performs a process of resetting the party in which the joining operation is reflected, in steps S132 and S133.

On the other hand, as a result of the above determination in step S131, when the joining operation has not been performed, that is, when the joining process has been performed on the basis of the "joining mode change instruction" (NO step S131), this case is a case where the operation mode is switched from the other party mode to the joining mode as a result of the above-described switching of the operation character. In this case, a leader character and a rear character have already been set, thus the above processes in steps S132 and S133 are skipped, and the processor 81 proceeds to the next process step.

Next, in step S134, the processor 81 sets information indicating "during switching to joining screen", in the screen switching state data 324. This is the end of the joining process.

Referring back to FIG. 52, next, the processor 81 sets the "joining mode" in the operation mode 318 in step S124. Thereafter, the mode setting process is ended.

On the other hand, as a result of the above determination in step S121, when the current operation mode is the "joining mode" (YES in step S121), the processor 81 determines in step S125 whether the above-described "breakup operation" has been performed or the "other party mode change instruction" is set in the mode change instruction data 323. As a result of the determination, when the breakup operation has not been performed and the "other party mode change instruction" is not set (NO in step S125), the processor 81 advances the processing to step S124 described above. On the other hand, when the "breakup operation" has been performed or when the "other party mode change instruction" is set (YES in step S125), the processor 81 performs a dividing process in step S126.

Figure 54:
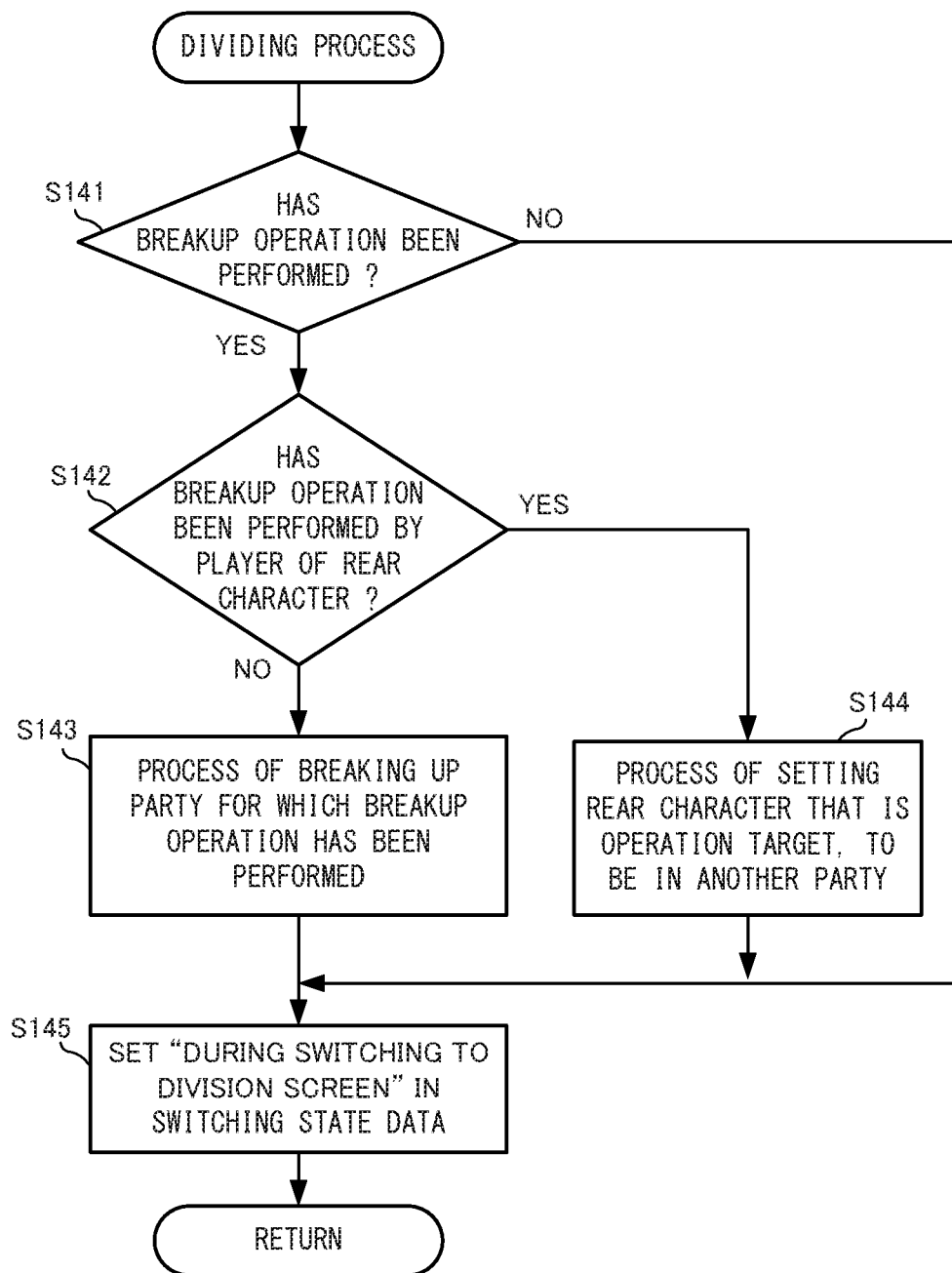
FIG. 54 is a flowchart showing the details of a dividing process.

FIG. 54 is a flowchart showing the details of the above dividing process. First, in step S141, the processor 81 determines whether the above breakup operation has been performed. That is, the processor 81 determines whether the dividing process is being performed on the basis of the breakup operation or the "other party mode change instruction". Here, an example of the breakup operation is an operation of pressing the B-button 54 consecutively three times within a predetermined time when the controller is "vertically held", and a process of tilting the analog stick 32 downward consecutively three times within a predetermined time when the controller is "horizontally held". As a result of the determination, when the breakup operation has been performed (YES in step S141), the processor 81 determines in step S142 whether the breakup operation has been performed by the player who is operating the rear character. As a result of the determination, when the breakup operation is not a breakup operation by the player who is operating the rear character (NO in step S142), it means that the player who is operating the leader character has performed the breakup operation. In this case, in step S143, the processor 81 performs a process of breaking up the party for which the breakup operation has been performed. For example, the case where the leader character is the 1P character and the first player has performed the breakup operation is considered. In this case, a process of clearing the content of the companion character information 354 is performed on the party data of the operation target of the first player. In addition, when the 2P character (rear) is present in the same party, a process of removing the 2P character (rear) from the party data corresponding to the party that is the operation target of the first player and setting the 2P character as a leader character in party data of another party, is also performed. Moreover, when a rear character that is not the 2P character is present in the party, a process of resetting this rear character as the first rear character information 352 is also performed. It should be noted that, when the 2P character is not present in the same party, only a process of clearing the content of the companion character information 354 is performed. In addition to the above, various processes for breaking up the party are also performed as appropriate. Thereafter, the processor 81 advances the processing to step S145 described later.

On the other hand, when the breakup operation is a breakup operation by the player who is operating the rear character (YES in step S142), the processor 81 performs, in step S144, a process for setting the rear character that is the operation target of the player who has performed the breakup operation, as a leader of another party. For example, when the first party data 315 corresponds to the party of the operation target of the first player, a process of setting the content of the first rear character information 352 of the first party data 315 as the leader character information 351 of the second party data 316 is performed. In addition, when another rear character is present in the party, a process of resetting the rear character as the first rear character information 352 is also performed. Moreover, when another rear character is not present in the party, a process of clearing the content of the first rear character information 352 of the first party data 315 is performed.

Next, in step S145, the processor 81 sets information indicating "during switching to division screen", in the screen switching state data 324. This is the end of the dividing process.

Referring back to FIG. 52, next, the processor 81 sets the "other party mode" in the operation mode 318 in step S127. This is the end of the mode setting process.

[Processes for Other Objects]

Referring back to FIG. 44, subsequent to the mode setting process, in step S17, the processor 81 performs processes regarding various objects other than the player characters 201. For example, control of movement of an enemy character, etc., are performed.

[Virtual Camera Setting Process]

Figure 55:
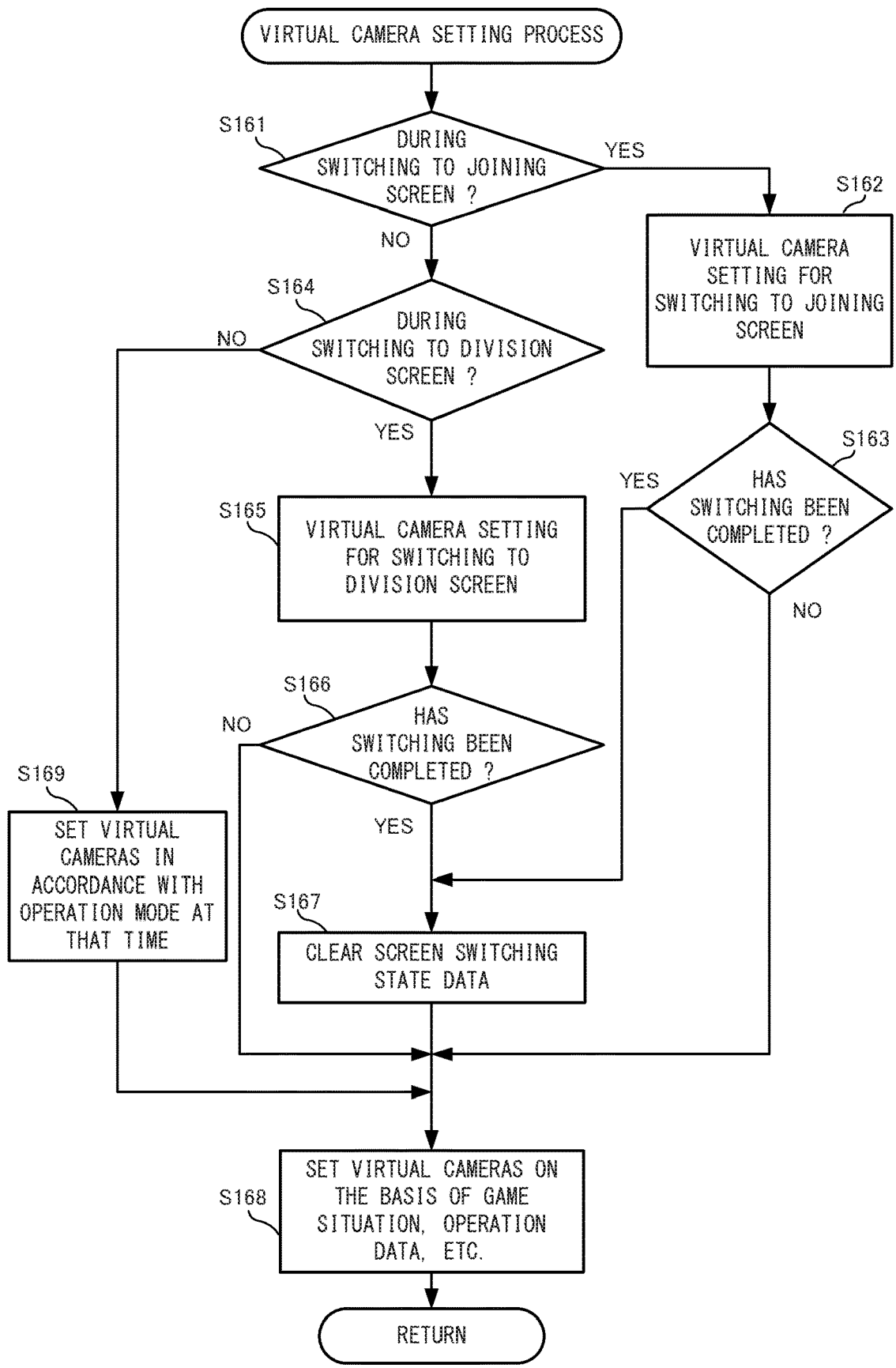
FIG. 55 is a flowchart showing the details of a virtual camera setting process.

Next, in step S18, the processor 81 performs a virtual camera setting process. In this process, a process of setting various parameters of the virtual cameras for taking images of the virtual game space is performed. FIG. 55 is a flowchart showing the details of the virtual camera setting process. In FIG. 55, first, in step S161, the processor 81 refers to the screen switching state data 324 and determines whether "during switching to joining screen" is set. As a result of the determination, when it is "during switching to joining screen" (YES in step S161), it is considered that the current state is a state of switching from the "division screen" to the "joining screen" through several frames. In this case, in step S162, the processor 81 sets various parameters of the virtual cameras for switching from the "division screen" to the "joining screen". For example, when switching from the "division screen" to the "joining screen", a representation in which the width of the 1P display area is gradually increased and the 2P display area is decreased such that the 2P display area is pushed out of the screen, is performed through several frames. In this case, for example, setting or the like in which, while the gazing point of the virtual camera for 1P is kept set at the 1P character, the display area corresponding to the virtual camera for 1P is gradually widened, is performed. Moreover, setting or the like in which the display area corresponding to the virtual camera for 2P is narrowed is also performed. In addition to the above, various parameters such as a position of each virtual camera are set as appropriate.

Next, in step S163, the processor 81 determines whether the switching from the "division screen" to the "joining screen" has been completed. As a result of the determination, when the switching has been completed (YES in step S163), the processor 81 clears the screen switching state data 324 in step S167. Thereafter, the processor 81 proceeds to step S168. On the other hand, when the switching has not been completed (NO in step S163), the processor 81 does not perform the process in step S167 and proceeds to step S168.

On the other hand, as a result of the above determination in step S161, when "during switching to joining screen" is not set (NO in step S161), the processor 81 subsequently determines in step S164 whether "during switching to division screen" is set. As a result of the determination, when "during switching to division screen" is set (YES in step S16), it is considered that the current state is a state of switching from the "joining screen" to the "division screen" through several frames. In this case, in step S165, the processor 81 sets various parameters of the virtual cameras for switching from the "joining screen" to the "division screen". For example, when switching from the "joining screen" to the "division screen", a representation in which the 2P display area enters the screen from the right side toward the left side so as to push the 1P display area, is performed. In this case, for example, setting or the like in which the display area corresponding to the virtual camera for 1P is gradually narrowed such that the display area corresponding to the virtual camera for 1P finally has a size in which the display area occupies the left half of the screen, is performed. In addition, for the virtual camera for 2P, setting or the like in which the display area corresponding to the virtual camera for 2P is gradually increased such that the display area finally has a size in which the display area occupies the right half of the screen, is also performed.

Next, in step S166, the processor 81 determines whether the switching from the "joining screen" to the "division screen" has been completed. As a result of the determination, when the switching has been completed (YES in step S166), the processor 81 clears the screen switching state data 324 in step S167 described above. Thereafter, the processor 81 ends the virtual camera setting process. On the other hand, when the switching has not been completed (NO in step S166), the processor 81 does not perform the process in step S167 and proceeds to step S168.

On the other hand, as a result of the above determination in step S164, when it is also not during switching to the division screen (NO in step S164), it is considered that the current state is a state of either the above "joining screen" or "division screen" after the end of switching. In this case, in step S169, the processor 81 performs setting of the virtual cameras in accordance with the operation mode 318 at that time. That is, the processor 81 performs setting of the virtual cameras suitable for the screen in accordance with whether the screen is the "joining screen" or the "division screen". For example, in the case of the "joining screen", the size of the display area corresponding to the virtual camera for 1P is set such that the entire screen is used, and, in the case of the "division screen", the size of the display area corresponding to the virtual camera for 1P and the size of the display area corresponding to the virtual camera for 2P are each set such that the display area has a size that is half of that at the time of "joining screen".

Next, in step S168, the processor 81 performs a process of setting various parameters of the virtual cameras as appropriate. For example, the processor 81 sets a position, an orientation, an angle of view, and the like of the virtual camera, corresponding to each player character 201, at each frame such that the virtual camera moves following movement of the player character 201. In addition, when the player has performed an operation for rotating the virtual camera or an operation for zooming in/out the virtual camera, a process of setting an imaging direction or an angle of view of the virtual camera as appropriate in accordance with the operation content is also performed. Thereafter, the virtual camera setting process is ended.

[UI Placement Process]

Referring back to FIG. 44, when the virtual camera setting process has ended, the processor 81 subsequently performs a UI placement process in step S19. In this process, a process of placing objects corresponding to the above-described to-be-thrown object selection UI 204 and the above-described operation character information image 205 at appropriate positions in the virtual game space, etc., are performed such that the to-be-thrown object selection UI 204 and the operation character information image 205 are displayed in a game image. The appropriate positions are such positions in the virtual game space that the to-be-thrown object selection UI 204 and the operation character information image 205 are displayed at the positions shown in FIG. 8 or 15 described above or the like when the game image is displayed on the screen. In addition, as necessary, a process of placing objects corresponding to the character switching menu 207 in the virtual game space is also performed similar to the above.

Figure 56:
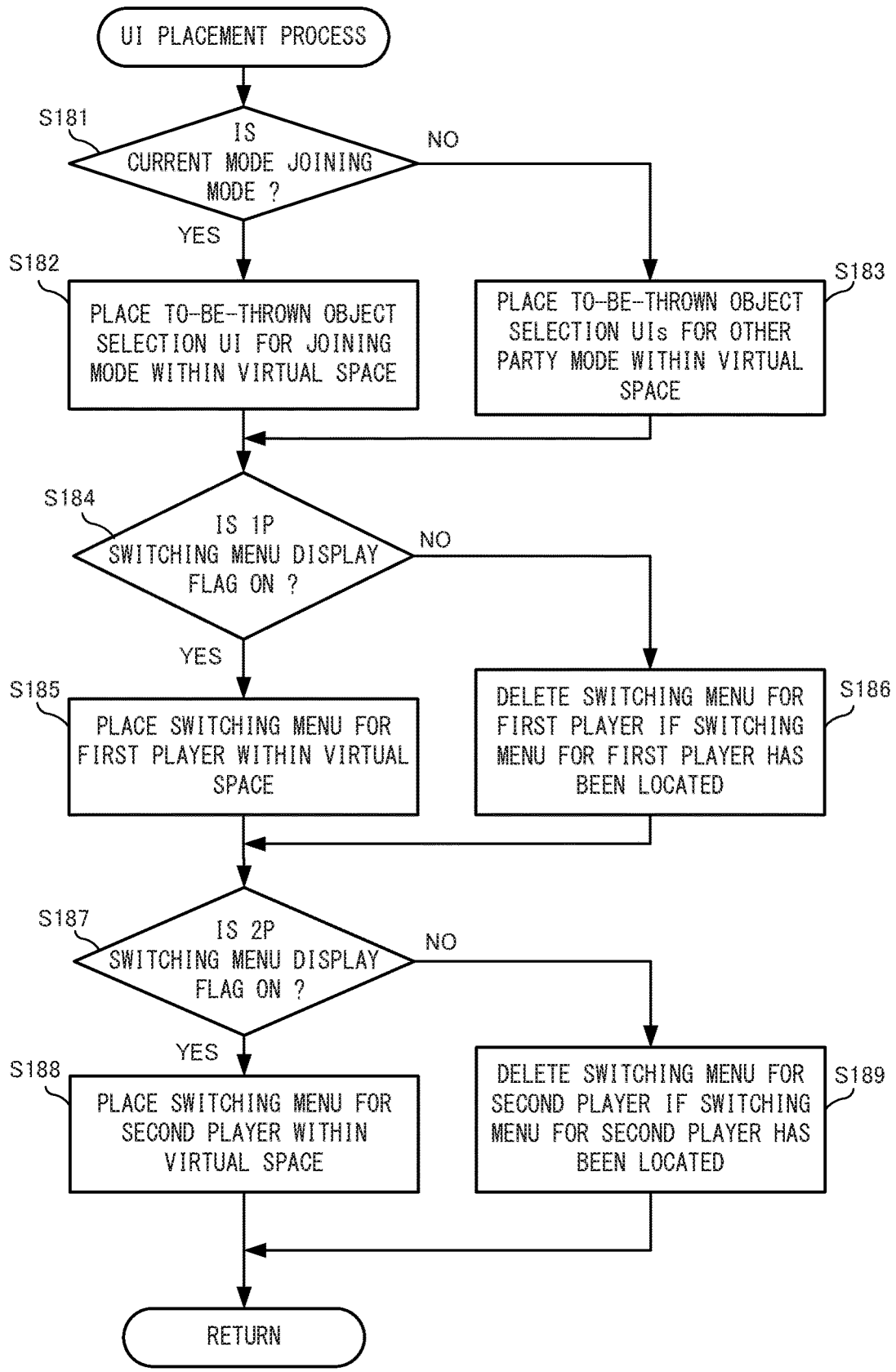
FIG. 56 is a flowchart showing the details of a UI placement process.

FIG. 56 is a flowchart showing the details of the UI placement process. First, in step S181, the processor 81 refers to the operation mode 318 and determines whether the current operation mode is the "joining mode". As a result, when the current operation mode is the "joining mode" (YES in step S181), the processor 81 places the to-be-thrown object selection UI 204 for the "joining mode" within the virtual game space in step S182. As described above, in the case of the "joining mode", the to-be-thrown object selection UI 204 suitable for the controller having a smaller number of operation sections is used. Thus, in this process, either the above "selection UI having the first layout" or the above "selection UI having the second layout" is selected in accordance with the type of the controller being used, and objects corresponding to the UI are placed at appropriate positions within the virtual game space. In addition, contents to be displayed in the UI are set as appropriate on the basis of the contents of the current frame data 362 and the candidate data 363.

On the other hand, as a result of the above determination in step S181, when the current operation mode is not the "joining mode", that is, when the current operation mode is the "other party mode" (NO in step S181), the processor 81 places the to-be-thrown object selection UIs 204 for the "other party mode" within the virtual game space in step S183. In this case, since the screen is the "division screen", the to-be-thrown object selection UIs 204 having layouts suitable for the controllers used by the respective players are placed at appropriate positions within the virtual game space.

Next, in step S184, the processor 81 determines whether the 1P switching menu display flag 321 is ON. When the 1P switching menu display flag 321 is ON (YES in step S184), the processor 81 places the character switching menu 207 for an operation by the first player at an appropriate position within the virtual space in step S185. On the other hand, when 1P switching menu display flag 321 is OFF (NO in step S184), if the character switching menu 207 for an operation by the first player has been located within the virtual game space, the processor 81 performs a process of deleting the character switching menu 207 in step S186. If the character switching menu 207 has not been located, nothing is particularly performed.

Next, in step S187, the processor 81 determines whether the 2P switching menu display flag 322 is ON. When the 2P switching menu display flag 322 is ON (YES in step S187), the processor 81 places the character switching menu 207 for an operation by the second player at an appropriate position within the virtual space in step S188. In addition, contents to be displayed in the character switching menu 207 are also set as appropriate on the basis of the contents of the current frame data 362 and the candidate data 363. On the other hand, when the 2P switching menu display flag 322 is OFF (NO in step S187), if the character switching menu 207 for an operation by the second player has been located within the virtual game space, the processor 81 performs a process of deleting the character switching menu 207 in step S189. In addition, similar to step S186, nothing is particularly performed if the character switching menu 207 has not been located. This is the end of the UI placement process.

Referring back to FIG. 44, when the UI placement process has ended, the processes based on the operation contents end.

This is the end of the detailed description of the game process according to the exemplary embodiment.

As described above, in the exemplary embodiment, control of seamlessly switching between the joining screen and the division screen is performed in accordance with whether the 1P character and the 2P character are present in the same party or different parties. Accordingly, it is possible to provide an easily viewable screen display in accordance with the situation of the game. For example, when the 1P character and the 2P character are present in the same party, the 1P character and the 2P character are controlled such that the distance between both characters is not so large (that is, movement of the rear character is limited on the basis of the position of the leader character), and thus are more easily viewed when being displayed in a single screen. In addition, when the 1P character and the 2P character are present in different parties, since completely separate operations can be performed for the 1P character and the 2P character, the division screen is more easily viewable. Accordingly, an appropriate and easily viewable game screen can be provided in accordance with the party participation state of each player.

In addition, in the exemplary embodiment, regarding the above 1P cursor and 2P cursor (including the case of the lock-on cursor), the reference positions of the cursors are set on the basis of the positions and the directions of the 1P character and the 2P character. The cursor position can be changed further from the reference position on the basis of inputs by the inertial sensors. Accordingly, the cursor position can be controlled only by a simple operation that is a movement direction input for the player character 201, and the position can be further finely adjusted, for example, by changing the orientation of the controller, whereby the operability can be improved. Furthermore, in the exemplary embodiment, a movement speed of the cursor when finely adjusting the cursor position on the basis of the inertial sensors is made different between the case where the current state is the lock-on state and the case where the current state is not the lock-on state. Accordingly, fine adjustment of the cursor position is allowed to be more easily performed, by making a movement amount of the cursor with respect to the same orientation change smaller, for example, in the lock-on state in which the necessity of aiming at an enemy character is high, and thus the operability can be further improved.

Moreover, in the exemplary embodiment, the first player and the second player can use controllers having different numbers of operation sections, and the multiple to-be-thrown object selection UIs are selectively used in accordance with the difference between the numbers of operation sections of the controllers. Accordingly, a selection operation suitable for the number of operation sections of the controller is easily performed, and the UI to be used for the selection operation can be a UI suitable for the controller, so that the convenience of the player can be enhanced.

MODIFICATIONS

In the above example, play by two players has been taken as an example, and the case where two display areas are used in the division screen has been described as an example. In another embodiment, play may be performed by three or more players, and the number of display areas at the time of division may be a number corresponding to the number of players. For example, in the case of play by four players using four player characters, the number of display areas may be at most four. Then, in accordance with change of party structure, player characters that belong to the same party may be collectively displayed in the same display area. For example, when player characters A, B, C, and D are present, if the respective player characters are present in different parties, four display areas may be used in the division screen. For example, display areas arranged in two columns and two rows may be used. In addition, when the player characters A and B are present in a first party and the player characters C and D are present in a second party, the division screen may have two screens at the right and left sides, one of the display areas may be displayed as a joining screen for the first party, and the other of the display areas may be displayed as a joining screen for the second party. Moreover, also when the player characters A, B, and C form a first party and only the player character D forms a second party, the division screen may have two display areas at the right and left sides, one of the display areas may be displayed as a joining screen for the first party, and the other of the display areas may be displayed as a joining screen for the second party. Furthermore, when all the four player characters are present in the same party, a joining screen may be displayed only as a single screen. Furthermore, when three parties are present, for example, three divisional display areas may be used in the division screen, or only three display areas among four divisional display areas arranged in two columns and two rows as described above may be used.

In the above embodiment, the example in which a "throwing" motion is made when moving the companion character 202 or the like has been described. The motion to be made when moving the companion character or the like is not limited to the "throwing" motion, but may be another motion. That is, any motion may be used as long as it is a motion that moves the companion character 202 or the like to a position away from the position of the player character 201 to some extent, within a predetermined time (for example, within approximately several seconds). For example, the companion character 202 or the like may be instantaneously moved to the position of the cursor, or may be moved to the cursor position such that the companion character 202 or the like is "rolled", for example, like a bowling ball.

In the above example, the case where the number of characters that can be operated by players is three has been taken as an example. In another embodiment, four or more player characters may be used. In addition, in another embodiment, only two player characters may be used. In this case, when an operation for switching the above operation target has been performed, a process of exchanging the operation target characters of the first player and the second player with each other may be performed.

In the above embodiment, the case where a series of processes according to the game process are performed in a single apparatus has been described. In another embodiment, the series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

What is claimed is:

1. A non-transitory computer-readable storage medium having stored therein a game program to be executed by a computer of an information processing apparatus, the game program causing the computer to provide execution comprising:
    acquiring operation data, including at least direction input data and inertial sensor data, from a controller, wherein the controller includes at least a direction input section and an inertial sensor;
    controlling movement of a player character within a virtual space on the basis of the direction input data;
    switching a control mode for a position of a cursor used in a predetermined game process between a first control mode and a second control mode;
    when the control mode is the first control mode:
        setting a position of the cursor within the virtual space calculated on the basis of a position and a direction of the player character, as a first position,
        setting a position of the cursor further shifted from the first position on the basis of a change amount of an orientation of the controller included in the inertial sensor data, as a second position, and
        moving the cursor from the first position to the second position based on a first movement amount;
    when the control mode is the second control mode:
        setting a predetermined position of the cursor within the virtual space as the first position,
        limiting a movement range of the cursor to a range, within the virtual space, including the first position,
        setting a position of the cursor further shifted within the range from the first position on the basis of the change amount of the orientation of the controller included in the inertial sensor data, as the second position, and
        moving the cursor from the first position to the second position based on a second movement amount smaller than the first movement amount; and
    performing the predetermined game process on the position of the cursor within the virtual space in accordance with an instruction based on the operation data.

2. The non-transitory computer-readable storage medium according to claim 1, wherein, when the control mode is the first control mode, a position shifted within the virtual space from the position of the player character by a predetermined amount in a direction along the direction of the player character is set as the first position.

3. The non-transitory computer-readable storage medium according to claim 1, wherein the change amount of the orientation of the controller from a predetermined reference orientation is calculated on the basis of the inertial sensor data, and a position corresponding to the change amount is set as the second position.

4. The non-transitory computer-readable storage medium according to claim 3, wherein the second movement amount of the cursor with respect to the change amount of the orientation of the controller when the control mode is the second control mode is made smaller than the first movement amount when the control mode is the first control mode.

5. The non-transitory computer-readable storage medium according to claim 3, wherein, when switching between the first control mode and the second control mode is performed, a movement amount based on the inertial sensor data from the first position is initialized, and the orientation of the controller when the switching is performed is set as the predetermined reference orientation.

6. The non-transitory computer-readable storage medium according to claim 1, wherein
    when the control mode is switched from the first control mode to the second control mode, a predetermined position on a predetermined target object that is preset as a setting target is set as the first position, and
    when the control mode is the second control mode, if a plurality of the target objects are present within a predetermined range including the position of the cursor, a target object that is a setting target for the first position is switched on the basis of the operation data, and a predetermined position on a target object after the switching is set as the first position.

7. The non-transitory computer-readable storage medium according to claim 1, wherein a process of causing the player character to move a predetermined object toward the position of the cursor is performed.

8. The non-transitory computer-readable storage medium according to claim 1, wherein
    when the control mode is the first control mode, the cursor moves at a first movement speed, and when the control mode is the second control mode, the cursor moves at a second movement speed slower than the first movement speed.

9. The non-transitory computer-readable storage medium according to claim 1, wherein when the control mode is the second control mode, a distance between the player character and a virtual object is determined, and the control mode is switched from the second control mode to the first control mode when the distance between the player character and the virtual object exceeds a specified value.

10. The non-transitory computer-readable storage medium according to claim 1, wherein
the first movement amount corresponds to the change amount of the orientation of the controller, and
the second movement amount corresponds to an amount smaller than the change amount of the orientation of the controller.

11. A game system, comprising:
a controller including at least a direction input section and an inertial sensor; and
processing circuitry including at least one processor, wherein the processing circuitry is configured to:
  acquire operation data, including at least direction input data and inertial sensor data, from the controller;
  control movement of a player character within a virtual space on the basis of the direction input data;
  switch a control mode for a position of a cursor used in a predetermined game process between a first control mode and a second control mode;
  when the control mode is the first control mode:
    set a position of the cursor within the virtual space calculated on the basis of a position and a direction of the player character, as a first position,
    set a position of the cursor further shifted from the first position on the basis of a change amount of an orientation of the controller included in the inertial sensor data, as a second position, and
    move the cursor from the first position to the second position based on a first movement amount;
  when the control mode is the second control mode:
    set a predetermined position of the cursor within the virtual space as the first position,
    limit a movement range of the cursor to a range, within the virtual space, including the first position,
    set a position of the cursor further shifted within the range from the first position on the basis of the change amount of the orientation of the controller included in the inertial sensor data, as the second position, and
    moving the cursor from the first position to the second position based on a second movement amount smaller than the first movement amount; and
  perform the predetermined game process on the position of the cursor within the virtual space in accordance with an instruction based on the operation data.

12. The game system according to claim 11, wherein
the change amount of the orientation of the controller from a predetermined reference orientation is calculated on the basis of the inertial sensor data, and a position corresponding to the change amount is set as the second position, and
the second movement amount of the cursor with respect to the change amount of the orientation of the controller when the control mode is the second control mode is made smaller than the first movement amount when the control mode is the first control mode.

13. The game system according to claim 11, wherein
the change amount of the orientation of the controller from a predetermined reference orientation is calculated on the basis of the inertial sensor data, and a position corresponding to the change amount is set as the second position, and
when switching between the first control mode and the second control mode is performed, a movement amount based on the inertial sensor data from the first position is initialized, and the orientation of the controller when the switching is performed is set as the predetermined reference orientation.

14. The game system according to claim 11, wherein
when the control mode is switched from the first control mode to the second control mode, a predetermined position on a predetermined target object that is preset as a setting target is set as the first position, and
when the control mode is the second control mode, if a plurality of the target objects are present within a predetermined range including the position of the cursor, a target object that is a setting target for the first position is switched on the basis of the operation data, and a predetermined position on a target object after the switching is set as the first position.

15. The game system according to claim 11, wherein
the game system includes two controllers that are useable in combination as one controller,
each of the two controllers has a shape that allows the controller to face toward a player when the player holds each controller in order to play a game, and in which a predetermined side of a predetermined surface of the controller on which a predetermined operation section is provided is longer than another side of the predetermined surface,
in a state where the two controllers are held by the player in a first orientation, a combination of the two controllers is usable as one controller for operation for the game process, and
in a state where one controller of the two controllers is held by the player in a second orientation that is an orientation obtained by rotating the first orientation about a predetermined axis by 90 degrees such that a state where the predetermined surface faces toward the player is maintained, the one controller is usable for operation for the game process.

16. A game apparatus control method executed by a computer configured to control a game apparatus, the game apparatus control method comprising:
acquiring operation data, including at least direction input data and inertial sensor data, from a controller, wherein the controller includes at least a direction input section and an inertial sensor;
controlling movement of a player character within a virtual space on the basis of the direction input data;
switching a control mode for a position of a cursor used in a predetermined game process between a first control mode and a second control mode;
when the control mode is the first control mode:
  setting a position of the cursor within the virtual space calculated on the basis of a position and a direction of the player character, as a first position,
  setting a position of the cursor further shifted from the first position on the basis of a change amount of an orientation of the controller included in the inertial sensor data, as a second position, and moving the cursor from the first position to the second position based on a first movement amount;

when the control mode is the second control mode:

setting a predetermined position of the cursor within the virtual space as the first position, limiting a movement range of the cursor to a range, within the virtual space, including the first position, setting a position of the cursor further shifted within the range from the first position on the basis of the change amount of the orientation of the controller included in the inertial sensor data, as the second position, and moving the cursor from the first position to the second position based on a second movement amount smaller than the first movement amount; and performing the predetermined game process on the position of the cursor within the virtual space in accordance with an instruction based on the operation data.

17. The game apparatus control method according to claim 16, wherein, when the control mode is the first control mode, a position shifted within the virtual space from the position of the player character by a predetermined amount in a direction along the direction of the player character is set as the first position.

18. The game apparatus control method according to claim 16, wherein the change amount of the orientation of the controller from a predetermined reference orientation is calculated on the basis of the inertial sensor data, and a position corresponding to the change amount is set as the second position.

19. A game apparatus, comprising:

a controller including at least a direction input section and an inertial sensor;

a processor; and a memory configured to store computer readable instructions that, when executed by the processor, cause the game apparatus to:

acquire operation data, including at least direction input data and inertial sensor data, from the controller;

control movement of a player character within a virtual space on the basis of the direction input data;

switch a control mode for a position of a cursor used in a predetermined game process between a first control mode and a second control mode;

when the control mode is the first control mode:

set a position of the cursor within the virtual space calculated on the basis of a position and a direction of the player character, as a first position, set a position of the cursor further shifted from the first position on the basis of a change amount of an orientation of the controller included in the inertial sensor data, as a second position, and moving the cursor from the first position to the second position based on a first movement amount;

when the control mode is the second control mode:

set a predetermined position of the cursor within the virtual space as the first position, limit a movement range of the cursor to a range, within the virtual space, including the first position, set a position of the cursor further shifted within the range from the first position on the basis of the change amount of the orientation of the controller included in the inertial sensor data, as the second position, and moving the cursor from the first position to the second position based on a second movement amount smaller than the first movement amount; and perform the predetermined game process on the position of the cursor within the virtual space in accordance with an instruction based on the operation data.

20. The game apparatus according to claim 19, wherein, when the control mode is the first control mode, a position shifted within the virtual space from the position of the player character by a predetermined amount in a direction along the direction of the player character is set as the first position.

21. The game apparatus according to claim 19, wherein the change amount of the orientation of the controller from a predetermined reference orientation is calculated on the basis of the inertial sensor data, and a position corresponding to the change amount is set as the second position.

* * * * *